(12) United States Patent
Kondo et al.

(10) Patent No.: US 7,852,217 B2
(45) Date of Patent: Dec. 14, 2010

(54) OBJECT DETECTING DEVICE, OBJECT DETECTING METHOD AND OBJECT DETECTING COMPUTER PROGRAM

(75) Inventors: Kenji Kondo, Kyoto (JP); Tomonobu Naruoka, Kyoto (JP)

(73) Assignee: Panasonic Corporation, Osaka (JP)

( * ) Notice: Subject to any disclaimer, the term of this patent is extended or adjusted under 35 U.S.C. 154(b) by 496 days.

(21) Appl. No.: 11/919,452

(22) PCT Filed: Dec. 18, 2006

(86) PCT No.: PCT/JP2006/325198

§ 371 (c)(1),
(2), (4) Date: Oct. 29, 2007

(87) PCT Pub. No.: WO2007/074671

PCT Pub. Date: Jul. 5, 2007

(65) Prior Publication Data

US 2009/0066513 A1    Mar. 12, 2009

(30) Foreign Application Priority Data

Dec. 28, 2005 (JP) .............................. 2005-377462

(51) Int. Cl.
*G08B 13/14* (2006.01)
*G06K 9/00* (2006.01)
(52) U.S. Cl. .................................. 340/572.1; 382/103
(58) Field of Classification Search ....... 340/10.1–10.6, 340/5.8–5.83, 572.1–572.9; 382/103
See application file for complete search history.

(56) References Cited

U.S. PATENT DOCUMENTS

| | | | | |
|---|---|---|---|---|
| 5,682,142 | A  * | 10/1997 | Loosmore et al. | 340/572.1 |
| 6,998,987 | B2 * | 2/2006  | Lin             | 340/573.1 |
| 7,362,219 | B2 * | 4/2008  | Nogami et al.   | 340/505 |
| 7,522,052 | B2 * | 4/2009  | Stobbe          | 340/572.1 |
| 7,636,045 | B2 * | 12/2009 | Sugiyama et al. | 340/572.1 |
| 2005/0116821 | A1 * | 6/2005 | Wilsey et al. | 340/539.13 |
| 2006/0071791 | A1 * | 4/2006 | Meyers et al. | 340/572.1 |
| 2007/0103313 | A1 * | 5/2007 | Washington    | 340/572.8 |

FOREIGN PATENT DOCUMENTS

JP       7-146362 A       6/1995

(Continued)

OTHER PUBLICATIONS

U.S. Appl. No. 11/796,047, Shusaku Okamoto.

(Continued)

*Primary Examiner*—Jennifer Mehmood
(74) *Attorney, Agent, or Firm*—Harness, Dickey & Pierce, P.L.C.

(57) ABSTRACT

When object detection means, for detecting ID information and a position of an object from outputs of a wireless tag reader, a human detection sensor, and a camera, determines that data relating to first object ID information and data relating to second object ID information, corresponding respectively to first time and second time on which human detection data indicating a presence of a human is obtained, are different from each other, the object detection means calculates a difference between first image data and second image data corresponding to the respective times to thereby detect the object position.

12 Claims, 42 Drawing Sheets

FOREIGN PATENT DOCUMENTS

| | | |
|---|---|---|
| JP | 2000-11057 | 1/2000 |
| JP | 2000-227948 A | 8/2000 |
| JP | 2000-357251 A | 12/2000 |
| JP | 2003-061083 | 2/2003 |
| JP | 2004-21310 A | 1/2004 |
| JP | 3561490 | 9/2004 |
| JP | 2004-289433 A | 10/2004 |
| JP | 2005-011057 | 1/2005 |
| WO | WO-2006/109423 | 10/2006 |

OTHER PUBLICATIONS

Takashi Watanabe, "Hito ga Ido, Hochi suru Buttai no Kenshusu", "Identification of Moved or Left Objects", The Institute of Electronics, Information and Communication Engineers 2005 Sogo Taikai no Taikai Ronbunshu D-12-37, Mar. 7, 2005, p. 187.

* cited by examiner

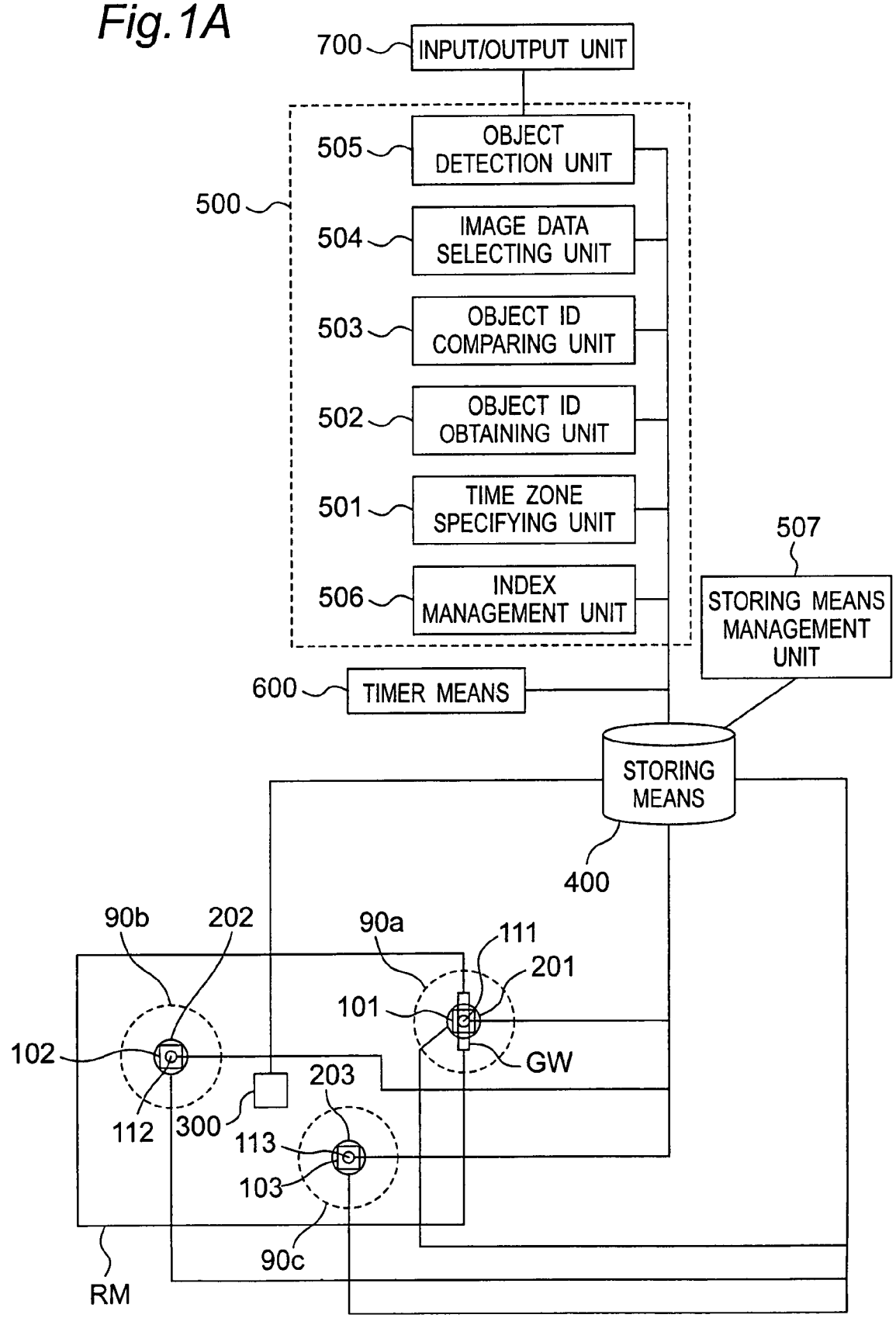

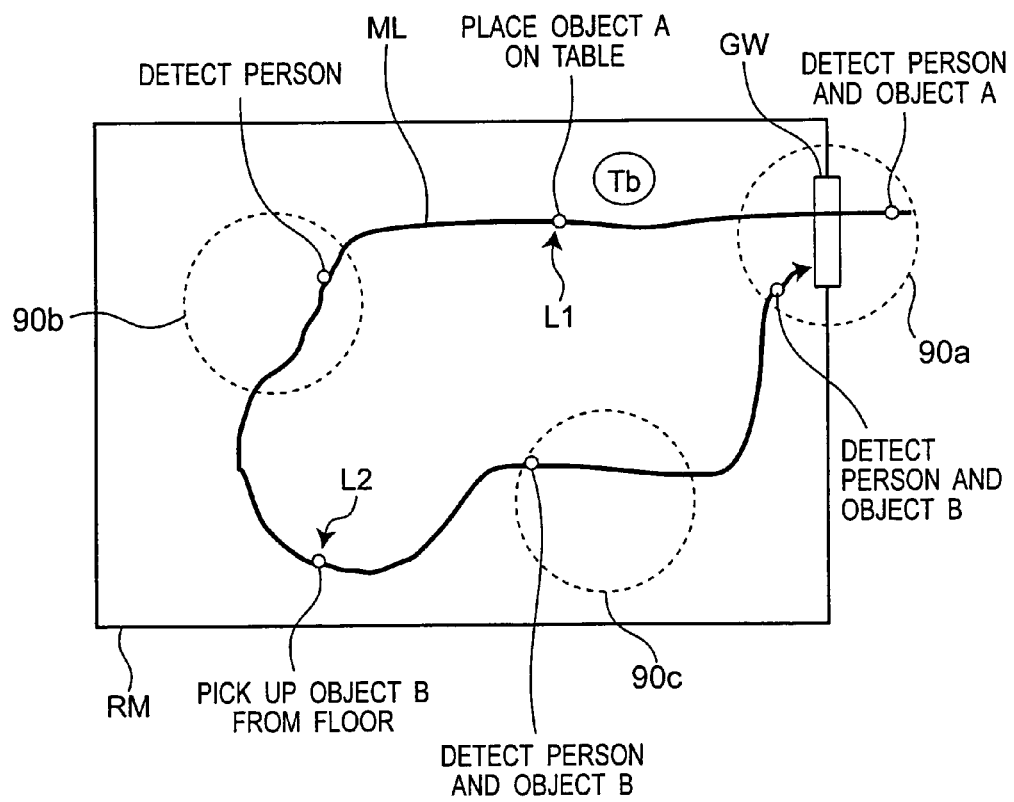

Fig.3

| | TIME (SECOND) | PERSON DETECTION SENSOR | | | WIRELESS TAG READER | | |
|---|---|---|---|---|---|---|---|
| | | 201 | 202 | 203 | 101 | 102 | 103 |
| TZ1 { | 0 | O | — | — | A | — | — |
| | 1 | O | — | — | A | — | — |
| | 2 | O | — | — | A | — | — |
| | 3 | — | — | — | — | — | — |
| | 4 | — | — | — | — | — | — |
| | 5 | — | — | — | — | — | — |
| | 6 | — | — | — | — | — | — |
| | 7 | — | — | — | — | — | — |
| | 8 | — | — | — | — | — | — |
| | 9 | — | — | — | — | — | — |
| | 10 | — | — | — | — | — | — |
| | 11 | — | — | — | — | — | — |
| | 12 | — | — | — | — | — | — |
| | 13 | — | — | — | — | — | — |
| TZ2 { | 14 | — | O | — | — | — | — |
| | 15 | — | O | — | — | — | — |
| | 16 | — | O | — | — | — | — |
| | 17 | — | O | — | — | — | — |
| | 18 | — | — | — | — | — | — |
| | 19 | — | — | — | — | — | — |
| | 20 | — | — | — | — | — | — |
| | 21 | — | — | — | — | — | — |
| | 22 | — | — | — | — | — | — |
| | 23 | — | — | — | — | — | — |
| | 24 | — | — | — | — | — | — |
| | 25 | — | — | — | — | — | — |
| | 26 | — | — | — | — | — | — |
| | 27 | — | — | — | — | — | — |
| | 28 | — | — | — | — | — | — |
| | 29 | — | — | — | — | — | — |
| | 30 | — | — | — | — | — | — |
| TZ3 { | 31 | — | — | O | — | — | B |
| | 32 | — | — | O | — | — | B |
| | 33 | — | — | O | — | — | B |
| | 34 | — | — | — | — | — | — |
| | 35 | — | — | — | — | — | — |
| | 36 | — | — | — | — | — | — |
| | 37 | — | — | — | — | — | — |
| | 38 | — | — | — | — | — | — |
| | 39 | — | — | — | — | — | — |
| | 40 | — | — | — | — | — | — |
| TZ4 { | 41 | O | — | — | B | — | — |
| | 42 | O | — | — | B | — | — |

↑
TIME ZONE (DETERMINED IN STEP SA0)

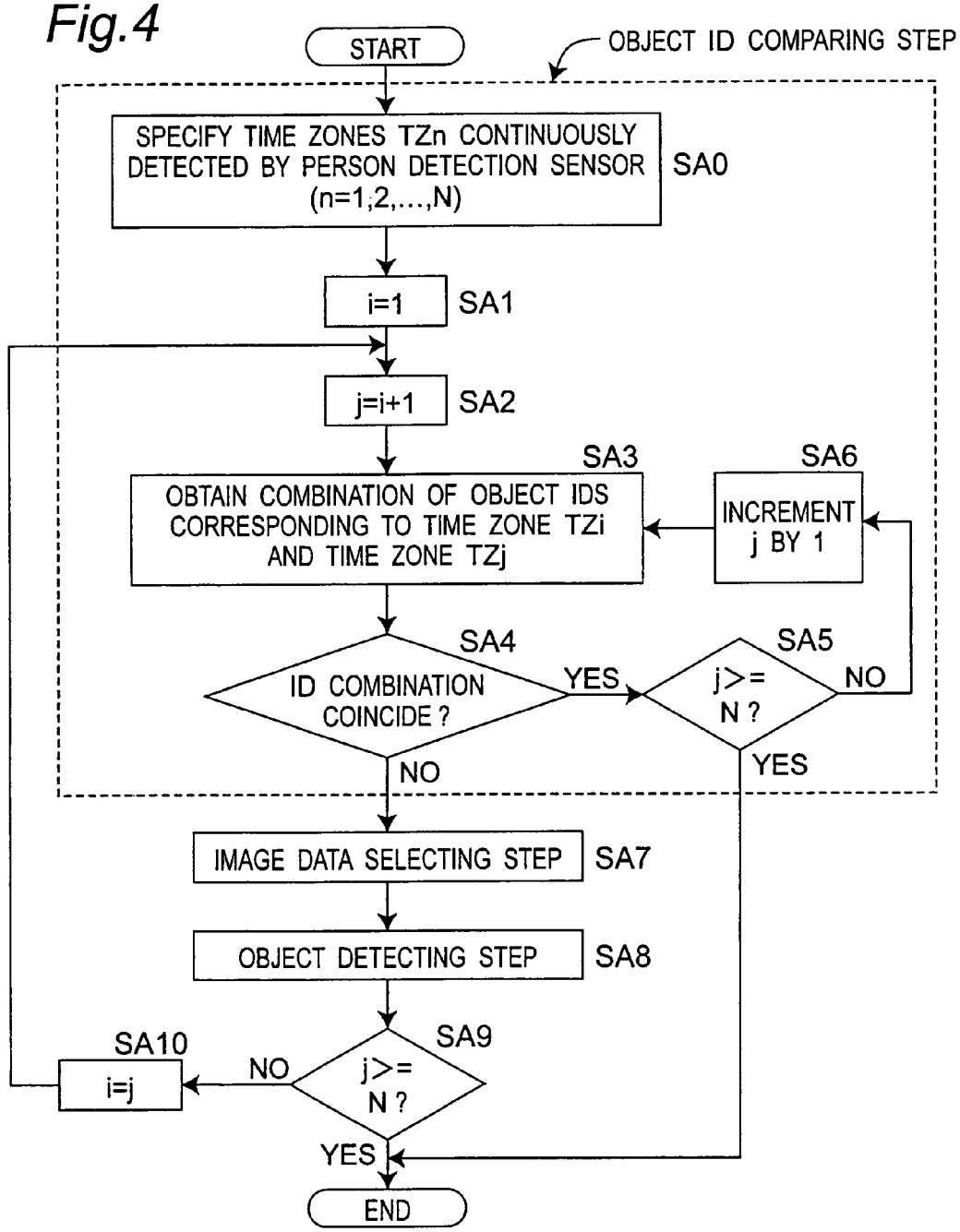

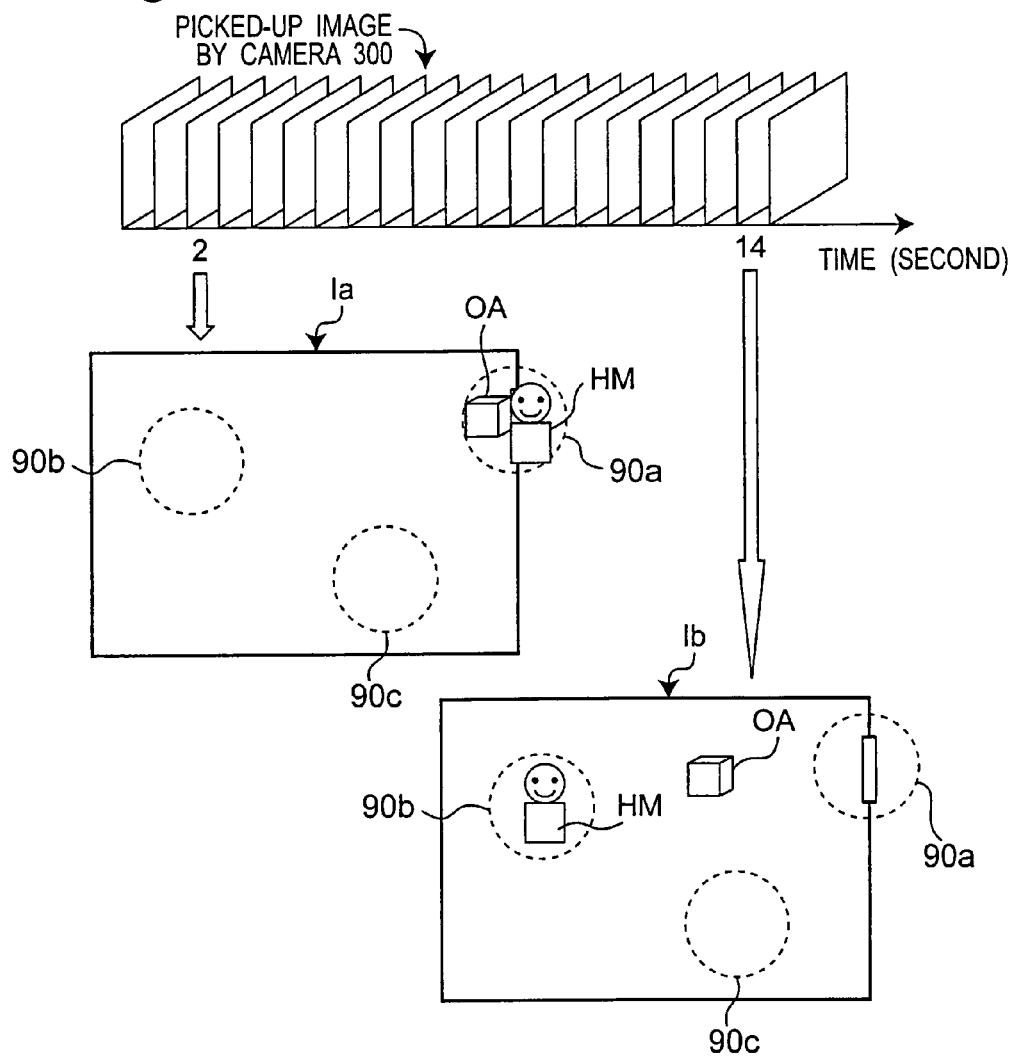

Fig.21

| TIME (SECOND) | PERSON POSITION SENSOR 201 | WIRELESS TAG READER 101 | 102 | 103 |
|---|---|---|---|---|
| 0 | (3980, 490) | A | — | — |
| 1 | (3620, 480) | A | — | — |
| 2 | (3230, 470) | A | — | — |
| 3 | (3070, 480) | — | — | — |
| 4 | (2910, 450) | — | — | — |
| 5 | (2720, 460) | — | — | — |
| 6 | (2580, 470) | — | — | — |
| 7 | (2440, 480) | — | — | — |
| 8 | (2300, 490) | — | — | — |
| 9 | (2160, 510) | — | — | — |
| 10 | (2010, 520) | — | — | — |
| 11 | (1850, 510) | — | — | — |
| 12 | (1680, 630) | — | — | — |
| 13 | (1510, 700) | — | — | — |
| 14 | (1350, 780) | — | — | — |
| 15 | (1110, 950) | — | — | — |
| 16 | (970, 1180) | — | — | — |
| 17 | (730, 1360) | — | — | — |
| 18 | (710, 1450) | — | — | — |
| 19 | (680, 1530) | — | — | — |
| 20 | (670, 1610) | — | — | — |
| 21 | (650, 1700) | — | — | — |
| 22 | (640, 1790) | — | — | — |
| 23 | (710, 1970) | — | — | — |
| 24 | (790, 2170) | — | — | — |
| 25 | (850, 2340) | — | — | — |
| 26 | (1060, 2410) | — | — | — |
| 27 | (1240, 2460) | — | — | — |
| 28 | (1490, 2390) | — | — | — |
| 29 | (1720, 2270) | — | — | — |
| 30 | (2060, 2040) | — | — | — |
| 31 | (2240, 1850) | — | — | B |
| 32 | (2520, 1920) | — | — | B |
| 33 | (2890, 1960) | — | — | B |
| 34 | (2980, 1950) | — | — | — |
| 35 | (3160, 1870) | — | — | — |
| 36 | (3270, 1760) | — | — | — |
| 37 | (3340, 1570) | — | — | — |
| 38 | (3390, 1380) | — | — | — |
| 39 | (3420, 1230) | — | — | — |
| 40 | (3440, 1050) | — | — | — |
| 41 | (3450, 890) | B | — | — |
| 42 | (3620, 790) | B | — | — |

Fig.25

| | TIME (SECOND) | PERSON POSITION SENSOR 201 | WHETHER OUTPUT COORDINATE VALUE OF HUMAN POSITION SENSOR IS INCLUDED IN DETECTION RANGE OF WIRELESS TAG READER | WIRELESS TAG READER | | |
|---|---|---|---|---|---|---|
| | | | | 101 | 102 | 103 |
| TZ1 { | 0 | (3980, 490) | O | A | — | — |
| | 1 | (3620, 480) | O | A | — | — |
| | 2 | (3230, 470) | O | A | — | — |
| | 3 | (3070, 480) | | — | — | — |
| | 4 | (2910, 450) | | — | — | — |
| | 5 | (2720, 460) | | — | — | — |
| | 6 | (2580, 470) | | — | — | — |
| | 7 | (2440, 480) | | — | — | — |
| | 8 | (2300, 490) | | — | — | — |
| | 9 | (2160, 510) | | — | — | — |
| | 10 | (2010, 520) | | — | — | — |
| | 11 | (1850, 510) | | — | — | — |
| | 12 | (1680, 630) | | — | — | — |
| | 13 | (1510, 700) | | — | — | — |
| TZ2 { | 14 | (1350, 780) | O | — | — | — |
| | 15 | (1110, 950) | O | — | — | — |
| | 16 | (970, 1180) | O | — | — | — |
| | 17 | (730, 1360) | O | — | — | — |
| | 18 | (710, 1450) | | — | — | — |
| | 19 | (680, 1530) | | — | — | — |
| | 20 | (670, 1610) | | — | — | — |
| | 21 | (650, 1700) | | — | — | — |
| | 22 | (640, 1790) | | — | — | — |
| | 23 | (710, 1970) | | — | — | — |
| | 24 | (790, 2170) | | — | — | — |
| | 25 | (850, 2340) | | — | — | — |
| | 26 | (1060, 2410) | | — | — | — |
| | 27 | (1240, 2460) | | — | — | — |
| | 28 | (1490, 2390) | | — | — | — |
| | 29 | (1720, 2270) | | — | — | — |
| | 30 | (2060, 2040) | | — | — | — |
| TZ3 { | 31 | (2240, 1850) | O | — | — | B |
| | 32 | (2520, 1920) | O | — | — | B |
| | 33 | (2890, 1960) | O | — | — | B |
| | 34 | (2980, 1950) | | — | — | — |
| | 35 | (3160, 1870) | | — | — | — |
| | 36 | (3270, 1760) | | — | — | — |
| | 37 | (3340, 1570) | | — | — | — |
| | 38 | (3390, 1380) | | — | — | — |
| | 39 | (3420, 1230) | | — | — | — |
| | 40 | (3440, 1050) | | — | — | — |
| TZ4 { | 41 | (3450, 890) | O | B | — | — |
| | 42 | (3620, 790) | O | B | — | — |

↑
TIME ZONE (DETERMINED IN STEP SB0)

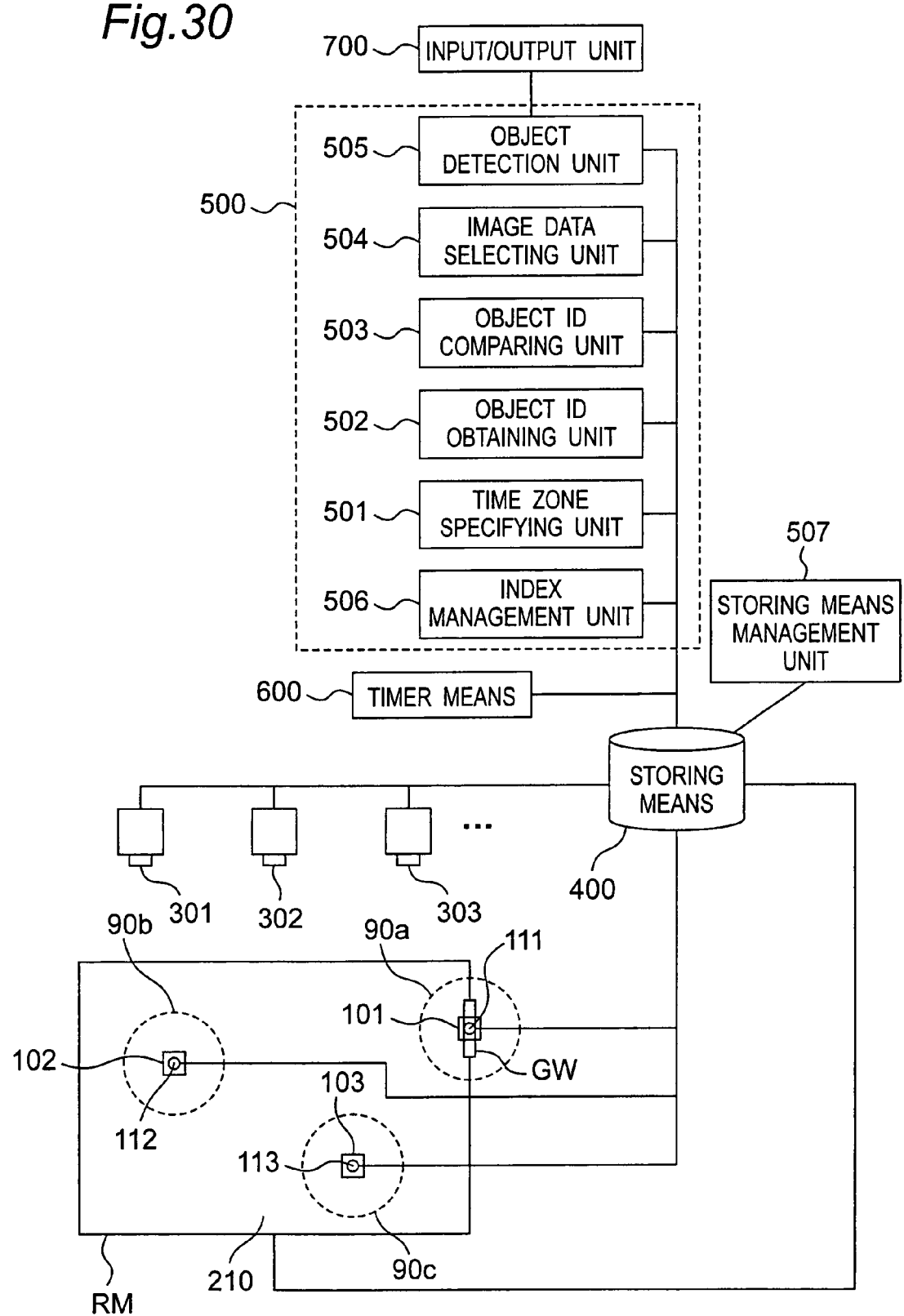

MOVEMENT LINE OF PERSON OBTAINED
BY PERSON POSITION SENSOR IS
OVERLAY-DISPLAYED ON PICKED-UP IMAGE

MOVEMENT LINE OF PERSON OBTAINED BY PERSON POSITION SENSOR IS OVERLAY-DISPLAYED ON PICKED-UP IMAGE

OBJECT PRESENCE CANDIDATE AREA AO

OBJECT PRESENCE CANDIDATE AREA AO

OBJECT DETECTING DEVICE, OBJECT DETECTING METHOD AND OBJECT DETECTING COMPUTER PROGRAM

CROSS REFERENCE TO RELATED APPLICATIONS

This application is a National Stage of International application No. PCT/JP2006/325198, filed Dec. 18, 2006. This application claims the benefit of JP 2005-377462, filed Dec. 28, 2005. The disclosure(s) of the above applications are incorporated herein by reference.

TECHNICAL FIELD

The present invention relates to a technique for detecting ID information and a position of an object in a house or in an office. In particular, the present invention relates to an object detecting device, an object detecting method, and a computer program for detecting an object, for detecting ID information and a position of an object by associating an RFID tag with an image-pickup device such as a camera.

BACKGROUND ART

In recent years, with the advance in an RFID tag technology for managing articles in a non-contacting manner, article management has been increasingly automatized mainly in the business fields such as distribution.

As a conventional technique for article management using RFID tags, Patent Document 1 has been proposed. In Patent Document 1, an RFID tag (hereinafter referred to as "tag") is given to an article, and devices for reading the tag (hereinafter referred to as "tag readers") are densely provided in the environment. When an article to be searched is specified by a terminal for performing article search, each tag reader communicates with the tag given to the article. The place of the tag reader receiving a response from the tag is determined as the place of the article searched.

Further, as another conventional technique using RFID tags, Patent Document 2 has been proposed. In Patent Document 2, a tag is given to an article, and tag readers are provided in the environment. In Patent Document 2, an active tag incorporating a power cell, with which a communication distance of from the tag to the tag reader is long, is used in order to provide tag readers thinly, and by using the intensities of radio waves from the tag received by a plurality of tag readers, the position of the article in a space is determined.

On the other hand, as a technique for detecting an object moved or left by a human by using images (difference between frames), Non-Patent Document 1 has been proposed.

In Non-Patent Document 1, it is assumed that body movement is continuously performed from the time a human starts moving an article until he/she finishes the moving, and that frames in which differences between frames are not less than a threshold in moving images are continued. In other words, an increase and a decrease in a difference area between frames are regarded as a start and an end of an event that a human moves an article. Then, a difference between an image before starting the moving event and an image after the moving event ends saved as background images is calculated to thereby identify the article moved.

Further, Patent Document 3 proposes another technique, including an RFID for detecting presence or absence of a human or the like and a camera for recognizing an image. By associating the detection range of the RFID and the imaging range of the camera with each other, traffic of people or the like is analyzed based on information from the RFID and the camera, and the analyzed information is distributed.

Patent Document 1: Japanese Laid-Open Patent Publication No. 07-146362
Patent Document 2: Japanese Laid-Open Patent Publication No. 2000-357251
Patent Document 3: Japanese Laid-Open Patent Publication No. 2005-011057
Non-Patent Document 1: "Detection of object moved or left by a human," by Takashi Watanabe et al., issued on Mar. 7, 2005, Proceedings of the 2005 IEICE General Conference, D-12-37, pp. 187

DISCLOSURE OF INVENTION

Subject to be Solved by the Invention

In Patent Document 1, in order to determine the place where an article is placed in detail, tag readers must be densely provided spatially. Accordingly, it is easily introduced for business purpose such as distribution where a certain amount of installation cost is affordable, but not easily introduced for household purpose.

In Patent Document 2, in order to suppress power consumption of a power cell incorporated in a tag, a call from a tag is set to once a day for example. Therefore, the position of an article obtained from the system is a position where the tag finally performed transmission. If the article has been moved from the position of the last transmission, the current position of the article cannot be obtained correctly.

In Non-Patent Document 1, in order to specify a moving event of a human, a difference between frames must be calculated for respective frames, so the computation cost rises. In addition, it is not always the case that a human moves an object within a zone where the difference area between frames is not less than a threshold. This causes an issue that movement of an object must be detected accurately.

Patent Document 3 uses an RFID and a camera. However, Patent Document 3 just associates the detection ranges of the RFID and the camera, so it is not possible to detect more accurate position of a human moving within the detection range.

Accordingly, it is an object of the present invention to solve the issues described above, and to provide an object detecting device, an object detecting method, and a computer program for detecting an object, capable of detecting ID information and a current position of an object correctly and accurately even outside the detection ranges of wireless tag readers, without densely installing tag readers spatially, and without calculating a difference between frames for respective frames.

Means for Solving the Subject

In order to achieve the object described above, the present invention is configured as follows.

According to a first aspect of the present invention, there is provided an object detecting device, comprising:

at least one wireless tag reader for detecting data relating to object ID information of an object to which a wireless tag is given in a space where the object is searched;

at least one human position sensor for measuring a position of a human handling the object in the space;

at least one image-pickup device for picking up an image of a part or a whole of the space;

a storing means for storing the data relating to the object ID information detected by the wireless tag reader, human position data measured by the human position sensor, and image data picked up by the image-pickup device, while associating each piece of the data with obtained time thereof; and an object detection means for detecting ID information and a position of the object based on the data relating to the object ID information, the human position data, and the image data, stored in the storing means, wherein when the object detection means determines that data relating to first object ID information and data relating to second object ID information corresponding to first time and second time on which the human position data is obtained respectively, among the data relating to object ID information in which a human position measured by the human position sensor is included in a detection range of the wireless tag reader, are different from each other, the object detection means calculates a difference between first image data and second image data corresponding to the first time and the second time respectively, and in the calculation, the object detection means calculates a difference for an area determined based on the human position data from the first time to the second time, and then, detects a position of the difference area in image data or a position obtained by converting the position to a position in the space where the object is searched, as a position of the object.

According to a second aspect of the present invention, there is provided an object detecting device, comprising:

at least one wireless tag reader for detecting data relating to object ID information of an object to which a wireless tag is given in a space where the object is searched;

at least one human position sensor for measuring a position of a human handling the object in the space;

at least two image-pickup devices each for picking up an image of a part or a whole of the space;

a storing means for storing the data relating to the object ID information detected by the wireless tag reader, human position data measured by the human position sensor, and image data picked up by the image-pickup device, while associating each piece of the data with obtained time thereof; and an object detection means for detecting ID information and a position of the object based on the data relating to the object ID information, the human position data, and the image data, stored in the storing means, wherein when the object detection means determines that data relating to first object ID information and data relating to second object ID information corresponding to first time and second time on which the human position data is obtained respectively, in which a human position measured by the human position sensor is included in a detection range of the wireless tag reader, are different from each other, the object detection means specifies the image-pickup device having an area determined based on the human position data from the first time to the second time as an image-picking up field of view, or the image-pickup device having a viewpoint from which the area is not hidden by other object including a human in each of first image data and second image data corresponding to the first time and the second time respectively, from the at least two image-pickup devices, and the object detection means calculates a difference between the first image data and the second image data corresponding to the first time and the second time respectively, picked up by the specified image-pickup device, and detects a position of an area of the difference in the image data or a position obtained by converting the position to a position in the space where the object is searched, as a position of the object.

According to a third aspect of the present invention, there is provided an object detecting device, comprising:

at least one wireless tag reader for detecting data relating to object ID information of an object to which a wireless tag is given in a space where an object is searched;

at least one human detection sensor for detecting whether a human is present in a detection range of the wireless tag reader in the space;

at least one image-pickup device for picking up an image of a part or a whole of the space;

a storing means for storing the data relating to the object ID information detected by the wireless tag reader, human detection data detected by the human detection sensor, and image data picked up by the image-pickup device, while associating each piece of the data with obtained time thereof; and an object detection means for detecting ID information and a position of the object based on the data relating to the object ID information, the human detection data and the image data, stored in the storing means, wherein when the object detection means determines that first object ID data and data relating to second object ID information, respectively corresponding to first time and second time on which the human detection data indicating the human is present is obtained, are different from each other, the object detection means calculates a difference between first image data and second image data respectively corresponding to the first time and the second time, and detects a position of a difference area in the image data or a position obtained by converting the position of the difference area to a position in the space where the object is searched, as a position of the object.

According to a seventh aspect of the present invention, there is provided an object detecting method of detecting ID information and a position of an object by using data relating to object ID information detected by at least one wireless tag reader for detecting the data relating to the object ID information of an object to which a wireless tag is given, human detection data detected by at least one human detection sensor for detecting whether a human is present in a detection range of the wireless tag reader, and image data picked up by at least one image-pickup device for picking up an image of a part or a whole of a space where the object is searched, which are accumulated in association with obtained times of the respective pieces of data, the method comprising:

comparing data relating to first object ID information with data relating to second object ID information, respectively corresponding to first time and second time on which the human detection data is obtained;

selecting first image data and second image data respectively corresponding to the first time and the second time;

calculating a difference between the first image data and the second image data selected in the image data selection, and detecting a position of an area of the difference in image data or a position obtained by converting the position to a position in the space where the object is searched, as a position of the object; and as a result of the comparison in the object ID data comparison, when the pieces of data relating to the object ID information do not coincide with each other, carrying out the image data selection and the object detection.

According to an eighth aspect of the present invention, there is provided an object detecting method of detecting ID information and a position of an object by using data relating to object ID information detected by at least one wireless tag reader for detecting the data relating to the object ID information of an object to which a wireless tag is given, human position data measured by at least one human position sensor for measuring a position of a human handling the object, and image data picked up by at least one image-pickup device for picking up an image of a part or a whole of a space, which are accumulated in association with obtained times of the respective pieces of data, the method comprising:

comparing data relating to first object ID information with data relating to second object ID information, respectively corresponding to first time and second time on which the human position data is obtained, in which a human position measured by the human position sensor is included in a detection range of the wireless tag reader;

selecting first image data and second image data respectively corresponding to the first time and the second time;

calculating a difference between the first image data and the second image data selected in the image data selection, detecting a position of an area of the difference in image data or a position obtained by converting the position to a position in a space where the object is searched as a position of the object, and in calculating the difference, calculating a difference for an area determined based on the human position data from the first time to the second time; and as a result of the comparison in the object ID comparison, when the pieces of data relating to the object ID information do not coincide with each other, carrying out the image data selection and the object detection.

According to a ninth aspect of the present invention, there is provided an object detecting method of detecting ID information and a position of an object by using data relating to object ID information detected by at least one wireless tag reader for detecting the data relating to the object ID information of an object to which a wireless tag is given, human position data measured by at least one human position sensor for measuring a position of a human handling the object, and image data picked up by at least two image-pickup devices each for picking up an image of a part or a whole of a space, which are accumulated in association with obtained times of the respective pieces of data, the method comprising:

comparing data relating to first object ID information with data relating to second object ID information, respectively corresponding to first time and second time on which the human position data is obtained, in which a human position measured by the human position sensor is included in a detection range of the wireless tag reader;

specifying an image-pickup device having an area determined based on the human position data from the first time to the second time as an image-picking up field of view, or an image-pickup device having a viewpoint from which the area is not hidden by other object including a human in each of first image data and second image data corresponding to the first time and the second time respectively, from the at least two image-pickup devices, and selecting the first image data and the second image data corresponding to the first time and the second time respectively, picked up by the specified image-pickup device;

calculating a difference between the first image data and the second image data selected in the image-pickup device and image data selection, and detecting a position of an area of the difference in image data or a position obtained by converting the position to a position in a space where the object is searched, as a position of the object; and as a result of the comparison in the object ID comparison, when the pieces of data relating to the object ID information do not coincide with each other, carrying out the image-pickup device and image data selection and the object detection.

According to a 10th aspect of the present invention, there is provided a computer program for detecting an object, for detecting ID information and a position of an object by using a computer, by using object ID data detected by at least one wireless tag reader for detecting data relating to the object ID information of an object to which a wireless tag is given, human detection data detected by at least one human detection sensor for detecting whether a human is present in a detection range of the wireless tag reader, and image data picked up by at least one image-pickup device for picking up an image of a part or a whole of a space where the object is searched, which are accumulated in association with obtained times of the respective pieces of data, the program comprising:

an object ID comparing means for comparing data relating to first object ID information with data of second object ID information respectively corresponding to first time and second time on which the human detection data is obtained;

an image data selecting means for selecting first image data and second image data respectively corresponding to the first time and the second time when the pieces of data relating to the object ID information do not coincide with each other as a result of the comparison by the object ID comparing means; and an object detection means for calculating a difference between the first image data and the second image data selected by the image data selecting means, and detecting a position of an area of the difference in image data or a position obtained by converting the position to a position in a space where the object is searched, as a position of the object.

According to an 11th aspect of the present invention, there is provided a computer program for detecting an object, for detecting ID information and a position of an object by using a computer, by using data relating to object ID information detected by at least one wireless tag reader for detecting data relating to object ID information of an object to which a wireless tag is given, human position data measured by at least one human position sensor for measuring a position of a human handling the object, and image data picked up by at least one image-pickup device for picking up an image of a part or a whole of a space, which are accumulated in association with obtained times of the respective pieces of data, the program causing the computer to execute:

an object ID comparing means for comparing data relating to first object ID information with data relating to second object ID information respectively corresponding to first time and second time on which the human position data is obtained, in which a human position measured by the human position sensor is included in a detection range of the wireless tag reader;

an image data selecting means for selecting first image data and second image data respectively corresponding to the first time and the second time when the pieces of data relating to the object ID information do not coincide with each other as a result of the comparison by the object ID comparing means; and an object detection means for calculating a difference between the first image data and the second image data selected by the image data selecting means, detecting a position of an area of the difference in image data or a position obtained by converting the position to a position in a space where the object is searched, as a position of the object, and when calculating the difference, calculating a difference for an area determined based on the human position data from the first time to the second time.

According to a 12th aspect of the present invention, there is provided a computer program for detecting an object, for detecting ID information and a position of an object by using a computer, by using data relating to object ID information detected by at least one wireless tag reader for detecting data relating to object ID information of an object to which a wireless tag is given, human position data measured by at least one human position sensor for measuring a position of a human handling the object, and image data picked up by at least two image-pickup devices each for picking up an image of a part or a whole of a space, which are accumulated in association with obtained times of the respective pieces of data, wherein when the program causes the computer to execute:

an object ID comparing means for comparing data relating to first object ID information with data relating to second object ID information respectively corresponding to first time and second time on which the human position data is obtained, in which a human position measured by the human position sensor is included in a detection range of the wireless tag reader;

an image-pickup device and image data selecting means for specifying an image-pickup device having an area determined based on the human position data from the first time to the second time as an image-pickup field of view, or an image-pickup device having a viewpoint from which the area is not hidden by other object including a human in each of first image data and second image data respectively corresponding to the first time and the second time, among the at least two image-pickup devices, and selecting the first image data and the second image data respectively corresponding to the first time and the second time picked up by the specified image-pickup device; and an object detection means for calculating a difference between the first image data and the second image data selected by the image-pickup device and image data selecting means, and detecting a position of an area of the difference in image data or a position obtained by converting the position to a position in a space where the object is searched, as a position of the object, the program causes the computer to execute the image-pickup device and image data selecting means and the object detection means when the pieces of data relating to the object ID information do not coincide with each other as a result of the comparison by the object ID comparing means.

EFFECTS OF THE INVENTION

According to the present invention, by using wireless tag readers and an image-pickup device such as a camera together, the position of an object can be determined by using images even in the case of providing the wireless tag readers thinly spatially. Further, by utilizing information that pieces of object ID information detected by wireless readers are different at two different times, it is possible to determine a time zone including the time when a human surely handled the article. Therefore, there is no need to calculate a difference for respective frames of every image data imaged by an image-pickup device, whereby computation amount can be reduced.

BRIEF DESCRIPTION OF DRAWINGS

These and other aspects and features of the present invention will become clear from the following description taken in conjunction with the preferred embodiments thereof with reference to the accompanying drawings, in which:

FIG. 1A is a block diagram showing a configuration example of an object detecting device according to a first embodiment of the present invention;

FIG. 2 is a view showing a movement line (movement history) of a human in relation with the object detecting device according to the first embodiment of the present invention;

FIG. 3 is a table showing outputs of the human detection sensor and outputs of the wireless tag reader in the object detecting device according to the first embodiment of the present invention;

FIG. 4 is a flowchart showing an object detecting method performed by an object detection means of the object detecting device according to the first embodiment of the present invention;

FIG. 5 is a table showing output examples of a wireless tag reader when there are multiple pieces of data relating to the article ID information acquired by the wireless tag reader;

FIG. 6A is a view showing images Ia and Ib picked up at a time 2 second and a time 14 second in the first embodiment of the present invention;

FIG. 6B is a table showing entries of a database storing various kinds of information corresponded to ID information of an object that is used by the object detecting device according to the first embodiment of the present invention;

FIG. 21 is a table showing outputs of a human position sensor and outputs of wireless tag readers according to the second embodiment of the present invention;

FIG. 25 is a table showing determination results whether output coordinate values of the human position sensor are included in the actually measured detection range of a wireless tag reader, together with the sensor outputs of FIG. 21;

FIG. 30 is a block diagram showing a configuration example of an image processor according to a third embodiment of the present invention;

BEST MODE FOR CARRYING OUT THE INVENTION

Figure 1B:
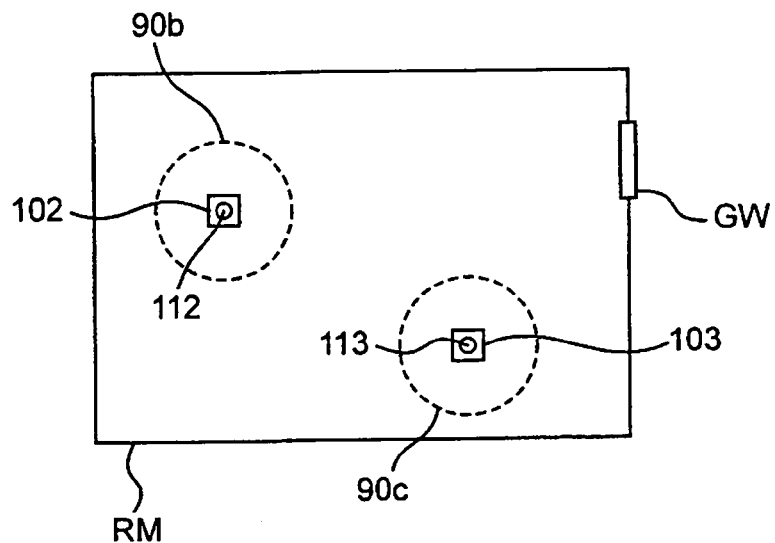
FIG. 1B is a view showing an installation example of wireless tag readers of the object detecting device according to the first embodiment of the present invention.

Before the description of the present invention proceeds, it is to be noted that like parts are designated by like reference numerals throughout the accompanying drawings.

Hereinafter, before describing embodiments of the present invention in detail with reference to the drawings, various modes of the present invention will be described.

Hereinafter, embodiments according to the present invention will be described in detail based on the drawings.

Hereinafter, before describing embodiments of the present invention in detail with reference to the drawings, various modes of the present invention will be described.

According to a first aspect of the present invention, there is provided an object detecting device, comprising:

at least one wireless tag reader for detecting data relating to object ID information of an object to which a wireless tag is given in a space where the object is searched;

at least one human position sensor for measuring a position of a human handling the object in the space;

at least one image-pickup device for picking up an image of a part or a whole of the space;

a storing means for storing the data relating to the object ID information detected by the wireless tag reader, human position data measured by the human position sensor, and image data picked up by the image-pickup device, while associating each piece of the data with obtained time thereof; and an object detection means for detecting ID information and a position of the object based on the data relating to the object ID information, the human position data, and the image data, stored in the storing means, wherein when the object detection means determines that data relating to first object ID information and data relating to second object ID information corresponding to first time and second time on which the human position data is obtained respectively, among the data relating to object ID information in which a human position measured by the human position sensor is included in a detection range of the wireless tag reader, are different from each other, the object detection means calculates a difference between first image data and second image data corresponding to the first time and the second time respectively, and in the calculation, the object detection means calculates a difference for an area determined based on the human position data from the first time to the second time, and then, detects a position of the difference area in image data or a position obtained by converting the position to a position in the space where the object is searched, as a position of the object.

According to a second aspect of the present invention, there is provided an object detecting device, comprising:

at least one wireless tag reader for detecting data relating to object ID information of an object to which a wireless tag is given in a space where the object is searched;

at least one human position sensor for measuring a position of a human handling the object in the space;

at least two image-pickup devices each for picking up an image of a part or a whole of the space;

a storing means for storing the data relating to the object ID information detected by the wireless tag reader, human position data measured by the human position sensor, and image data picked up by the image-pickup device, while associating each piece of the data with obtained time thereof; and an object detection means for detecting ID information and a position of the object based on the data relating to the object ID information, the human position data, and the image data, stored in the storing means, wherein when the object detection means determines that data relating to first object ID information and data relating to second object ID information corresponding to first time and second time on which the human position data is obtained respectively, in which a human position measured by the human position sensor is included in a detection range of the wireless tag reader, are different from each other, the object detection means specifies the image-pickup device having an area determined based on the human position data from the first time to the second time as an image-picking up field of view, or the image-pickup device having a viewpoint from which the area is not hidden by other object including a human in each of first image data and second image data corresponding to the first time and the second time respectively, from the at least two image-pickup devices, and the object detection means calculates a difference between the first image data and the second image data corresponding to the first time and the second time respectively, picked up by the specified image-pickup device, and detects a position of an area of the difference in the image data or a position obtained by converting the position to a position in the space where the object is searched, as a position of the object.

According to a third aspect of the present invention, there is provided an object detecting device, comprising:

at least one wireless tag reader for detecting data relating to object ID information of an object to which a wireless tag is given in a space where an object is searched;

at least one human detection sensor for detecting whether a human is present in a detection range of the wireless tag reader in the space;

at least one image-pickup device for picking up an image of a part or a whole of the space;

a storing means for storing the data relating to the object ID information detected by the wireless tag reader, human detection data detected by the human detection sensor, and image data picked up by the image-pickup device, while associating each piece of the data with obtained time thereof; and an object detection means for detecting ID information and a position of the object based on the data relating to the object ID information, the human detection data and the image data, stored in the storing means, wherein when the object detection means determines that first object ID data and data relating to second object ID information, respectively corresponding to first time and second time on which the human detection data indicating the human is present is obtained, are different from each other, the object detection means calculates a difference between first image data and second image data respectively corresponding to the first time and the second time, and detects a position of a difference area in the image data or a position obtained by converting the position of the difference area to a position in the space where the object is searched, as a position of the object.

According to a fourth aspect of the present invention, there is provided the object detecting device according to the third aspect, wherein the image-pickup device is a camera, and when calculating the difference between the first image data and the second image data, the object detection means excludes an area obtained by converting the detection range of the human detection sensor to a camera coordinate system from a difference subject area for calculating the difference between the first image data and the second image data, and calculates the difference for an area from which the area has been excluded.

According to a fifth aspect of the present invention, there is provided the object detecting device according to the third aspect, wherein the object detection means includes:

an image data selecting unit for selecting first image data and third image data of which obtained times are different from each other, based on the first time, and selecting second image data and fourth image data of which obtained times are different from each other, based on the second time; and an object detection unit for determining a first mask area by calculating a difference between the first image data and the third image data selected by the image data selecting unit, and determining a second mask area by calculating a difference between the second image data and the fourth image data selected by the image data selecting unit, and in calculating a difference between the first image data and the second image data, calculating the difference between the first image data and the second image data after excluding the first mask area and the second mask area from a difference subject area.

According to a sixth aspect of the present invention, there is provided the object detecting device according to any one of the first to fifth aspects, wherein when calculating the difference between the first image data and the second image data, the object detection means specifies object ID information having a difference in the data relating to the first object ID information and the data relating to the second object ID information, and calculates the difference by using at least one piece of information among color, size, and shape information of the object corresponded to the object ID information having the difference.

According to a seventh aspect of the present invention, there is provided an object detecting method of detecting ID information and a position of an object by using data relating to object ID information detected by at least one wireless tag reader for detecting the data relating to the object ID information of an object to which a wireless tag is given, human detection data detected by at least one human detection sensor for detecting whether a human is present in a detection range of the wireless tag reader, and image data picked up by at least one image-pickup device for picking up an image of a part or a whole of a space where the object is searched, which are accumulated in association with obtained times of the respective pieces of data, the method comprising:

comparing data relating to first object ID information with data relating to second object ID information, respectively corresponding to first time and second time on which the human detection data is obtained;

selecting first image data and second image data respectively corresponding to the first time and the second time;

calculating a difference between the first image data and the second image data selected in the image data selection, and detecting a position of an area of the difference in image data or a position obtained by converting the position to a position in the space where the object is searched, as a position of the object; and as a result of the comparison in the object ID data comparison, when the pieces of data relating to the object ID information do not coincide with each other, carrying out the image data selection and the object detection.

According to an eighth aspect of the present invention, there is provided an object detecting method of detecting ID information and a position of an object by using data relating to object ID information detected by at least one wireless tag reader for detecting the data relating to the object ID information of an object to which a wireless tag is given, human position data measured by at least one human position sensor for measuring a position of a human handling the object, and image data picked up by at least one image-pickup device for picking up an image of a part or a whole of a space, which are accumulated in association with obtained times of the respective pieces of data, the method comprising:

comparing data relating to first object ID information with data relating to second object ID information, respectively corresponding to first time and second time on which the human position data is obtained, in which a human position measured by the human position sensor is included in a detection range of the wireless tag reader;

selecting first image data and second image data respectively corresponding to the first time and the second time;

calculating a difference between the first image data and the second image data selected in the image data selection, detecting a position of an area of the difference in image data or a position obtained by converting the position to a position in a space where the object is searched as a position of the object, and in calculating the difference, calculating a difference for an area determined based on the human position data from the first time to the second time; and as a result of the comparison in the object ID comparison, when the pieces of data relating to the object ID information do not coincide with each other, carrying out the image data selection and the object detection.

According to a ninth aspect of the present invention, there is provided an object detecting method of detecting ID information and a position of an object by using data relating to object ID information detected by at least one wireless tag reader for detecting the data relating to the object ID information of an object to which a wireless tag is given, human position data measured by at least one human position sensor for measuring a position of a human handling the object, and image data picked up by at least two image-pickup devices each for picking up an image of a part or a whole of a space, which are accumulated in association with obtained times of the respective pieces of data, the method comprising:

comparing data relating to first object ID information with data relating to second object ID information, respectively corresponding to first time and second time on which the human position data is obtained, in which a human position measured by the human position sensor is included in a detection range of the wireless tag reader;

specifying an image-pickup device having an area determined based on the human position data from the first time to the second time as an image-picking up field of view, or an image-pickup device having a viewpoint from which the area is not hidden by other object including a human in each of first image data and second image data corresponding to the first time and the second time respectively, from the at least two image-pickup devices, and selecting the first image data and the second image data corresponding to the first time and the second time respectively, picked up by the specified image-pickup device;

calculating a difference between the first image data and the second image data selected in the image-pickup device and image data selection, and detecting a position of an area of the difference in image data or a position obtained by converting the position to a position in a space where the object is searched, as a position of the object; and as a result of the comparison in the object ID comparison, when the pieces of data relating to the object ID information do not coincide with each other, carrying out the image-pickup device and image data selection and the object detection.

According to a 10th aspect of the present invention, there is provided a computer program for detecting an object, for detecting ID information and a position of an object by using a computer, by using object ID data detected by at least one wireless tag reader for detecting data relating to the object ID information of an object to which a wireless tag is given, human detection data detected by at least one human detection sensor for detecting whether a human is present in a detection range of the wireless tag reader, and image data picked up by at least one image-pickup device for picking up an image of a part or a whole of a space where the object is searched, which are accumulated in association with obtained times of the respective pieces of data, the program comprising:

an object ID comparing means for comparing data relating to first object ID information with data of second object ID information respectively corresponding to first time and second time on which the human detection data is obtained;

an image data selecting means for selecting first image data and second image data respectively corresponding to the first time and the second time when the pieces of data relating to the object ID information do not coincide with each other as a result of the comparison by the object ID comparing means; and an object detection means for calculating a difference between the first image data and the second image data selected by the image data selecting means, and detecting a position of an area of the difference in image data or a position obtained by converting the position to a position in a space where the object is searched, as a position of the object.

According to an 11th aspect of the present invention, there is provided a computer program for detecting an object, for detecting ID information and a position of an object by using a computer, by using data relating to object ID information detected by at least one wireless tag reader for detecting data relating to object ID information of an object to which a wireless tag is given, human position data measured by at least one human position sensor for measuring a position of a human handling the object, and image data picked up by at least one image-pickup device for picking up an image of a part or a whole of a space, which are accumulated in association with obtained times of the respective pieces of data, the program causing the computer to execute:

an object ID comparing means for comparing data relating to first object ID information with data relating to second object ID information respectively corresponding to first time and second time on which the human position data is obtained, in which a human position measured by the human position sensor is included in a detection range of the wireless tag reader;

an image data selecting means for selecting first image data and second image data respectively corresponding to the first time and the second time when the pieces of data relating to the object ID information do not coincide with each other as a result of the comparison by the object ID comparing means; and an object detection means for calculating a difference between the first image data and the second image data selected by the image data selecting means, detecting a position of an area of the difference in image data or a position obtained by converting the position to a position in a space where the object is searched, as a position of the object, and when calculating the difference, calculating a difference for an area determined based on the human position data from the first time to the second time.

According to a 12th aspect of the present invention, there is provided a computer program for detecting an object, for detecting ID information and a position of an object by using a computer, by using data relating to object ID information detected by at least one wireless tag reader for detecting data relating to object ID information of an object to which a wireless tag is given, human position data measured by at least one human position sensor for measuring a position of a human handling the object, and image data picked up by at least two image-pickup devices each for picking up an image of a part or a whole of a space, which are accumulated in association with obtained times of the respective pieces of data, wherein when the program causes the computer to execute:

an object ID comparing means for comparing data relating to first object ID information with data relating to second object ID information respectively corresponding to first time and second time on which the human position data is obtained, in which a human position measured by the human position sensor is included in a detection range of the wireless tag reader;

an image-pickup device and image data selecting means for specifying an image-pickup device having an area determined based on the human position data from the first time to the second time as an image-pickup field of view, or an image-pickup device having a viewpoint from which the area is not hidden by other object including a human in each of first image data and second image data respectively corresponding to the first time and the second time, among the at least two image-pickup devices, and selecting the first image data and the second image data respectively corresponding to the first time and the second time picked up by the specified image-pickup device; and an object detection means for calculating a difference between the first image data and the second image data selected by the image-pickup device and image data selecting means, and detecting a position of an area of the difference in image data or a position obtained by converting the position to a position in a space where the object is searched, as a position of the object, the program causes the computer to execute the image-pickup device and image data selecting means and the object detection means when the pieces of data relating to the object ID information do not coincide with each other as a result of the comparison by the object ID comparing means.

Hereinafter, an embodiment of the present invention will be described with reference to the drawings.

First Embodiment

Hereinafter, an object detecting device and an object detecting method according to a first embodiment of the present invention will be described in detail with reference to the drawings.

FIG. 1A is a block diagram showing the configuration of the object detecting device according to the first embodiment of the present invention. A room RM, in which the object detecting device is provided, is expressed in a schematic shape (rectangle shape in this example) seen through from above.

The object detecting device mainly includes an input-output unit 700, an object detection means 500, a timer means 600, a storing means 400, a camera 300 as an example of an image-pickup device, three wireless tag readers 101 to 103, and three human sensors 201 to 203, which will be described in detail later.

In the room RM, the three wireless tag readers 101 to 103, three antennas 111 to 113 of the three wireless tag readers 101 to 103, and the three human detection sensors 201 to 203 are provided. The detection ranges of the wireless tag readers 101 to 103 are expressed with circles 90*a*, 90*b*, and 90*c* drawn by dotted lines about the antennas 111 to 113. In particular, the wireless tag reader 101 is provided such that the detection range becomes around the gateway GW of the room RM. The human detection sensors 201 to 203 are provided such that the detection ranges become almost the same as the detection ranges of the wireless tag readers 101 to 103, respectively. Each of the wireless tag readers 101 to 103 and the human detection sensors 201 to 203 performs readout at a frequency of once per second, and transmits the readout result to the storing means 400.

Note that the antennas 111 to 113 of the wireless tag readers 101 to 103 are desirably provided at places where people frequently pass through such as the gateway GW, a repository, a book shelf, a cupboard, a side table, a refrigerator, a working desk or a table, or in front of a custom kitchen. In the case where passing range of people is limited due to arrangement of furniture, the antennas 111 to 113 of the wireless tag readers 101 to 103 are preferably set at places serving as passages. In selecting the setting places of the antennas 111 to 113, it is also acceptable to measure movement lines (movement locus) of humans for several days, and to set the places where movement lines are concentrated as setting places of the antennas 111 to 113.

Figure 1C:
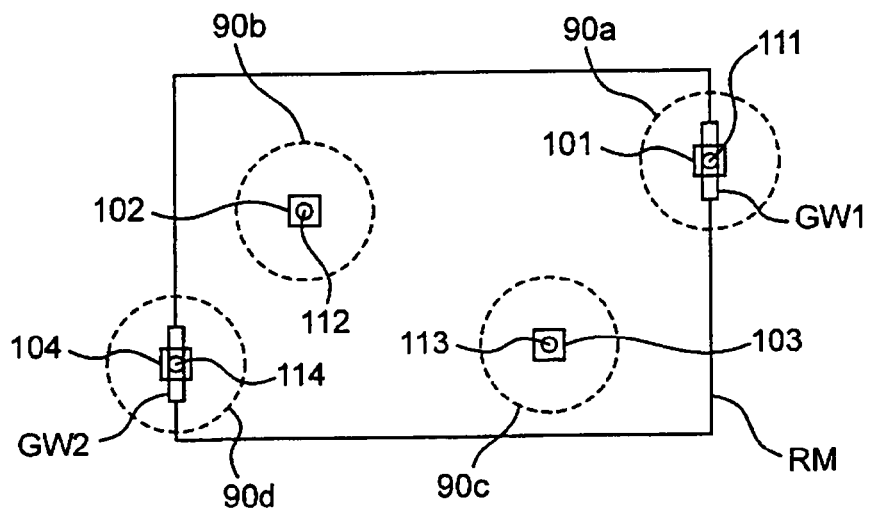
FIG. 1C is a view showing another example of installation of wireless tag readers of the object detecting device according to the first embodiment of the present invention.

Note that although one tag reader is set such that the detection range thereof comes around the gateway GW in FIG. 1A, it is not necessarily the case. It is also acceptable that the detection ranges 90*b* and 90*c* of the wireless tag readers 102 and 103 are not set around the gateway GW as shown in FIG. 1B, or the detection ranges 90*a*, 90*b*, 90*c*, and 90*d* of the wireless tag readers 101, 102, 103, and 104 are provided at gateways GW1 and GW2 provided at two places, as shown in FIG. 1C. The detection ranges can be set appropriately depending on the size of the room RM, desired detecting performance, varieties of movement lines of humans, or the like. The detection range of a wireless tag reader may be set only around the gateway GW of each room RM.

Note that the readout frequency is not necessarily once per second. The optimum frequency can be set corresponding to the moving speed of a human moving an object, or the like. For example, in the case of corresponding to a fast moving speed, it is only necessary to increase the readout frequency.

Figure 1D:
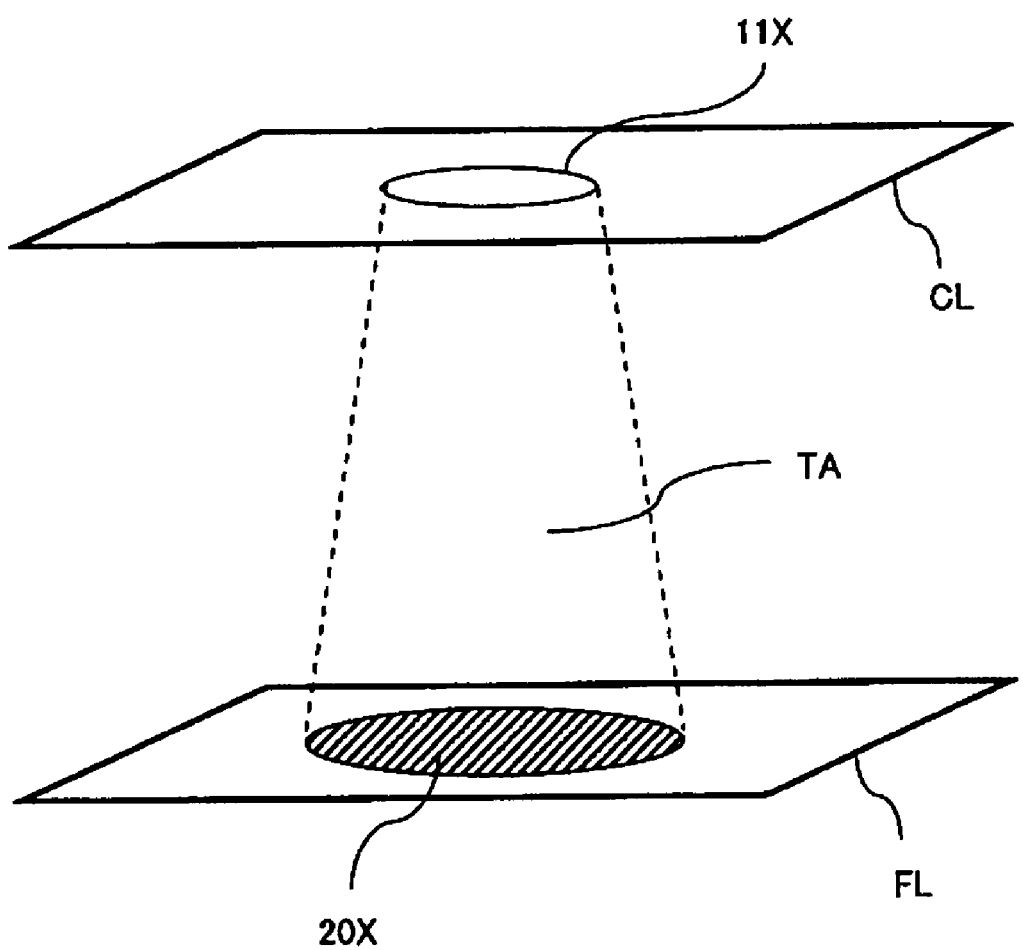
FIG. 1D is a view showing installation of an antenna of a wireless tag reader and a human detection sensor in the object detecting device according to the first embodiment of the present invention.

The wireless tag readers 101 to 104 read out ID information of all objects with tags provided within the detection ranges 90*a* to 90*d*. As the wireless tag readers 101 to 104, one of the UHF band (near 950 MHz, radio wave system) is to be used. As a characteristic of the UHF band, the radio wave reaching distance is about 4 m at maximum, which is relatively large. Further, the wireless tag readers 101 to 104 of the UHF band have longer wavelength, compared with 2.45 GHz band which is also the radio wave system, so that there is an advantage that a radio wave easily turns around behind an obstacle due to diffraction. Further, the wireless tag readers 101 to 104 of the UHF band have an advantage that they are less absorbed into water, compared with the 2.45 GHz band. Since the reaching distance of a radio wave is about 4 m in the wireless tag readers 101 to 104 of the UHF band, it is possible to read out ID information of an object with a wireless tag that is held by a human when the human passes under or above the wireless tag readers 101 to 104, by setting the antennas 111, 112, 113, and 114 behind the ceiling of the room RM to thereby emit radio waves vertically downward, or by setting the antennas 111, 112, 113, and 114 under the floor of the room RM to thereby emit radio waves vertically upward. FIG. 1D is an example where an antenna 11*x* of a wireless tag reader is set behind the ceiling CL. When a radio wave is emitted vertically downward from the antenna 11*x*, an area TA becomes the detection range. FL indicates the floor surface.

Of course, other passive-type wireless tags and active-type wireless tags of e.g. 13.56 MHz band (electromagnetic guidance system) and 2.45 GHz band (radio wave system) etc. can also be used. In the case of a system of 13.56 MHz band, the readout distance is as short as about 80 cm at most. Therefore, it is necessary to take measures such as arranging a plurality of antennas on the side faces of a relatively narrow passage so as to generate a magnetic field in a horizontal direction to thereby enable stable readout of a wireless tag held by a human passing through. In the case of 2.45 GHz band, the readout distance is up to about 2 m, so when a radio wave is emitted vertically, it is only necessary to take measures such as setting antennas on the ceiling CL and under the floor.

The first embodiment of the present invention has such an effect that even in the case of using a passive-type wireless tag having a narrow detection range, it is possible to detect ID information and positional information of an object even outside the detection range of the passive-type wireless tag by associating with a camera. Moreover, in the case of using an active-type wireless tag having a wide detection range, it can be used for monitoring a wide area which may not be fully detected even by an active-type wireless tag.

The human detection sensors 201 to 203 output presence or absence of a human within the detection ranges 90*a*, 90*b*, and 90*c* as binary information. As examples of the human detection sensors 201 to 203, a floor pressure sensor or an infrared ray sensor can be used. After previously measuring the detection ranges of the wireless tag readers 101 to 104, the detection ranges of the human detection sensors 201 to 203 are set correspondingly. FIG. 1D shows an example in which a floor pressure sensor is disposed corresponding to the detection range TA of the antenna 11X of a wireless tag reader. The circular shaded part shows the detection range of the floor pressure sensor (an example of a human detection sensor) 20X disposed on the floor surface FL.

Further, in the case where a tag is also given to a human in addition to an object, the wireless tag readers 101 to 103 may detect the tag given to the human so as to be used instead of the human detection sensors 201 to 203.

Figure 1E:
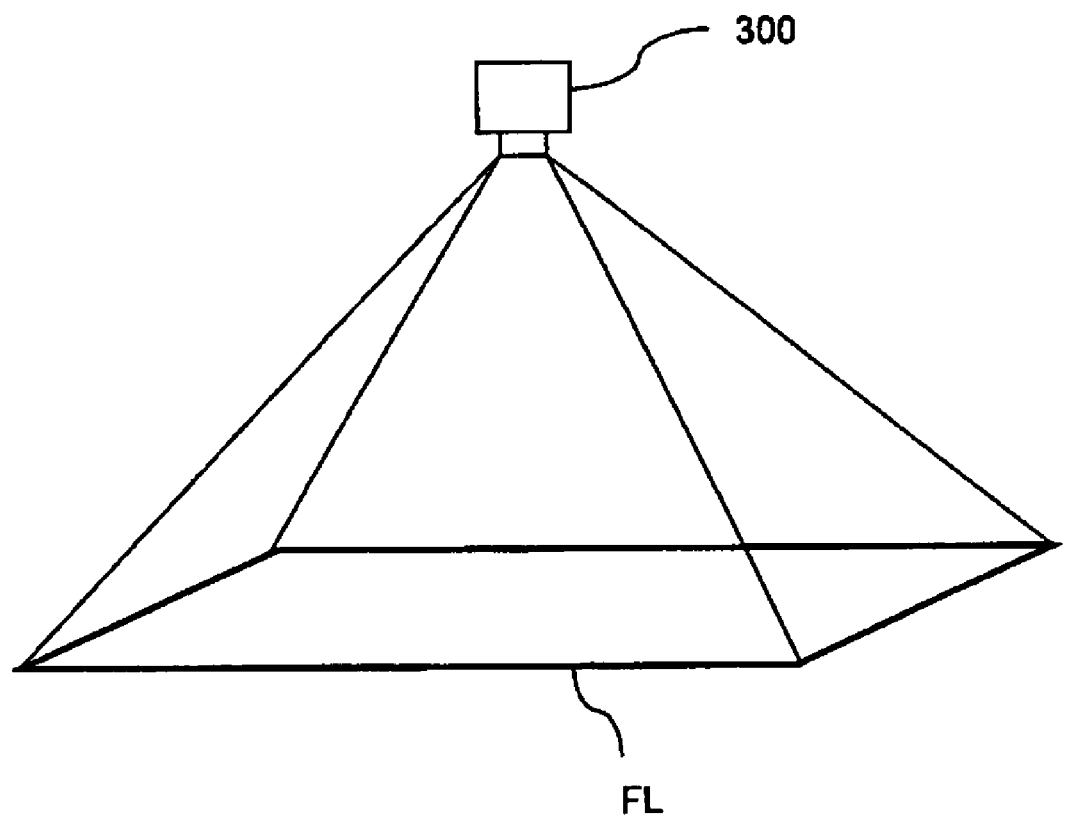
FIG. 1E is a view showing installation of a camera in the object detecting device according to the first embodiment of the present invention.

The camera 300 is disposed such that the whole floor surface FL of the room RM is included in the field of view thereof. For example, as shown in FIG. 1E, it can be realized by setting the wide angle camera 300 on the ceiling CL near the center of the room RM such that the optical axis is directed vertically downward. The camera 300 picks up an image at a frame rate 30 fps for example, and transmits the picked up image to the storing means 400.

The storing means 400 stores data which is the readout result of the wireless tag readers 101 to 103, data which is the readout result of the human detection sensors 201 to 203, and data of the picked up images by the camera 300, by associating them with the obtained times of the respective pieces of data obtained from the timer means 600 by using the timer means 600. Note that the storing means 400 may be connected with a storing means management unit 507 for managing data in the storing means 400, as described later.

Note that the frame rate of the camera 300 is not necessarily 30 fps. It may be set to an optimum frequency via the input/output unit 700, corresponding to, for example, the moving speed of a human who moves the object.

In FIG. 1A, three wireless tag readers, three human detection sensors, and one camera are provided, but they may be in different numbers.

Next, detection data of various sensors such as the wireless tag readers 101 to 103, the human detection sensors 201 to 203, and the camera 300, stored in the storing means 400, will be described. A case where a human handling an object moves within the room RM as a movement line ML in FIG. 2 will be considered. It is assumed that a human entered the room RM through the gateway GW while holding an object A, and on the way, at the place L1, the human released the object A by placing it on a table Tb near the place L1, then picked up a new object B at the place L2, and left the room RM through the gateway GW.

FIG. 3 shows the outputs of the wireless tag readers 101, 102, and 103 and the human detection sensors 201, 202, and 203 obtained at this time. As described above, the wireless tag readers 101, 102, and 103 and the human detection sensors 201, 202, and 203 perform readout at a frequency of once per second. In FIG. 3, the readout timing of the wireless tag readers 101, 102, and 103 and the human detection sensors 201, 202, and 203 are synchronized, but they are not necessarily synchronized. If they are not synchronized, it is only necessary to associate data with data of the closest readout time.

In FIG. 3, during the time 0 to 2 (unit: second), presence of a human is detected by the human detection sensor 201, and at the same time, an object A is detected by the wireless tag reader 101.

During the time from 14 second to 17 second, presence of a human is detected by the human detection sensor 202. In this case, the wireless tag reader 102 and the human detection sensor 202 are set such that the detection ranges thereof become the same. Therefore, if the human holds the object A during the time from 14 to 17 seconds, the wireless tag reader 102 should detect the object A. However, in the time from 14 to 17 seconds, the object A is not detected by the wireless tag reader 102. Therefore, it can be interpreted that the human released the object A before the time 13 second.

Then, during the time from 31 to 33 seconds, presence of a human is detected by the human detection sensor 203, and at the same time, an object B is detected by the wireless tag reader 103.

During the time from 41 to 42 seconds, presence of a human is detected by the human detection sensor 201, and at the same time, the object B is detected by the wireless tag reader 101. Therefore, it can be interpreted that the human left the room RM while holding the object B.

From the description above, when the data as shown in FIG. 3 is obtained, it can be interpreted by the object detection means 500 that the human released the object A held by him/her at a time during the time from 3 to 13 seconds, and picked up the object B from somewhere in the room RM at a time during the time from 18 to 30 seconds.

The object detection means 500 detects an object by using detection data of various sensors stored in the storing means 400. The object detection means 500 includes: a time zone specifying unit 501 for specifying a time zone during which presence of a human is detected continuously and specifying the total number N of time zones; an object ID obtaining unit 502 for obtaining data relating to object ID information corresponding to a time zone; an object ID comparing unit 503 for comparing data relating to the object ID information obtained by the object ID obtaining unit 502 and determining whether they coincide; an image data selecting unit 504 for selecting image data to be used for detecting the object position; an object detection unit 505 for detecting the position of the object by calculating differences between a plurality of images selected by the image data selecting unit 504; and an index management unit 506 for managing indexes.

FIG. 4 is a flowchart showing the object detecting method performed by the object detection means 500 in the object detecting device of the first embodiment.

Hereinafter, object detection processing of the object detecting device and the object detecting method according to the first embodiment will be described in accordance with the flowchart of FIG. 4.

First, in the step SA0 to be carried out by the time zone specifying unit 501, the time zone specifying unit 501 specifies time zones in which a single human detection sensor continuously detects presence of a human and the total number N of the time zones. In the data of FIG. 3, it can be specified by the time zone specifying unit 501 that a specific human position sensor continuously detects presence of a human in the time from 0 to 2 seconds, the time from 14 to 17 seconds, the time from 31 to 33 seconds, and the time from 41 to 42 seconds. Therefore, the time from 0 to 2 seconds is set as a time zone TZ1, the time from 14 to 17 seconds is set as a time zone TZ2, the time from 31 to 33 seconds is set as a time zone TZ3, and the time from 41 to 42 seconds is set as a time zone TZ4. As a result, in the data of FIG. 3, the total number N of the time zones is N=4.

Next, in the steps SA1 and SA2 to be carried out by the index management unit 506, the index management unit 506 performs initialization of indexes i and j indicating the two time zones to be compared. That is, it is set that in the step SA1, the index i=1, and in the step SA2, the index j=i+1.

Next, in the step SA3 to be carried out by the object ID obtaining unit 502, the object ID obtaining unit 502 obtains (a combination of) data relating to object ID information corresponding to the time zones TZi and TZj (in the first time, TZ1 and TZ2 respectively). From the data of FIG. 3, in the time zone TZ1, the wireless tag reader 101 detects data relating to ID information of the object A (e.g., data indicating that ID information exists, and data indicating the ID information itself), and in the time zone TZ2, the object ID obtaining unit 502 obtains data relating to object ID information that the wireless tag reader 102 does not detect anything (e.g., data indicating that no ID information exists).

Next, in the step SA4 to be carried out by the object ID comparing unit 503, the object ID comparing unit 503 compares the pieces of data relating to the two object ID information obtained by the object ID obtaining unit 502 in the step SA3, and determines whether they coincide or not. In this case, it is determined by the object ID comparing unit 503 that the pieces of data relating to the two object ID information do not coincide (that is, the pieces of data relating to the two object ID information are different from each other), so the processing proceeds to the image data selecting step SA7.

If the object ID comparing unit 503 determines that the pieces of data of the two object IDs coincide, image data selection and object detection (steps SA7 and SA8) will not be performed since it is understood that there is no handling of an object during the period from the time zone TZ1 to the time zone TZ2. In other words, in the step SA5, after the index management unit 506 checks whether the index j is not less than N, if the index management unit 506 determines that the index j is less than N, the index management unit 506 increments the index j by 1 in the step SA6 (the detection result in another time zone of the wireless tag reader is used) and performs the steps SA3 and the step SA4 again. In the step SA5, if the index management unit 506 determines that the index j is not less than N, the object detection processing ends.

For the case where there are multiple pieces of data relating to the object ID information obtained by the object ID obtaining unit 502 in the step SA3, description will be given by using the example of FIG. 5. In the time zone TZi, the wireless tag reader detects four objects A, B, C, and D, and in the time zone TZj, the wireless tag reader detects three objects A, B, and D. In this case, since the combinations of objects are different, image data selection and object detection (steps SA7 and SA8) will be performed.

Next, in the step SA7 to be carried out by the image data selecting unit 504, image data to be used for detecting the object position is selected. From the data of FIG. 3, it is determined by the object ID comparing unit 503 that in the time zone TZ1, the wireless tag reader 101 detects data relating to the ID information of the object A, and in the time zone TZ2, the wireless tag reader 102 detects data relating to the object ID information indicating that ID information of the object has not been detected. That is, in the time zone TZ1, it can be estimated by the object ID comparing unit 503 that the object A placed within the detection range 90a of the wireless tag reader 101 or held by a human within the detection range 90a of the wireless tag reader 101 is moved to the outside of the detection range of the wireless tag reader during the time from 3 to 13 seconds.

In other words, as shown in FIG. 6A, it is determined by the object ID comparing unit 503 that in an image Ia picked up by the camera 300 at a time (e.g., time 2 second) in the time zone TZ1, the object A (shown by OA in the figure) is present within the detection range 90a of the human detection sensor 201 and the wireless tag reader 101 together with a human (shown by HM in the figure), and in an image Ib picked up by the camera 300 at a time (e.g., time 14 second) in the time zone TZ2, the object A is present outside the detection ranges 90a, 90b, and 90c of the wireless tag readers 101, 102, and 103. In the step SA7, such images Ia and Ib are selected by the image data selecting unit 504 from the storing means 400.

Figure 6C:
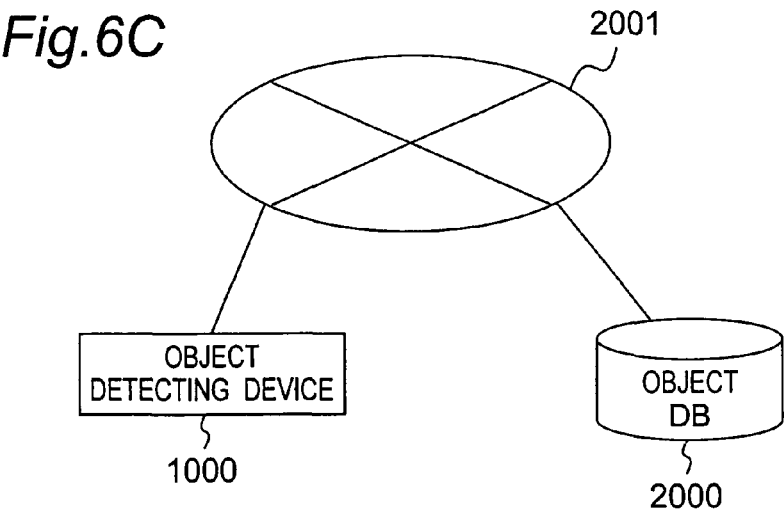
FIG. 6C is a view showing a connection between the database storing the various kinds of information corresponded to the ID information of the object and the object detecting device that is used by the object detecting device according to the first embodiment of the present invention.

Next, in the step SA8 to be carried out by the object detection unit 505, the position of the object A is determined by calculating the difference between the image Ia and the image Ib. For example, the center of gravity of the area obtained from the difference is determined as the position of the object A by the object detection unit 505. If the camera 300 is a black and white camera, the difference is calculated by the object detection unit 505 by using brightness information. If the camera 300 is a color camera, the difference may be calculated by the object detection unit 505 by using the brightness information, or may be calculated by the object detection unit 505 by using any value of RGB. At this time, if there is color information, size information, shape information, or the like corresponded to the ID information of the object A, difference calculation may be performed by the object detection unit 505 by using one or a plurality of them. Various kinds of information corresponded to the ID information of the object can be managed in a database in a table form as shown in FIG. 6B for example. "Spectral reflectance (color) XXX" in FIG. 6B can be expressed by holding e.g. the graph shown in FIG. 7B as a continuous function or a discrete function. "Shape YYY" in FIG. 6B can be expressed by using a typical three-dimensional model in computer graphics or the like. Further, the database in a table form as shown in FIG. 6B, in other words, an object information database (object information DB) 2000, can be connected with the object detecting device 1000 via a network 2001 such as the Internet, a dedicated line, or a public line, as shown in FIG. 6C. Of course, the object detecting device 1000 and the object information DB 2000 may be connected directly.

Figure 7A:
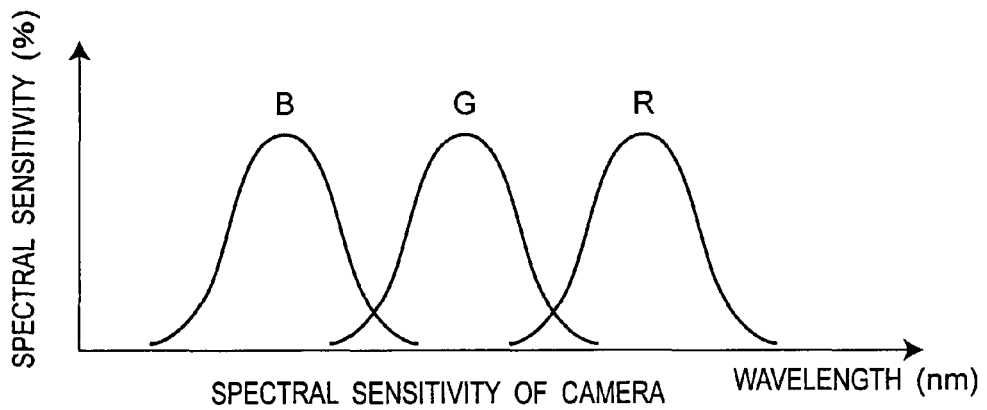
FIG. 7A is a graph showing spectroscopic sensitivity of a color camera, spectroscopic reflectance of a subject, and spectroscopic reflectance of the background.
Figure 7B:
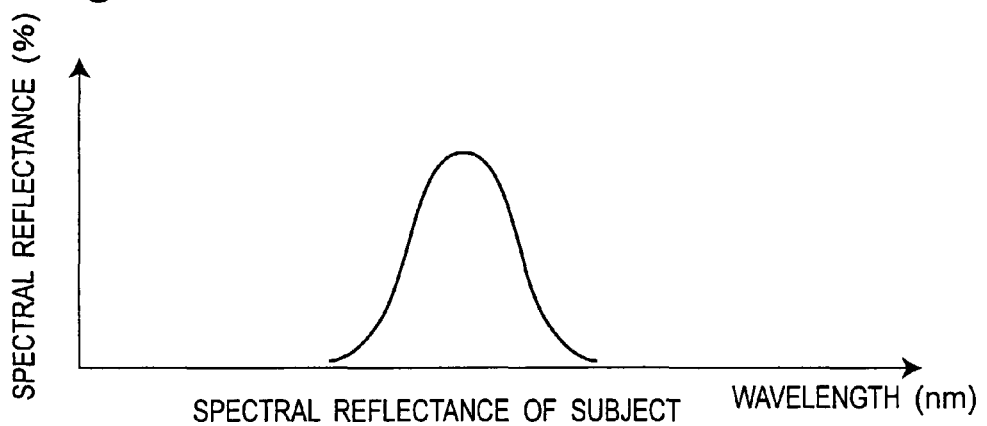
FIG. 7B is a graph showing spectroscopic sensitivity of a color camera, spectroscopic reflectance of a subject, and spectroscopic reflectance of the background.
Figure 7C:
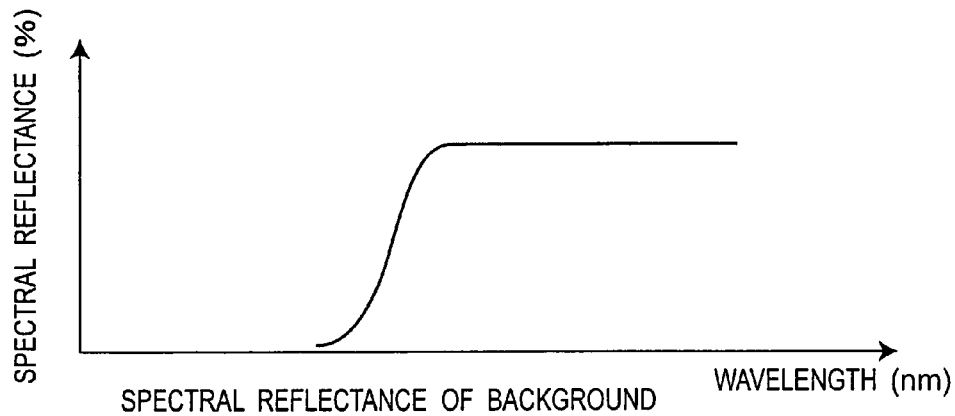
FIG. 7C is a graph showing spectroscopic sensitivity of a color camera, spectroscopic reflectance of a subject, and spectroscopic reflectance of the background.

For example, a case in which a color camera having a spectral sensitivity as shown in FIG. 7A is used as the camera 300 (reference marks "B", "G", and "R" in FIG. 7A correspond to blue spectral sensitivity, green spectral sensitivity, and red spectral sensitivity, respectively), and a (green) subject having a spectral reflectance as shown in FIG. 7B is separated from the (yellow) background having a spectral reflectance as shown in FIG. 7C will be considered. If a typical white lighting is used, although difference is calculated by the object detection unit 505 by using B (blue) component or G (green) component of the color camera, a brightness difference will not be caused a lot, so that the object cannot be detected clearly. However, if R (red) component is used, a brightness difference is caused, so that the object can be detected clearly. At which brightness an image is picked up in each channel of the color camera is determined depending on the spectral energy characteristic $E(\lambda)$ of illuminating light, spectral sensitivity characteristics $S_R(\lambda)$, $S_G(\lambda)$, $S_B(\lambda)$ for each channel of the color camera, and the spectral reflectance characteristic $R(\lambda)$ of the subject, as shown in (Equation 1).

$$R = c\int E(\lambda)R(\lambda)S_R(\lambda)d\lambda$$

$$G = c\int E(\lambda)R(\lambda)S_G(\lambda)d\lambda$$

$$B = c\int E(\lambda)R(\lambda)S_B(\lambda)d\lambda \quad \text{[Equation 1]}$$

where c is a constant.

Accordingly, if the spectral characteristics of illuminating light, spectral sensitivity characteristics of the camera, and spectral reflectance of the background are obtained or measured previously, and the ID information of the object and the spectral reflectance thereof are previously correlated with each other and stored in the storing means 400, a color channel effective for differencing can be determined from the ID information of an object desirable to be detected, by the object detection unit 505.

If spectral reflectance at one point on the subject is desired to be obtained, a commercially available spectral calorimeter or the like can be used. Further, if spectral reflectances at multiple points on the subject are desired to be obtained, the following method using the camera 300 can be used.

Figure 8A:
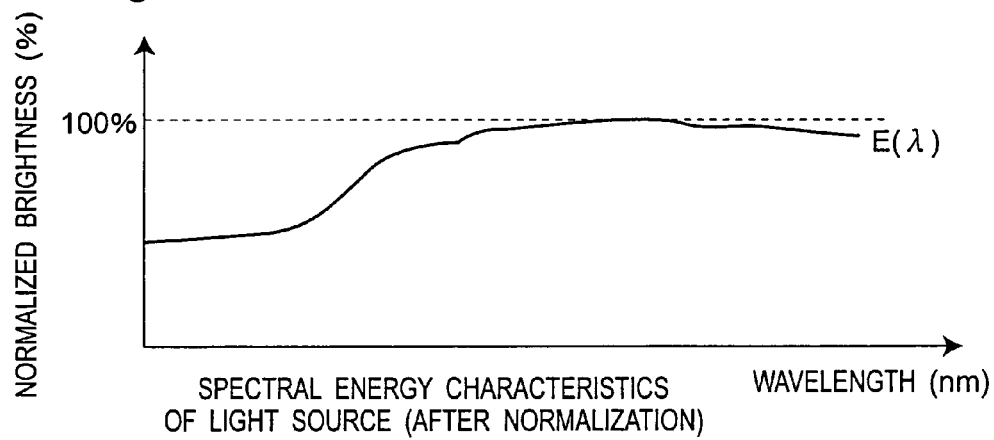
FIG. 8A is a graph showing a plurality of wavelength characteristics required for calculating spectroscopic reflectance.
Figure 8B:
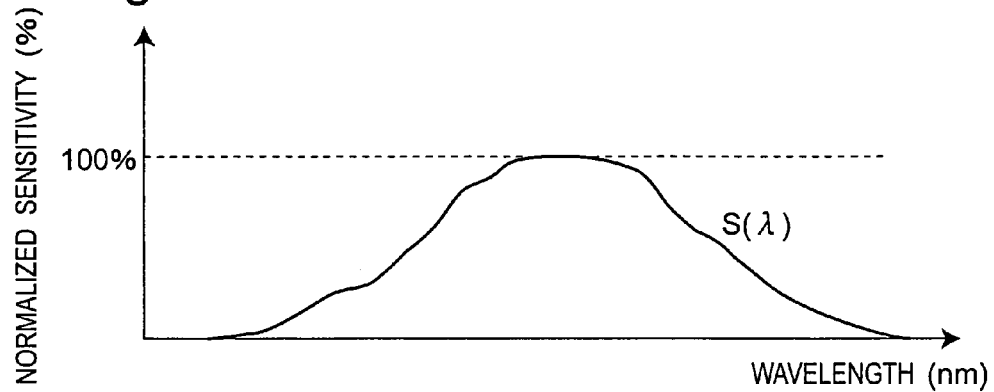
FIG. 8B is a graph showing a plurality of wavelength characteristics (spectroscopic sensitivity characteristics of sensor (including transmittance of color filter, after normalization)) required for calculating spectroscopic sensitivity.

In the case of the present object to determine a color channel effective for differencing, there is no need to obtain an absolute value of the spectral reflectance. It is only necessary to obtain a relative value of the spectral reflectance such as the maximum being 1. In order to obtain such spectral reflectance, the brightness of the subject (in this case, background of the room RM) is measured for each wavelength by using a light source in which the spectral energy characteristics (e.g., $E(\lambda)$ in FIG. 8A) are known and using as the camera 300 a camera in which the spectral sensitivity characteristics (e.g., $S(\lambda)$ in FIG. 8B) are known.

$$R(\lambda) = k \cdot \frac{x(\lambda)}{E(\lambda)S(\lambda)} \quad \text{[Equation 2]}$$

where k is a constant.

Figure 8C:
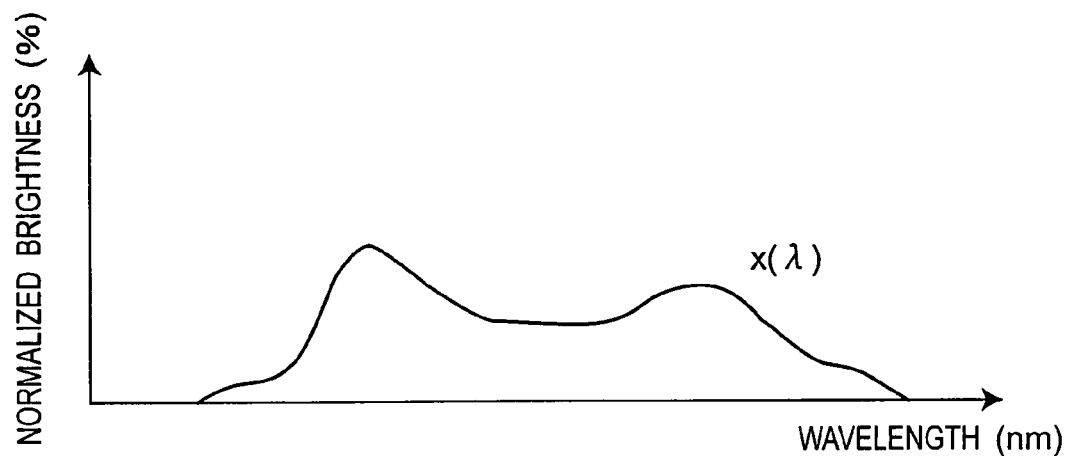
FIG. 8C is a graph showing a plurality of wavelength characteristics (spectroscopic characteristics of the brightness obtained by measuring one point on the background by a sensor having the spectroscopic sensitivity of FIG. 8B) required for calculating spectroscopic reflectance.

As a result, after obtaining $x(\lambda)$ in FIG. 8C, the object detection unit 505 divides the measured brightness $x(\lambda)$ by $E(\lambda)$ and $S(\lambda)$ to thereby obtain a relative value $R(\lambda)$ of the spectral reflectance of the subject, as equation 2. To measure the brightness of the subject for each wavelength, a liquid crystal tunable filter in which the passing wavelength area is changeable electrically, or the like, is set in front of the camera, and by shifting the passing wavelength, the same subject is image-picked-up for the number of passing wavelength bands to be used.

Figure 9:
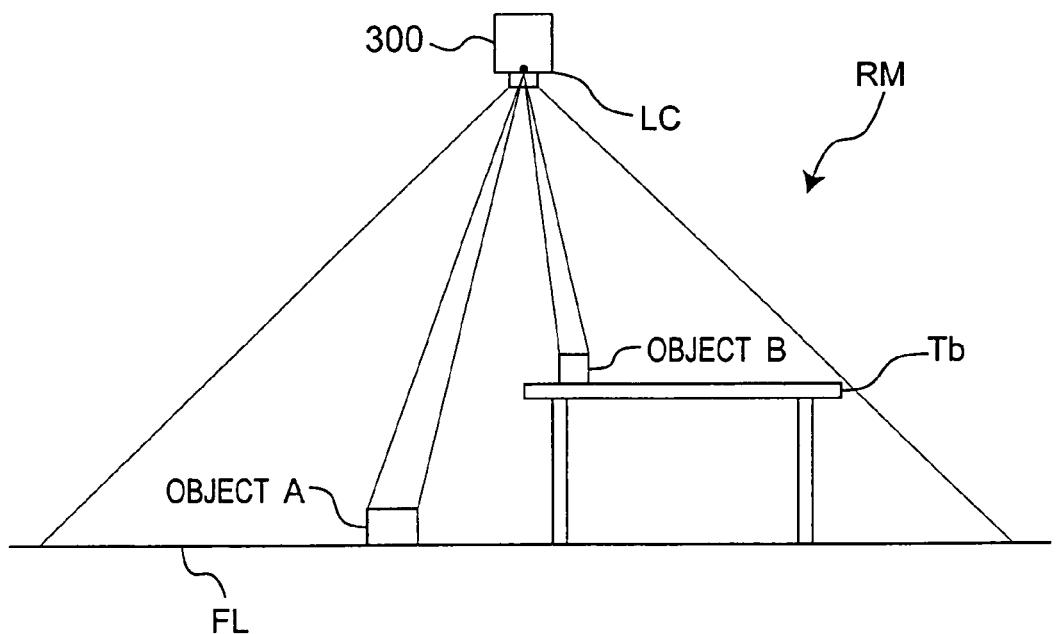
FIG. 9 is a view showing a state of picking-up images of objects disposed on the floor and on a table respectively from above.
Figure 10:
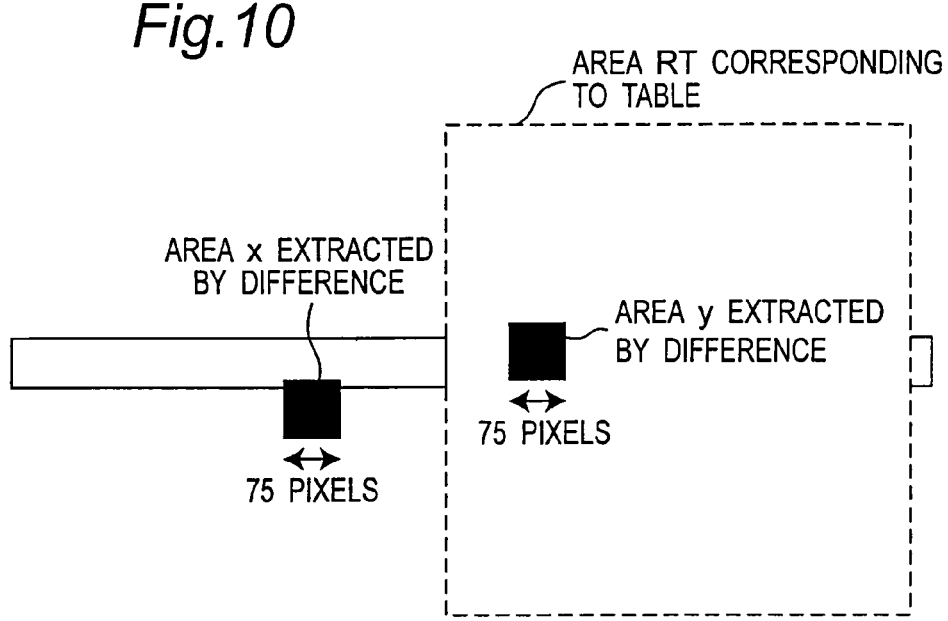
FIG. 10 is a view showing a difference between images picked up by the camera of FIG. 9.

Similarly, if actual size information can be obtained from object ID information, the size (number of pixels) of the object to be taken in the picked up image can be estimated from the setting position of the camera and the shape of the room RM. Therefore, if a plurality of objects are detected from the difference, an object having ID information of the detection target can be narrowed down by using the size (number of pixels) by the object detection unit 505. For example, as shown in FIG. 9, a case where the object A and the object B are placed in the room RM where a table Tb is provided, and images are picked up by the camera 300 from above is considered. FIG. 10 shows an example of a difference of images picked up by the camera 300 in FIG. 9. It is assumed that an area x and an area y are extracted from the difference in images by the object detection unit 505. The shape of each of both areas x and y is assumed to be a square having 50 pixels on a side. If it is understood that the objects A and B are placed in the room RM from outputs of the wireless tag readers, the areas x and y and the objects A and B must be corresponded to each other. In this case, although correspondence is difficult only with the information of difference image in FIG. 10, if the shape of the room RM (including the size, height, and setting position of the table Tb) has been known (for example, the case where data of the shape of the room RM such as size, height, and setting position of the table Tb, size information of the object associated with the RFID tag, and information corresponded to the object ID information (e.g., color, size, and shape information of the object) are stored in the storing means 400), the size of the object in the image can be estimated by the object detection unit 505 from the size of the object associated with the RFID tag. By using the most simple approximation that the size projected in an image plane is determined by the height from the floor surface FL, assuming that the height of the table Tb is H, and the distance between the lens center LC of the camera 300 and the floor surface FL is 3H in FIG. 9, the size of the object in the area RT corresponding to the upper face of the table Tb is 1.5 times as large as that in other areas. For example, a subject having an actual length of 10 cm is projected to be 75 pixels in the area RT corresponding to the upper face of the table Tb, and is projected to be 50 pixels in the area of the floor surface FL in the image plane of FIG. 10. If it is determined, from the size and shape information corresponded to the object ID information, that the upper face of the object A is a square having 15 cm on a side and the upper face of the object B is a square having 10 cm on a side, it can be estimated by the object detection unit 505 that the area x is the object A and the area y is the object B.

Similarly, in the case where shape information of an object can be obtained from object ID information, if a plurality of objects are detected from differences, objects can be narrowed down by using the shape by the object detection unit 505. This method is particularly effective for e.g. a spherical object in which the shape of the object in the picked up image will not change depending on the posture of the object in the real world.

Figure 11A:
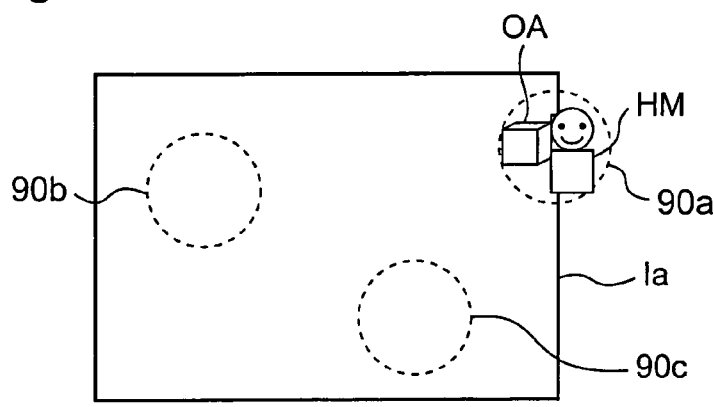
FIG. 11A is a view showing a state of calculating a difference image by using the detection range of a human detection sensor as a mask area.
Figure 11B:
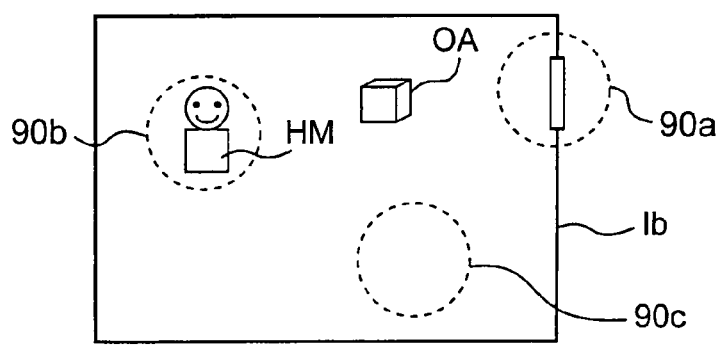
FIG. 11B is a view showing the state of calculating the difference image by using the detection range of the human detection sensor as the mask area.
Figure 11C:
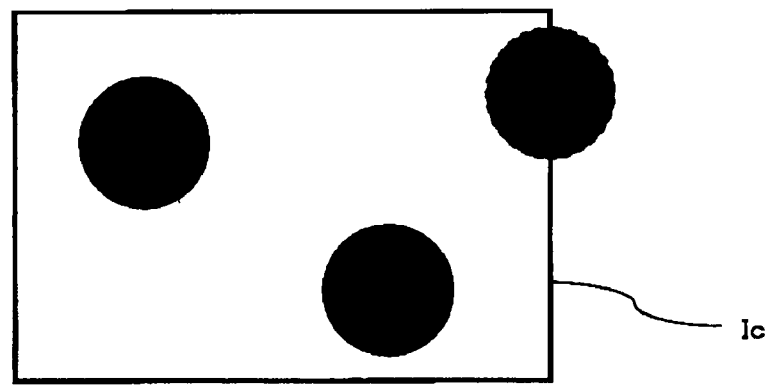
FIG. 11C is a view showing the state of calculating the difference image by using the detection range of the human detection sensor as the mask area.
Figure 11D:
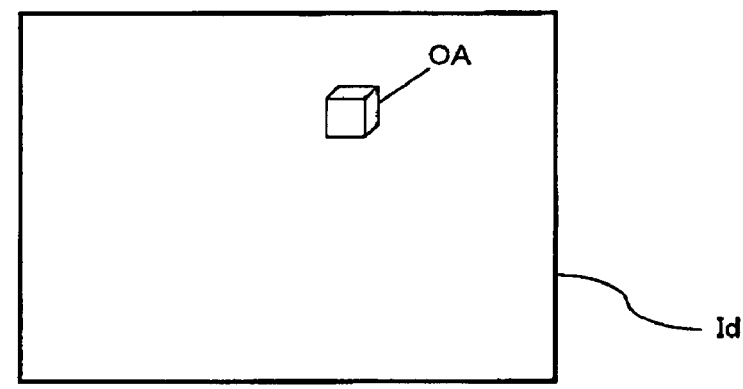
FIG. 11D is a view showing the state of calculating the difference image by using the detection range of the human detection sensor as the mask area.

Note that in calculating a difference, a difference may be calculated by the object detection unit 505, excluding the detection range of the human detection sensor. When the difference is calculated by the object detection unit 505, a human handling the object may also be detected, beside the object desirable to be detected. In the case of setting the camera 300 at a place sufficiently high in the room RM and picking up an image while directing the optical axis vertically downward, when an image in the time zone in which the human detection sensor performs detection is used, a human is present within the detection range of the human detection sensor, as shown in FIG. 6A. Therefore, as shown in FIGS. 11A to 11D, by performing calculation excluding the detection ranges 90a, 90b, and 90c of the human detection sensors 201, 202, and 203, that is, by calculating the difference by the object detection unit 505 using the mask image of the image Ic, only the object can be detected by the object detection unit 505 as in the image Id. FIG. 11A shows an image Ia in which the object A (shown by OA in the figure) is present with a human (shown by HM in the figure) in the detection range 90a of the wireless tag reader 101 and the human detection sensor 201. FIG. 11B shows an image Ib in which the object A is left on the floor surface between the detection range 90a and the detection range 90b, and only a human is present in the detection range 90b of the wireless tag reader 102 and the human detection sensor 202. FIG. 11C shows an image Ic in which the detection ranges 90a, 90b, and 90c (black parts in FIG. 11C) of the human detection sensors 201, 202, and 203 are masked. FIG. 11D shows a difference image Id between the image Ia and the image Ib obtained by using the mask areas which are indicated by the black parts in the image Ic, in which only the object A is detected.

Note that the following processing may be performed by the object detection unit 505 instead of calculating the difference by the object detection unit 505 by excluding the detection ranges 90a, 90b, and 90c of the human detection sensors.

Figure 12A:
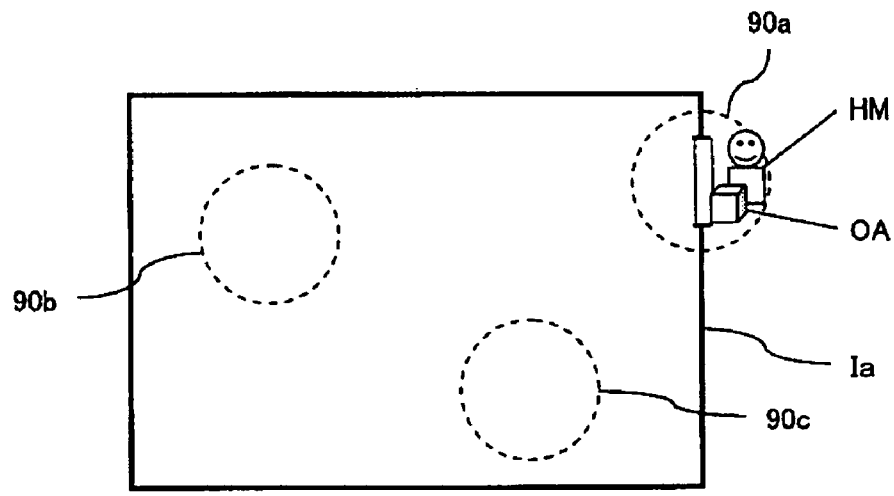
FIG. 12A is a view showing a method of detecting an area of a human by using two images picked up at different times from a time zone TZ1.
Figure 12B:
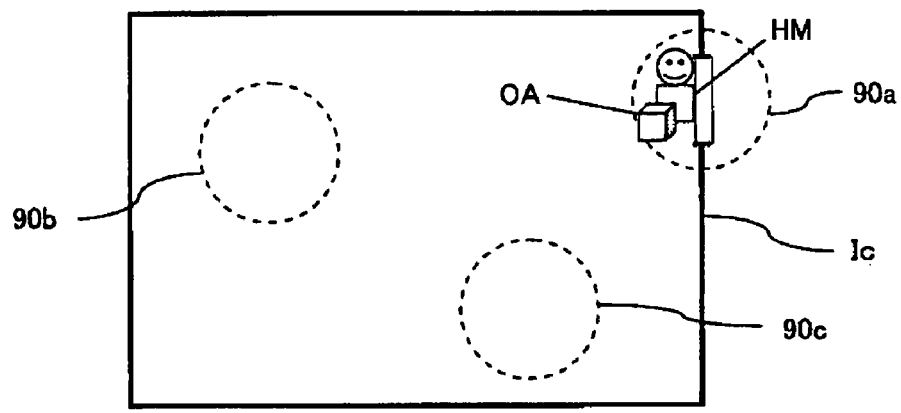
FIG. 12B is a view showing the method of detecting the area of the human by using the two images picked up at the different times from the time zone TZ1.
Figure 12C:
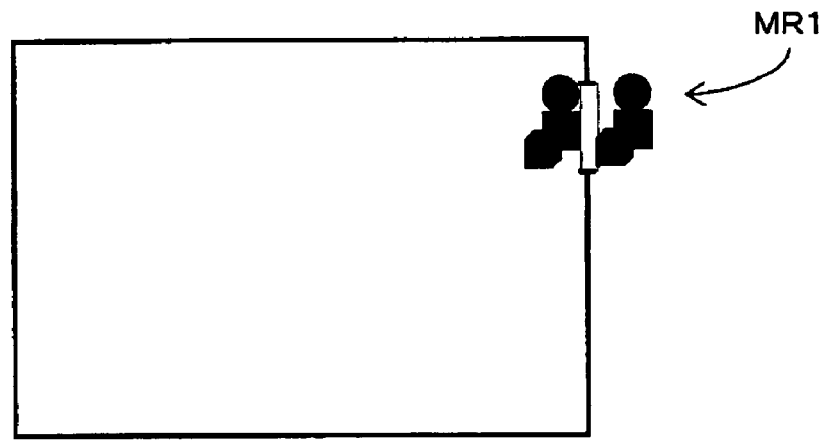
FIG. 12C is a view showing the method of detecting the area of the human by using the two images picked up at the different times from the time zone TZ1.

In calculating the difference, as shown in FIGS. 12A to 12C, two images Ia and Ic that of which the obtained times are different are selected from the time zone TZ1, and then the changed area is calculated by the object detection unit 505 from the difference between them, whereby a first mask area MR1 is determined by the object detection unit 505. FIG. 12A shows the image Ia in which the object A (shown by OA in the figure) is present together with a human (shown by HM in the figure) in the detection range 90a of the wireless tag reader 101 and the human detection sensor 201. FIG. 12B shows the image Ic in which the object A (shown by OA in the figure) together with a human (shown by HM in the figure) in the detection range 90a of the wireless tag reader 101 and the human detection sensor 201. FIG. 12C shows the first mask area MR1 (the mask part (the parts of the object A and the human in FIG. 12A and the parts of the object A and the human in FIG. 12B) is shown in black) obtained from the difference between the image Ia and the image Ic.

Figure 13A:
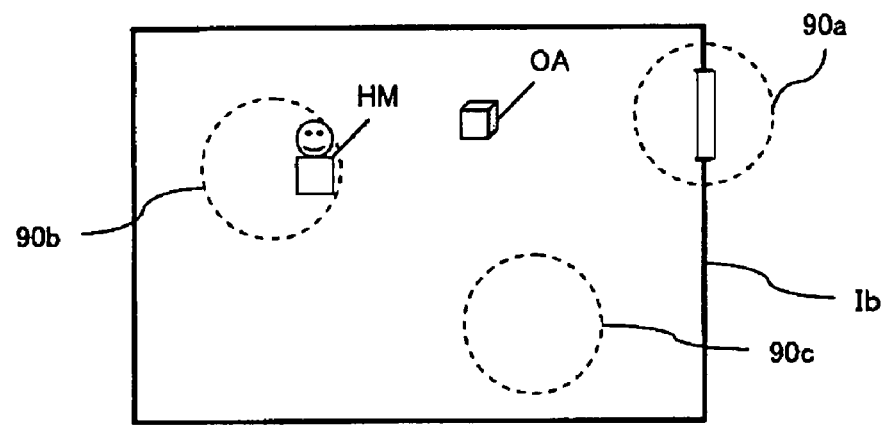
FIG. 13A is a view showing a method of detecting an area of a human by using two images picked up at different times from a time zone TZ2.
Figure 13B:
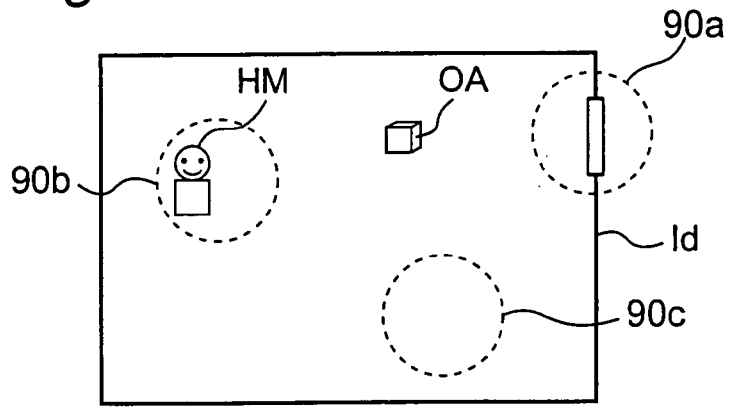
FIG. 13B is a view showing the method of detecting the area of the human by using the two images picked up at the different times from the time zone TZ2.
Figure 13C:
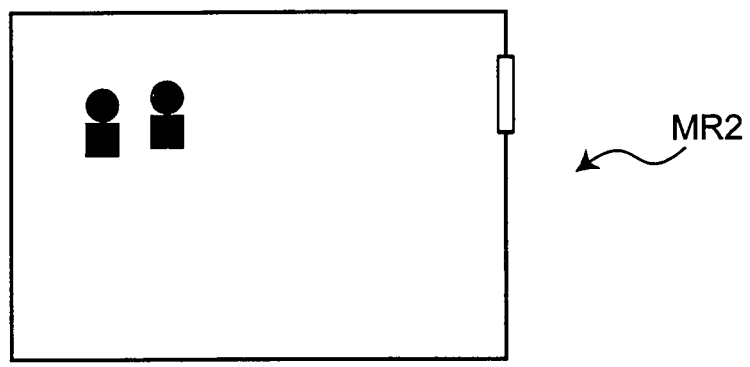
FIG. 13C is a view showing the method of detecting the area of the human by using the two images picked up at the different times from the time zone TZ2.

Further, as shown in FIGS. 13A to 13C, two images Ib and Id of which the obtained times are different from each other are selected from the time zone TZ2, and then the changed area is calculated by the object detection unit 505 from the difference between them, whereby a second mask area MR2 is determined by the object detection unit 505. FIG. 13A shows the image Ib in which the object A (In the figure, shown by OA) is left on the floor surface between the detection range 90a and the detection range 90b, and only a human (In the figure, shown by HM) is present in the detection range 90b of the wireless tag reader 102 and the human detection sensor 202. FIG. 13B shows the image Id in which the object A is left on the floor surface between the detection range 90a and the detection range 90b, and only the human is present in the detection range 90b of the wireless tag reader 102 and the human detection sensor 202. FIG. 13C shows the second mask area MR2 (the mask area (the human part in FIG. 13A and the human part in FIG. 13B) is shown in black) obtained from the difference between the image Ib and the image Id.

In calculating the difference between the image Ia (or Ic) and the image Ib (or Id), only the object A can be detected by calculating the difference by the object detection unit 505 while excluding the first mask area MR1 and the second mask area MR2.

In the step SA9, whether the index j is not less than N is checked by the index management unit 506. If the index management unit 506 determines that the index j is not less than N, the object detection processing ends.

If the index management unit 506 determines that the index j is less than N, in the step SA10, the index management unit 506 sets the value of the index i to the current value of the index j, and performs the step SA2 again. In this way, the object detection processing is performed to all the time zones specified in the step SA0.

At the point where the object detection step SA8 has been completed, the sensor data of the time prior to the time zone TZj may be deleted from the storing means 400 by the storing means management unit 507. If each piece of sensor data is used only for specifying the ID information and the position of the object, the capacity of the storing means 400 can be saved by deleting the processed sensor data from the storing means 400 by the storing means management unit 507 after the object detection by the object detection unit 505 was completed. Particularly, it is effective in the case of handling data of large information amount such as image data.

The input/output unit 700 is used as an interface between an operator and the object detecting device. When the operator wants to find the position of an object, that is, an article for example, the operator inputs the name of the article by using a keyboard, a mouse, a microphone (voice recognition), or the like. Further, the position of the article detected by the object detection means 500 is notified to the operator by a display monitor, a speaker, or the like. Further, if a self-propelled robot is introduced in the house in the future, it is possible to provide such a service that the positional information of the article is transmitted to the robot, and the robot travels inside the room RM and delivers the searched article to the operator.

As described above, the object detecting device and the object detecting method of the first embodiment include: the one or more wireless tag readers 101 to 104 for detecting the data relating to the object ID information of the object OA to which the wireless tag is given, in a space where the object is searched; the one or more human detection sensors 201 to 203 for detecting whether the human HM is present in the detection ranges 90a, 90b, 90c, and 90d of the wireless tag readers 101 to 104 in the space; the camera 300 for capturing a part or the whole of the space; the storing means 400 for storing the data relating to the object ID information detected by the wireless tag readers 101 to 104, the human detection data detected by the human detection sensors 201 and 203, and the image data picked up by the camera 300 by correlating them with the obtained times of the respective data; and the object detection means 500 for detecting the ID information and the position of the object OA based on the data relating to the object ID information, the human detection data, and the image data, stored in the storing means 400. Then, the object detection means 500 is so configured that when the object detection means 500 determines that pieces of data relating to first object ID data and second object ID information corresponding to the first time and the second time on which the human detection data indicating that the human HM is present is obtained are different from each other, the object detection means 500 calculates the difference between the first image data and the second image data respectively corresponding to the first time and the second time, and detects, as the position of the object OA, the position of the difference area in the image data or the position obtained by converting the position of the difference area into the position in the space where the object OA is searched. Accordingly, even for the object OA placed outside the detection ranges of the wireless tag readers 101 to 104, the ID information and the position of the object OA can be determined. Further, since images for which difference is calculated are selected by the object detection means 500 based on the outputs of the human detection sensors 201 to 203 and the wireless tag readers 101 to 104, there is no need to calculate differences for all images. This can reduce the computation amount.

Although the inventors of the present invention are also proposing the technique described below at the same time, the problems described below are still left.

Figure 14:
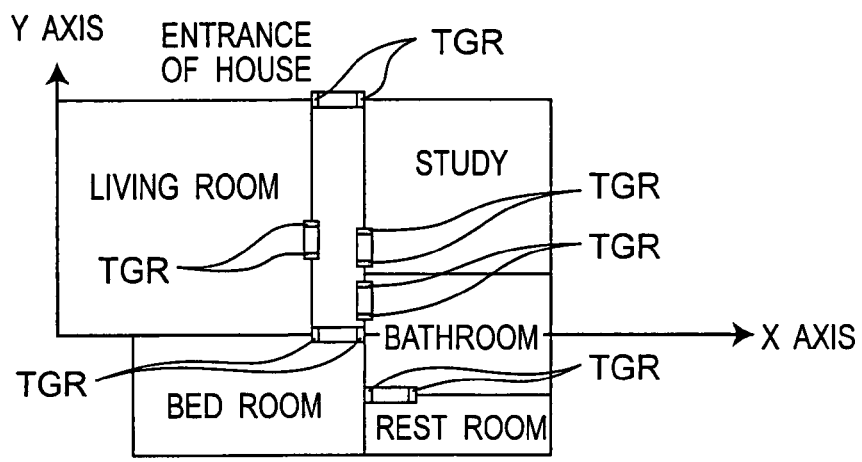
FIG. 14 is a view showing an arrangement of tag readers in another method proposed by the inventors.

As shown in FIG. 14, in the case where wireless tag readers TGR for identifying ID information of an object are provided at the gateways GW of rooms RM such as a living room, a study, a bedroom, a bathroom, and a rest room and a gateway GW which is the entrance of the house, and a human holding an object with an RFID tag passes through the gateway GW of each room RM, data relating to ID information of the object and the detected time are recorded in a database (e.g., the storing means 400). Further, by the human detection sensors 201 to 203 for detecting the position of the human handling the object, movement locus of the human in the house is obtained as shown in (b) of FIG. 15, and at the same time, the moved distance per unit time of the human, that is, speed information, is also obtained as shown in (a) of FIG. 15.

Figure 15:
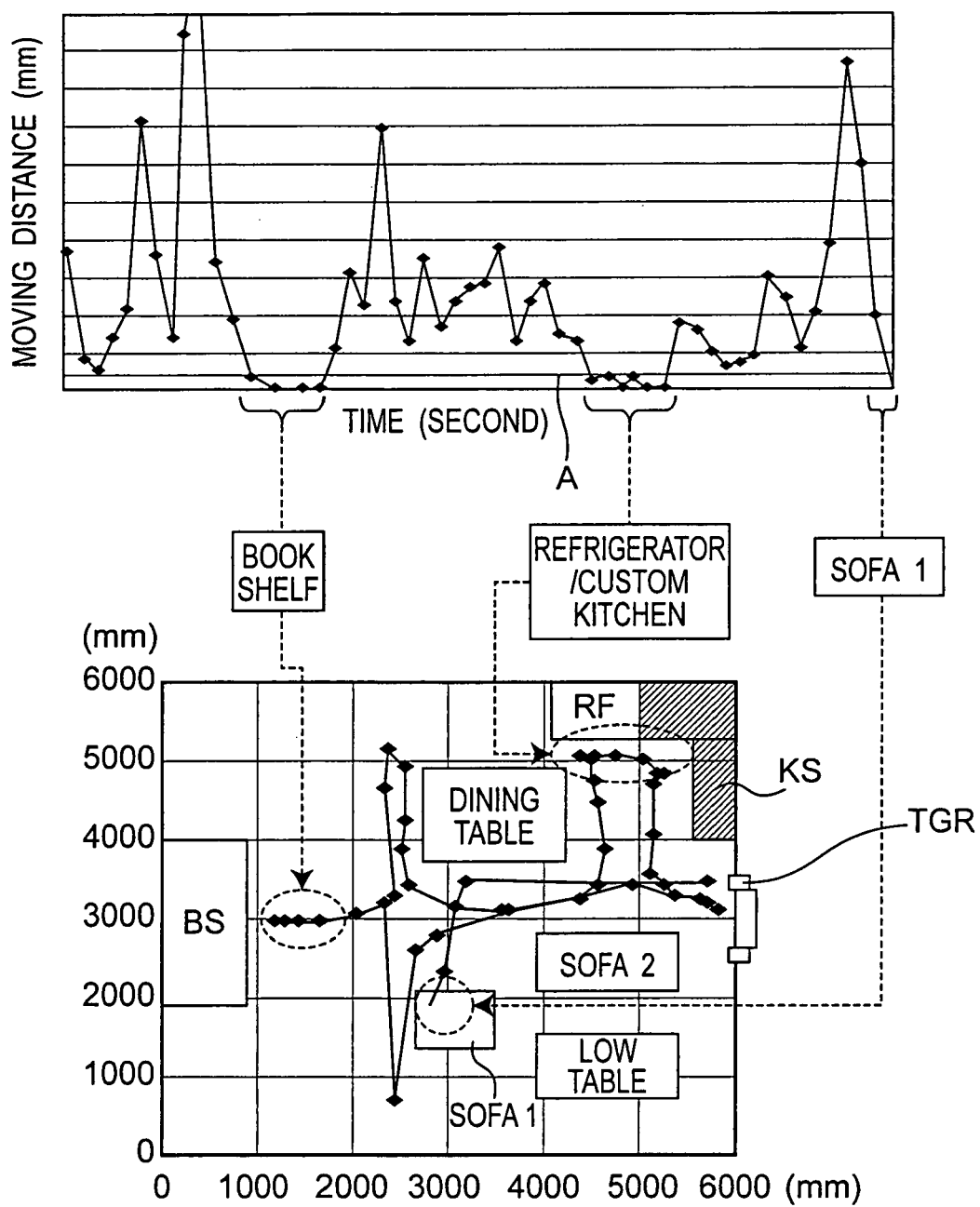
FIG. 15 is a view showing a moving distance per time of a human and a movement line (movement history) of the human in another method proposed by the inventors.

For example, when a human holding the object A with an RFID tag enters the room RM in (b) of FIG. 15, the object A is detected by a tag reader TGR provided at the gateway GW when entering the room. Then, the human is assumed to stay in the room RM for a while, and then leave the room. At the time of leaving the room, it is assumed that the object A is not detected by the tag reader TGR. In this case, it is possible to determine that the object A is left somewhere in the room RM.

If using the assumption that the place where the object is placed is near the movement locus of the human, and that when the human handles the object, the moving speed of the human is reduced and the time staying near the place becomes long, the place where the object A is highly likely to be placed in FIG. 15 is estimated to be in front of the book shelf BS or in front of the refrigerator Rf and the custom kitchen KS. At the same time, the time of handling the object can also be estimated.

However, in the technique described above, the place and time on which the object is placed cannot be specified, and it is only possible to estimate the place and time on which the object is highly likely to be placed. In view of this fact, it has been considered to take further measure that the camera 300 as an example of the image-pickup device for capturing the environment in which the object search is performed, and the storing means 400 as an example of the image database for storing image information picked up by the camera 300 are further provided, and based on the place and time of the object estimated as described above, a corresponding image is searched from the storing means 400, and the image is displayed, and the human searching for the object is asked to determine whether the object is present. However, even in this case, the human must check the image with eyes, whereby an issue of involving a trouble still remains.

In view of the above, in the first embodiment of the present invention, when the object detection means 500 compares first object ID data and data relating to second object ID information respectively corresponding to first time and second time on which the human detection data indicating that the human HM is present is obtained, and determines that they are different from each other, the object detection means 500 calculates the difference between the first image data and the second image data corresponding to the first time and the second time respectively, and detects the position of the difference area in the image data or the position into which the position of the difference area is converted in the space where the object OA is searched, as the position of the object OA. Thereby, the remaining issue can be solved.

Second Embodiment

Hereinafter, an object detecting device and an object detecting method according to a second embodiment of the present invention will be described in detail with reference to the drawings.

Figure 16:
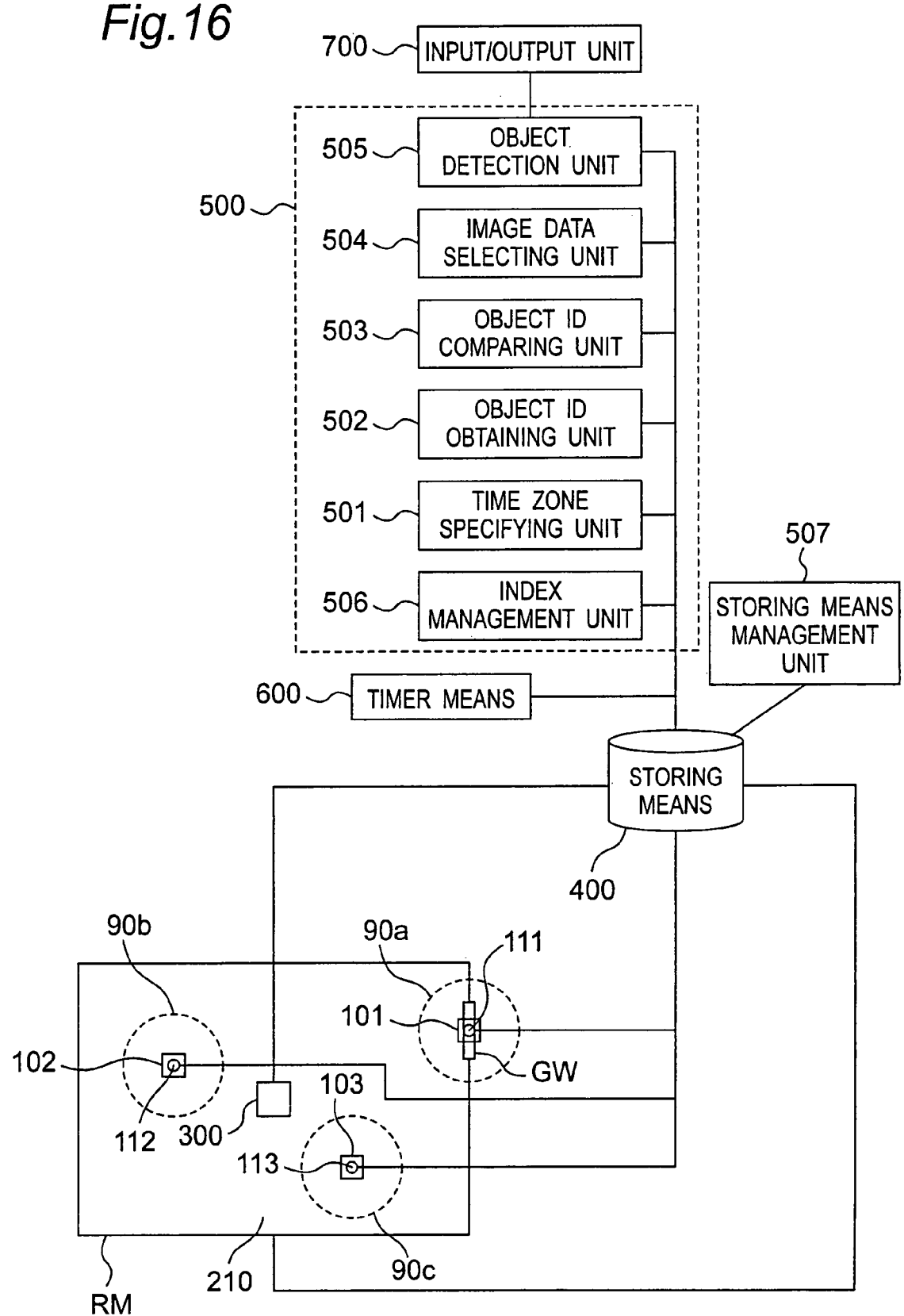
FIG. 16 is a block diagram showing a constitutional example of an image processor according to a second embodiment of the present invention.

FIG. 16 is a block diagram showing the configuration of the object detecting device according to the second embodiment of the present invention. A room RM, in which the object detecting device is provided, is expressed in a schematic shape (rectangle frame in this example) seen through from the above.

The object detecting device mainly includes the input/output unit 700, the object detection means 500, the timer means 600, the storing means 400, the camera 300, the three wireless tag readers 101 to 103, and a human position sensor 210. The present embodiment is largely different from the first embodiment in that the human position sensor 210 is included instead of the human detection sensors 201 to 203.

As in the first embodiment, in the room RM, the three wireless tag readers 101 to 103 and the three antennas 111 to 112 of the three wireless tag readers 101 to 103 are provided. The detection ranges of the wireless tag readers 101 to 103 are expressed with circles 90a, 90b, and 90c drawn by dotted lines. Particularly, the wireless tag reader 101 is provided such that the detection range 90a becomes around the gateway GW of the room RM. The wireless tag readers 101 to 103 and the antennas 111 to 112 are the same as those of the first embodiment, so detailed description is omitted.

Figure 17:
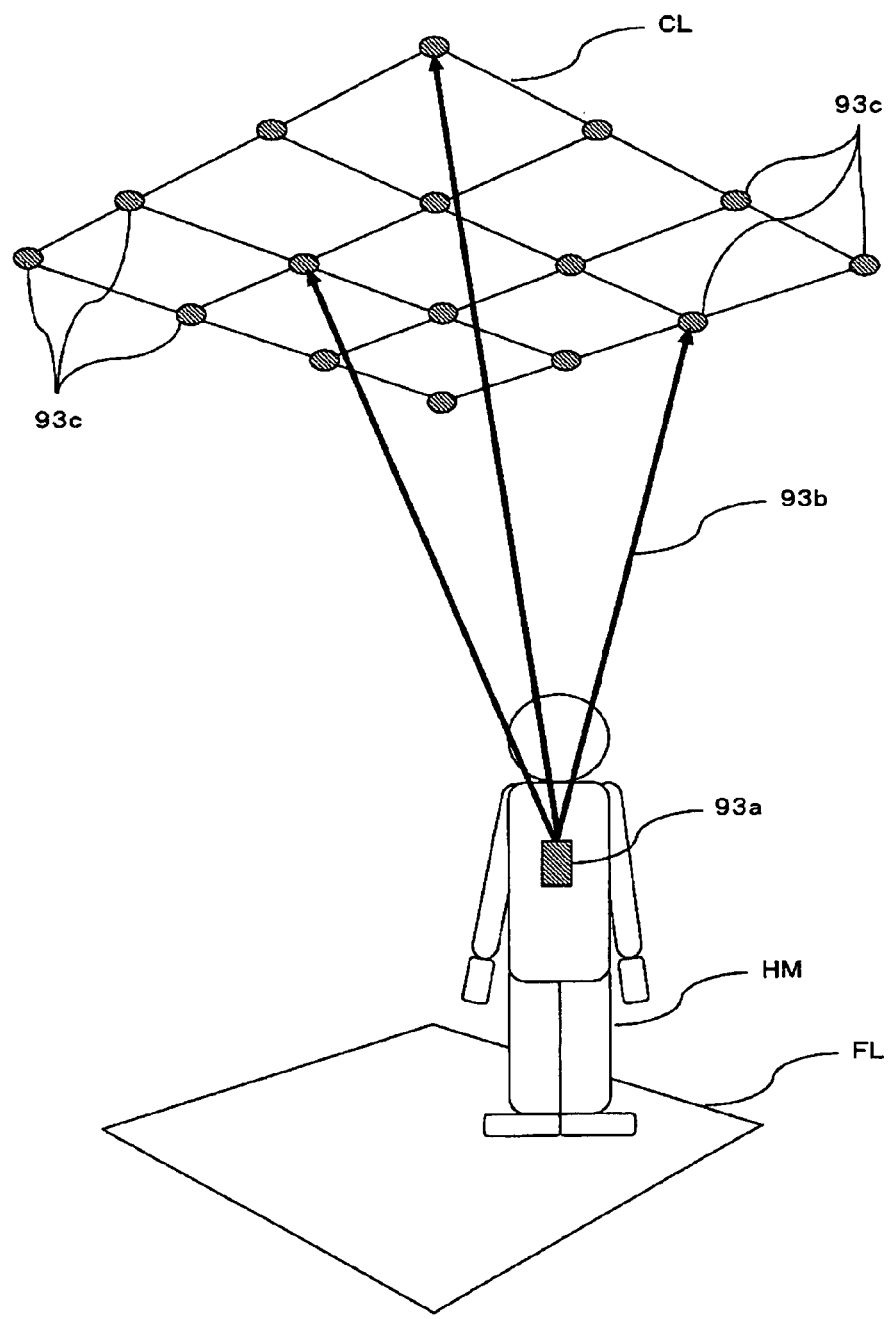
FIG. 17 is a view showing a state of measuring the position of a human by an ultrasonic sensor.
Figure 18A:
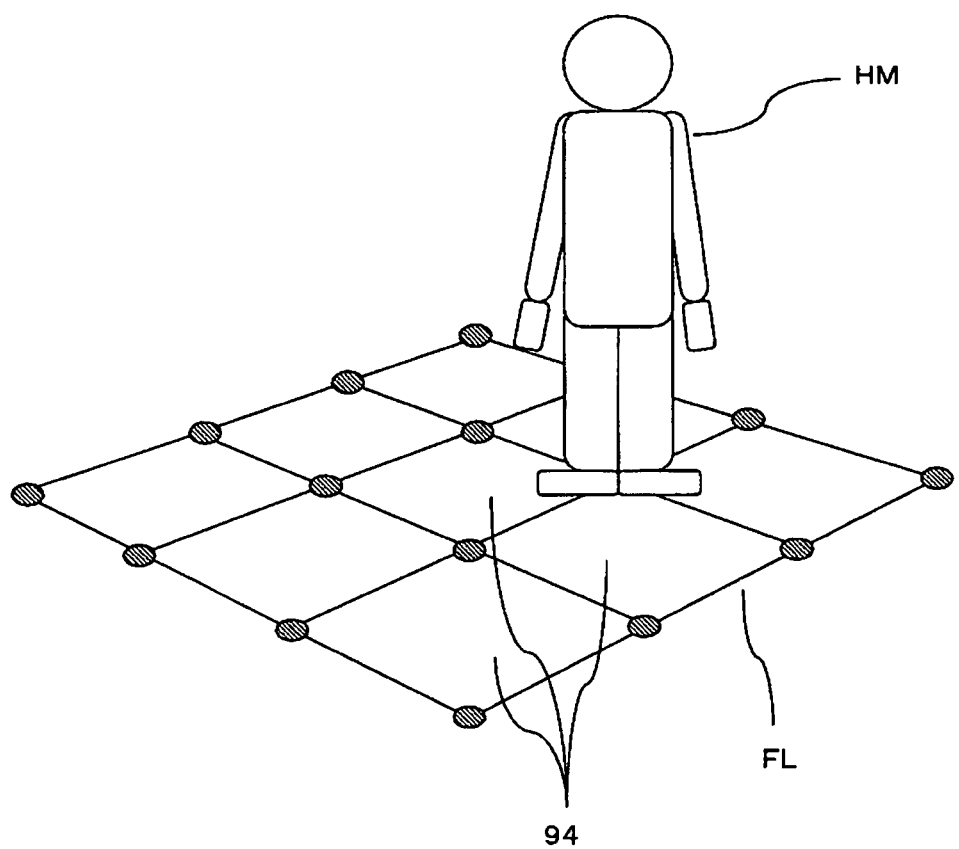
FIG. 18A is a view showing a state of measuring the position of a human by floor pressure sensors.
Figure 18B:
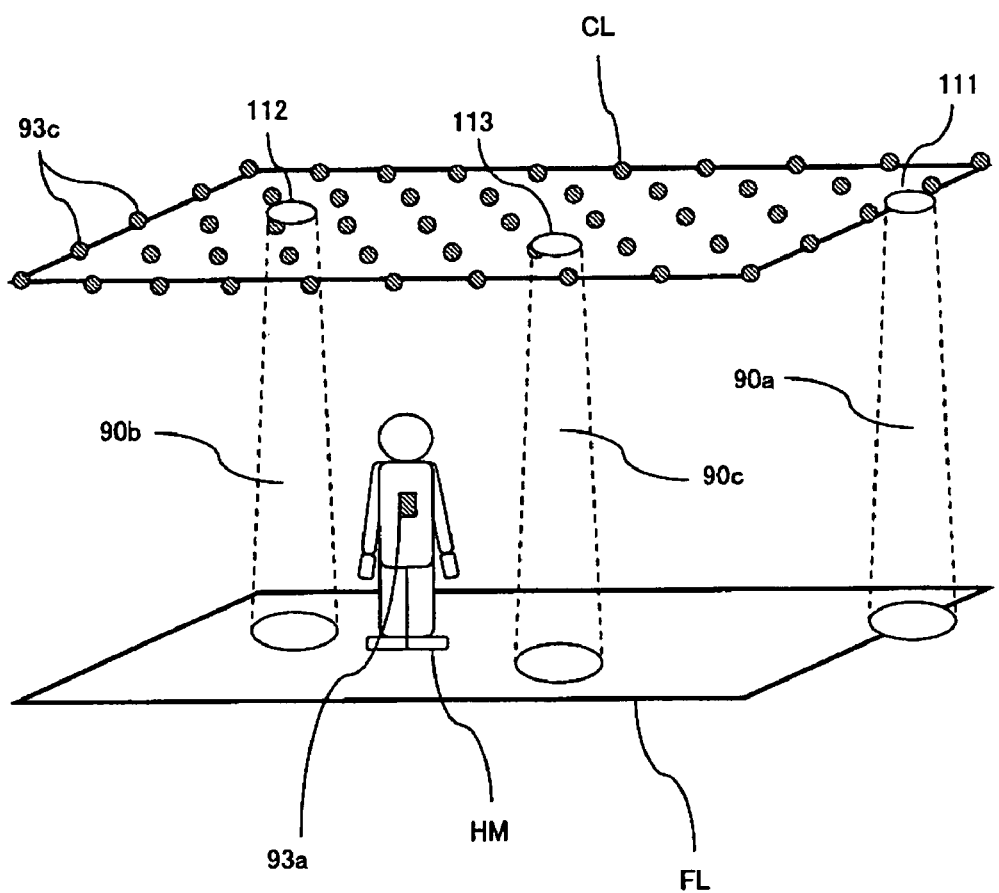
FIG. 18B is a view showing installation of antennas of wireless tag readers and human detection sensors (ultrasonic sensor) in the object detecting device according to the second embodiment of the present invention.
Figure 18C:
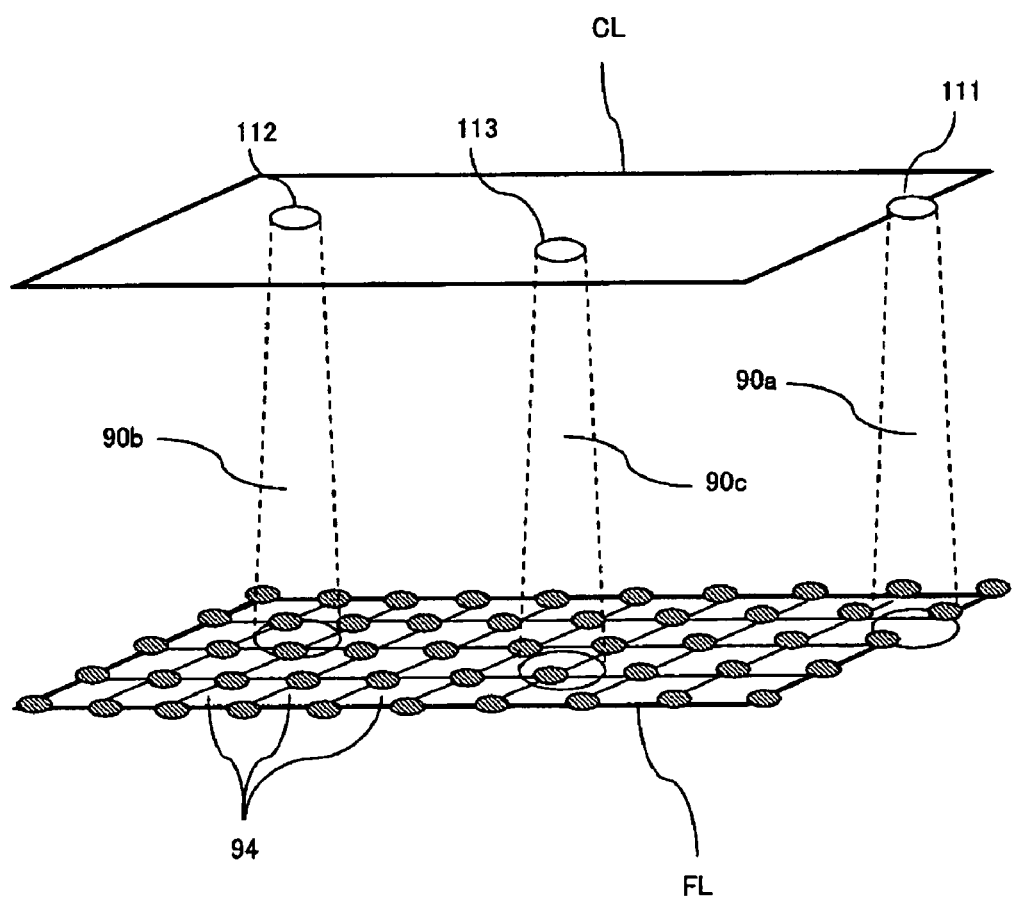
FIG. 18C is a view showing installation of antennas of wireless tag readers and human detection sensors (floor pressure sensor) in the object detecting device according to the second embodiment of the present invention.
Figure 19:
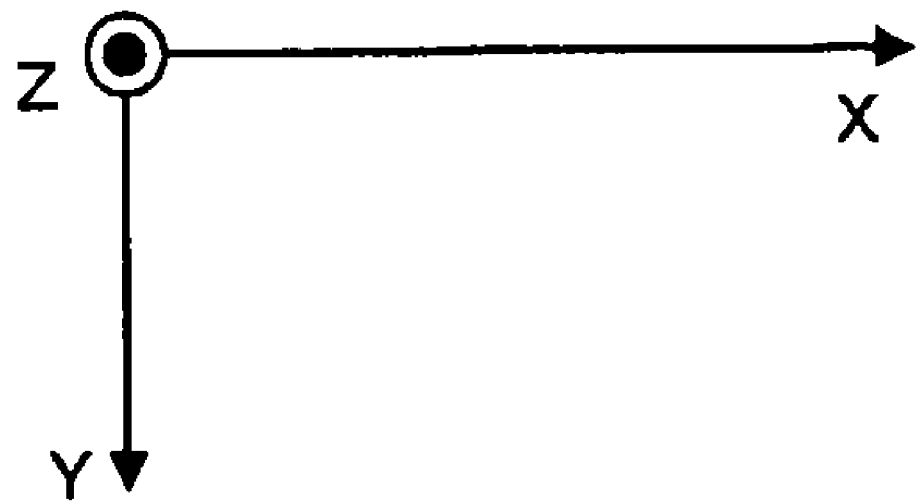
FIG. 19 is a view showing a way of taking a world coordinate system.

The human position sensor 210 detects a two-dimensional position (or three-dimensional position) of a human present in the room RM. As an example of the human position sensor 210, an ultrasonic sensor or a floor pressure sensor can be used. In the case of an ultrasonic sensor, an ultrasonic wave 93b emitted from an ultrasonic transmitter 93a carried by a human HM is received by three or more ultrasonic receivers 93c provided on the ceiling CL or the like so as to perform three-point surveying using reaching times to thereby measure the three-dimensional position of the human HM, as shown in FIG. 17. In the case of a floor pressure sensor, a plurality of pressure sensor units 94 are arranged in two-dimensional array on the floor FL, and the two-dimensional position of the human HM is measured from the position of the pressure sensor units 94 detecting the pressure in the two-dimensional array, as shown in FIG. 18A. FIG. 18B shows a state of the room RM in which the wireless tag readers 101 to 103, and a plurality of ultrasonic receivers 93c and the ultrasonic transmitter 93a, as the human position sensor 210, are provided. FIG. 18C shows a state of the room RM in which the wireless tag readers 101 to 103 and a large number of floor pressure sensor units 94, as the human position sensor 210, are provided. In the first embodiment, the human detection sensors 201 to 203 output time-series data of binary information indicating whether a human is present in the detection ranges. However, in the second embodiment, the human position sensor 210 outputs time-series data of the two-dimensional position (or three-dimensional position) of the human. In the second embodiment, the ultrasonic sensors are used as the human position sensor 210. Data obtainment by the ultrasonic sensors is performed at a frequency of once per second, and the readout result is transmitted to the storing means 400. The transmitter 93a of the ultrasonic sensor is assumed to be fixed near the center of the human body such as of the waist of the human HM, for example. When using the ultrasonic sensor, the three-dimensional position (X, Y, Z) of the transmitter 93a in the world coordinate system can be obtained. However, in the second embodiment, it is adapted that the X coordinate value and the Y coordinate value among them are transmitted to the storing means 400. The way of taking the coordinate system is as shown in FIG. 19. In other words, the floor surface area is defined by the X direction and the Y direction orthogonal to the X direction, and the height direction is defined by the Z direction which is orthogonal to both of the X direction and the Y direction.

Note that the readout frequency is not necessarily once per second. It is only necessary to set to the optimum frequency corresponding to the moving speed or the like of a human who moves an object. For example, in order to cope with a faster moving speed, it is only necessary to increase the readout frequency.

The camera 300 is the same as that of the first embodiment, so detailed description is omitted.

The storing means 400 stores data of readout result of the wireless tag readers 101 to 103 and data of the readout result of the human position sensor 210 by associating them with the obtained times of the respective data obtained from the timer means 600 by using the timer means 600.

Next, description will be given for detected data of various sensors such as the wireless tag readers 101 to 103, the human position sensor 210, and the camera 300, which are stored in the storing means 400. Consideration will be given for a case where a human handling an object moves within the room RM following the movement line ML in FIG. 20. It is assumed that the human entered the room RM through the gateway GW while holding an object A, and on the way, he/she released the object A at the place L1 by placing it on a near table, and then picked up a new object B from the floor at the place L2, and left the room RM through the gateway GW.

Figure 20:
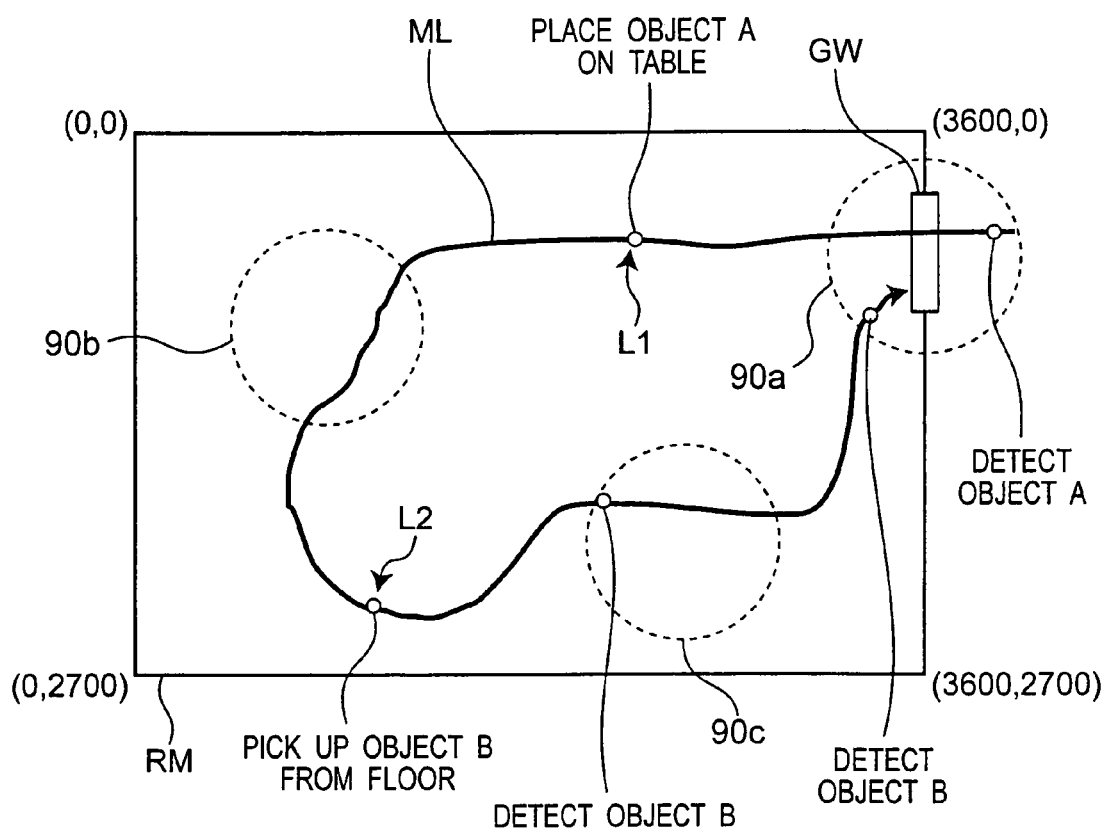
FIG. 20 is a view showing a movement line (movement history) of a human according to the second embodiment of the present invention.

FIG. 21 shows outputs of the wireless tag readers 101 to 103 and the human position sensor 210 obtained during this time. The output of the human position sensor 210 is X and Y coordinate values in the coordinate system in FIG. 19, and the origin is assumed to be the upper left point of a rectangle indicating the room RM as shown in FIG. 20. The unit is "mm".

As described above, the wireless tag readers 101 to 103 and the human position sensor 210 perform readout at a frequency of once per second. In FIG. 21, readout timings of the wireless tag readers 101 to 103 and the human position sensor 210 are synchronized, but they are not necessarily synchronized. If they are not synchronized, it is only necessary to associate pieces of data having the closest readout times with each other.

Figure 22:
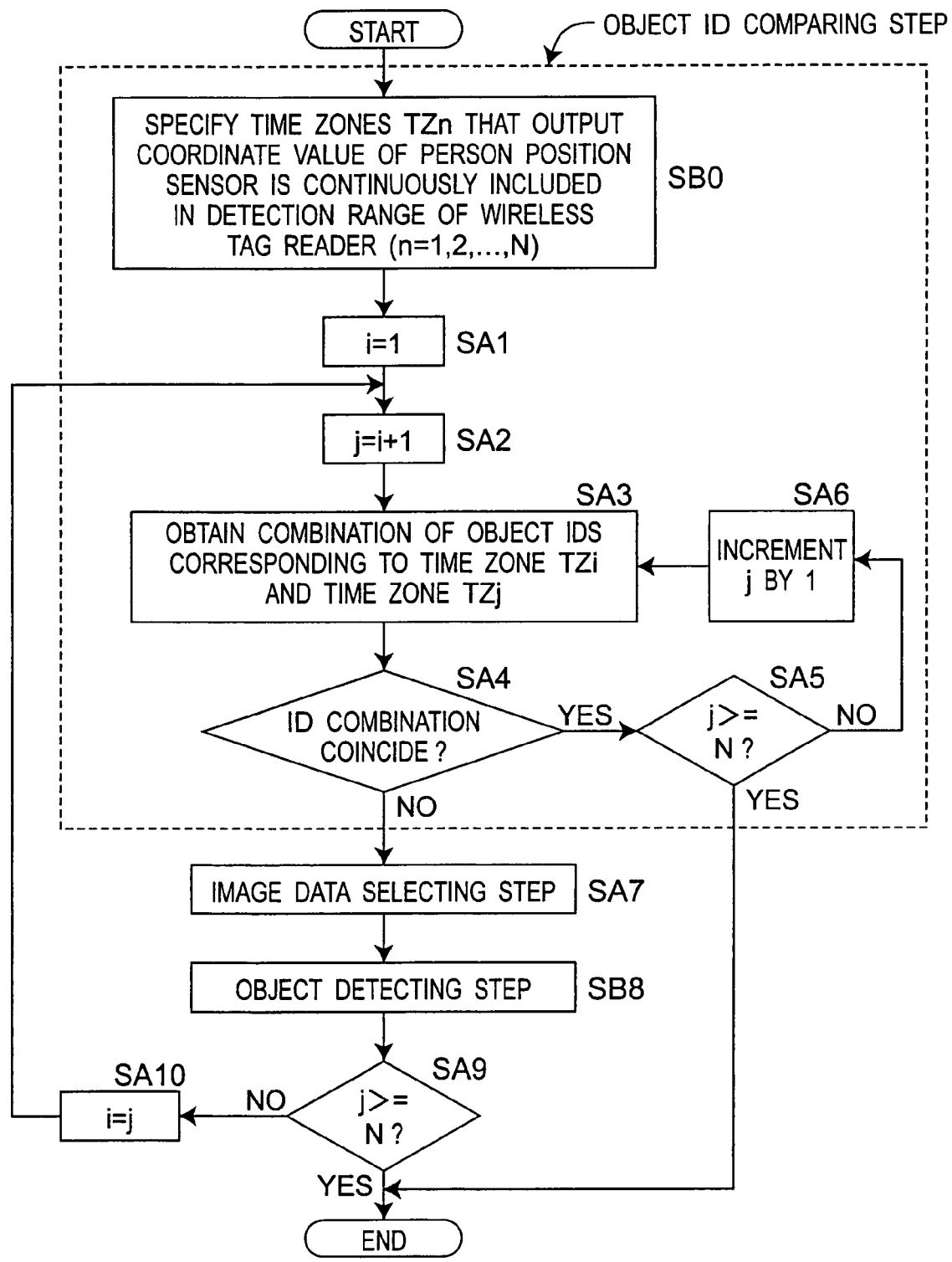
FIG. 22 is a flowchart showing an object detecting method performed by an object detection means of the second embodiment of the present invention.

The object detection means 500 detects an object by using detection data of various sensors stored in the storing means 400. As in the first embodiment, the object detection means 500 includes the time zone specifying unit 501 for specifying time zones TZn at which output coordinate values of the human position sensor 210 are continuously included in the detection ranges 90a, 90b, and 90c of the wireless tag readers 101 to 103 and the total number N of the time zones, an object ID obtaining unit 502, an object ID comparing unit 503, an image data selecting unit 504, and an object detection unit 505. FIG. 22 is a flowchart showing an object detecting method carried out by the object detection means 500 in the object detecting device according to the second embodiment.

Hereinafter, object detection processing of the object detecting device and the object detecting method according to the second embodiment will be described, according to the flowchart of FIG. 22.

Figure 23:
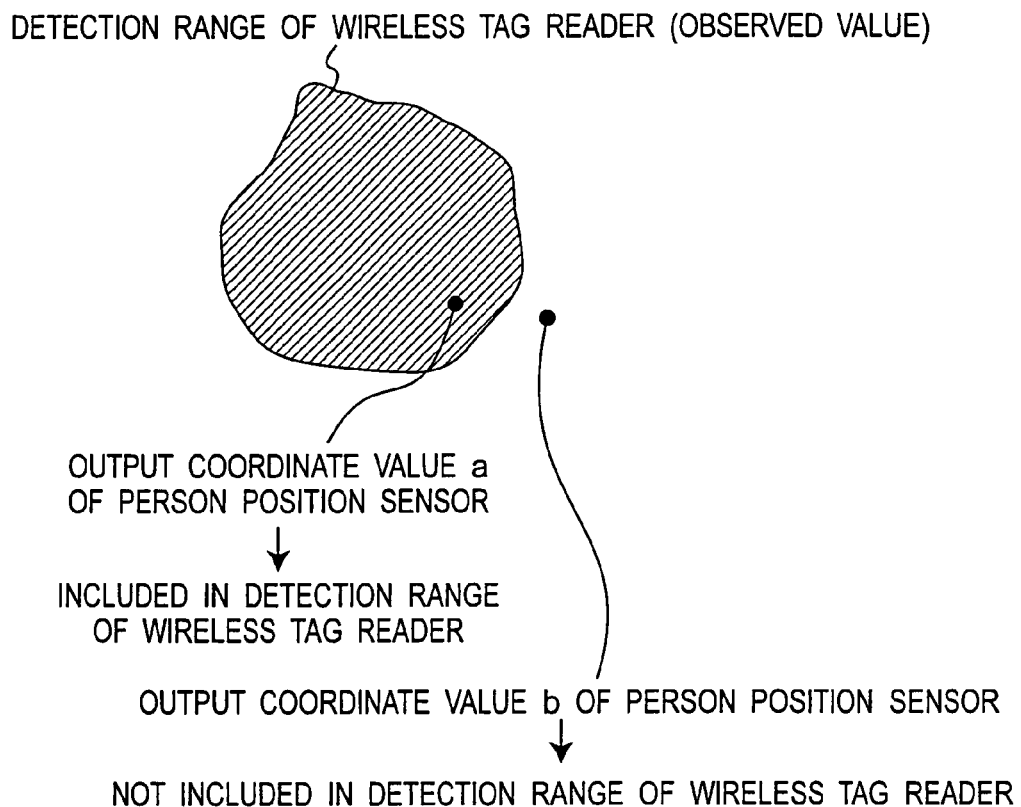
FIG. 23 is a view showing a state of determining whether an output coordinate value of the human position sensor is included in an actually measured detection range of a wireless tag reader.
Figure 24:
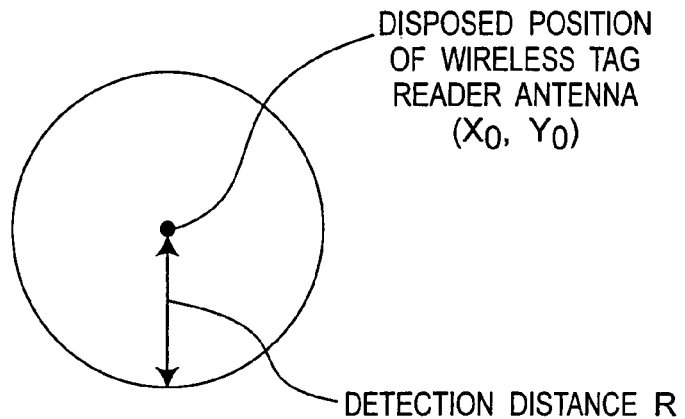
FIG. 24 is a view showing a state of determining whether an output coordinate value of the human position sensor is included in the detection range of a wireless tag reader modeled in a circle.

First, in the step SB0 to be carried out by the time zone specifying unit 501, the time zones TZn in which output coordinate values of the human position sensor 210 are continuously included in the detection ranges 90a, 90b, and 90c of the wireless tag readers 101 to 103 and the total number N of the time zones are specified by the time zone specifying unit 501. Whether the output coordinate value of the human position sensor 210 is included in the detection ranges 90a, 90b, and 90c of the wireless tag readers 101 to 103 can be determined by using the detection ranges 90a, 90b, and 90c of the wireless tag readers 101 to 103 and the output coordinate value of the human position sensor 210, previously measured, as shown in FIG. 23. When the detection ranges 90a, 90b, and 90c can be approximated by circles as shown in FIG. 24, the determination may be performed by the time zone specifying unit 501 by using the setting positions $(X_0, Y_0)$ of the antennas of the wireless tag readers 101 to 103 and the detected distance (radius of the circle) R. Assuming that the output coordinate value of the human position sensor 210 is (x, y), if $$(x-X_0)^2+(y-Y_0)^2 \leq R^2 \quad \text{[Equation 3]}$$

(x, y) is included in the detection range of the wireless tag reader.

If $$(x-X_0)^2+(y-Y_0)^2 > R^2 \quad \text{[Equation 4]}$$

is maintained, (x, y) is not included in the detection range of the wireless tag reader.

FIG. 25 shows the result obtained in the step SB0 together with the data of FIG. 21. In FIG. 25, a mark "o" is given to a case where the output coordinate value of the human position sensor 210 is included in any one of the detection ranges 90a, 90b, and 90c of the wireless tag readers 101 to 103. Then, time zones where the output coordinate value of the human position sensor 210 is included continuously in the detection ranges 90a, 90b, and 90c of the wireless tag readers 101 to 103 are specified. In the data shown in FIG. 25, it is so set that the time from 0 to 2 seconds is a time zone TZ1, the time from 14 to 17 seconds is a time zone TZ2, the time from 31 to 33 seconds is a time zone TZ3, and the time from 41 to 42 seconds is a time zone TZ4. As a result, in the data of FIG. 25, the total number N of the time zones is N=4.

The next step SA1 to the step SA6 are same as the step SA1 to the step SA6 in the first embodiment, so the description is omitted.

In the step SA7 to be carried out by the image data selecting unit 504, image data used for detecting the object position is selected. From the data of FIG. 25, it is determined by the image data selecting unit 504 that the wireless tag reader 101 detects data relating to ID information of the object A in the time zone TZ1, and the wireless tag reader 102 detects data relating to the object ID information that the wireless tag reader 102 does not detect any ID information of the object in the time zone TZ2. That is, it can be estimated by the image data selecting unit 504 that the object A which has been placed within the detection range 90a of the wireless tag reader 101 or held by a human (shown by HM in the figure) in the detection range 90a of the wireless tag reader 101 in the time zone TZ1, is moved to the outside of the detection range of the wireless tag reader during the time 3 to 13 seconds.

Figure 26:
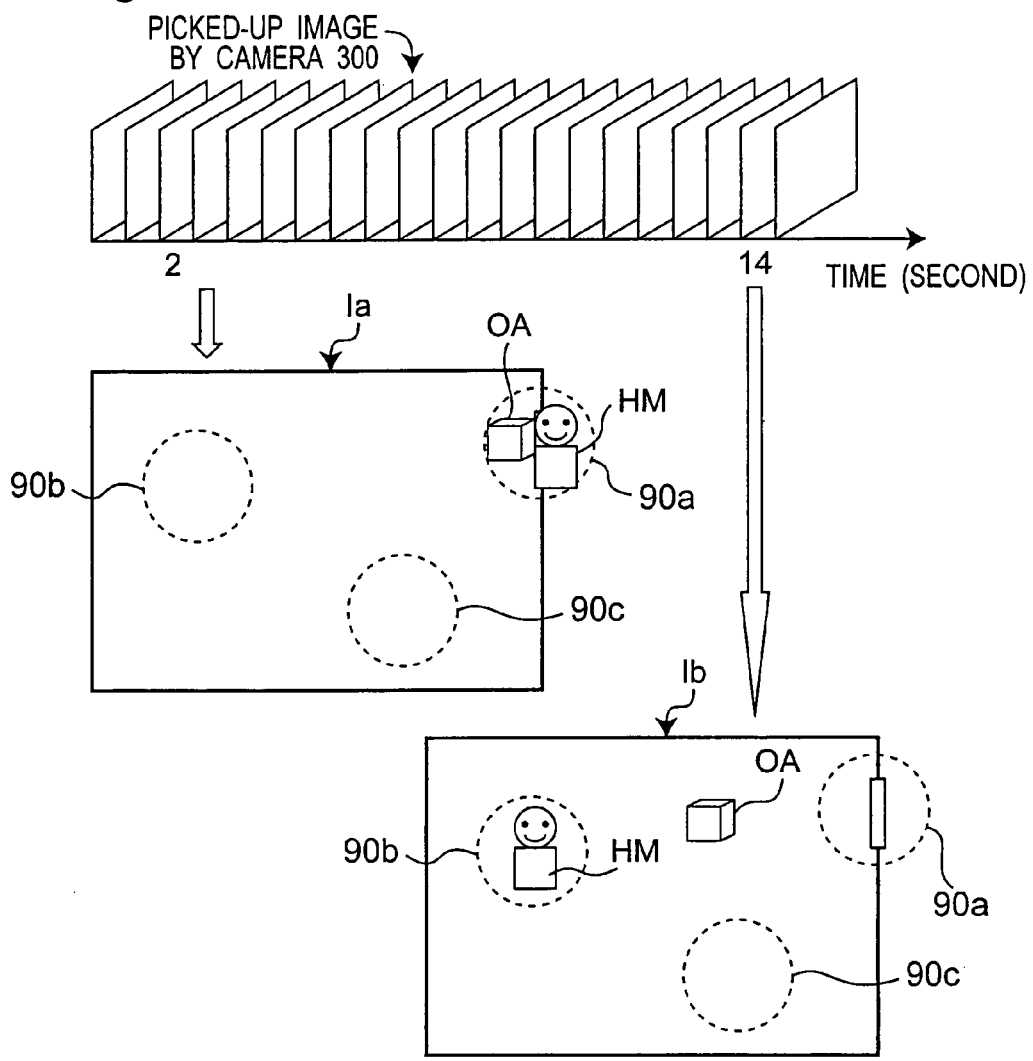
FIG. 26 is a view showing images Ia and Ib picked up at a time 2 second and a time 14 second in the second embodiment of the present invention.

That is, as shown in FIG. 26, it is determined by the image data selecting unit 504 that in an image Ia picked up by the camera 300 at a time (e.g., time 2 second) in the time zone TZ1, the object A (shown by OA in the figure) is present in the detection range 90a of the wireless tag reader 101, and in an image Ib picked up by the camera 300 at a time (e.g., time 14 second) in the time zone TZ2, the object A is present outside the detection range of the wireless tag reader. In the step SA7, these image Ia and the image Ib are selected by the image data selecting unit 504 from the storing means 400.

Figure 27A:
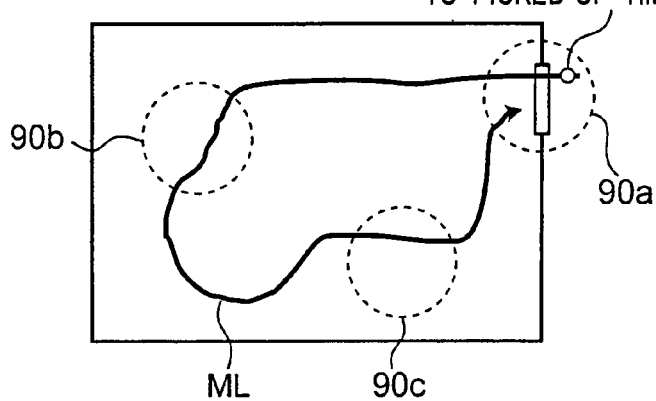
FIG. 27A is a view showing a state of estimating a position where a human is present in a picked up image, from an output of the human position sensor.
Figure 27B:
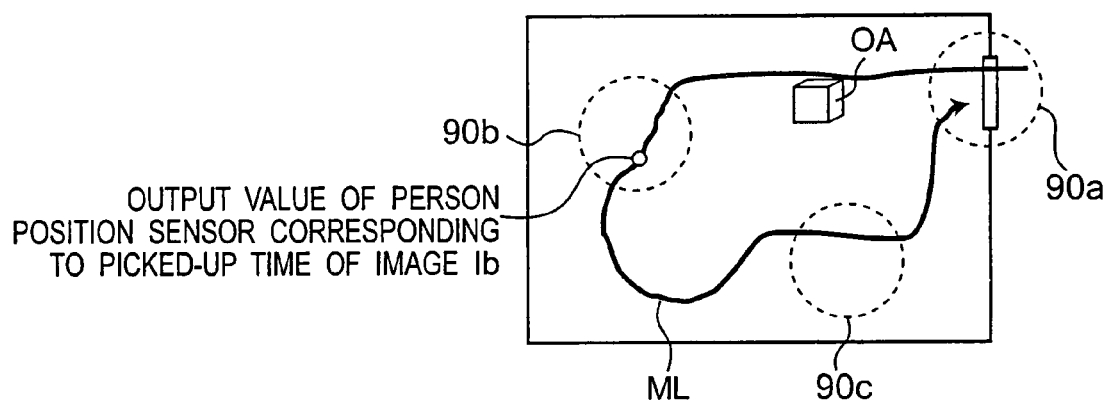
FIG. 27B is a view showing a state of estimating a position where the human is present in the picked up image, from the output of the human position sensor.

Next, in the step SB8 to be carried out by the object detection unit 505, a difference between the image Ia and the image Ib is calculated by the object detection unit 505, whereby the position of the object A is determined by the object detection unit 505. For example, the center of gravity of the area obtained from the difference by the object detection unit 505 is determined as the position of the object A. In the second embodiment, the position of the human HM at each time is obtained by the human position sensor 210. Therefore, by converting the output coordinate value of the human position sensor 210 to a camera coordinate system by the object detection unit 505, the positions of the human HM in the picked up images Ia and Ib as shown in FIGS. 27A and 27B can be calculated by the object detection unit 505. If the size of the human HM has been known, the area of the human HM in the picked up images Ia and Ib can also be estimated by the object detection unit 505.

Specifically, the two-dimensional position $(X_{HM}, Y_{HM})$ of the human HM in the world coordinate system is converted to the position $(x_{HM}, y_{HM})$ in the camera coordinate system, and then in the picked up image, an area previously defined around the position $(x_{HM}, y_{HM})$ is estimated as the area of the human HM by the object detection unit 505. As the area previously defined, a circle area of a predetermined radius around the position $(x_{HM}, y_{HM})$ can be used, for example. Note that in order to convert the output coordinate value (world coordinate system) of the human position sensor 210 to the camera coordinate system by the object detection unit 505, the camera 300 must have been calibrated. "The camera 300 is calibrated" means that external parameters such as three-dimensional position and three-dimensional posture and internal parameters such as focus distance of the camera 300 are calculated and stored in the storing means 400 or the like. If the area of the human HM can be estimated in the picked up image, it is only necessary to calculate the area of the difference calculation subject by the method described below, and then calculate the difference by the object detection unit 505 while excluding the area of the human HM.

Figure 28:
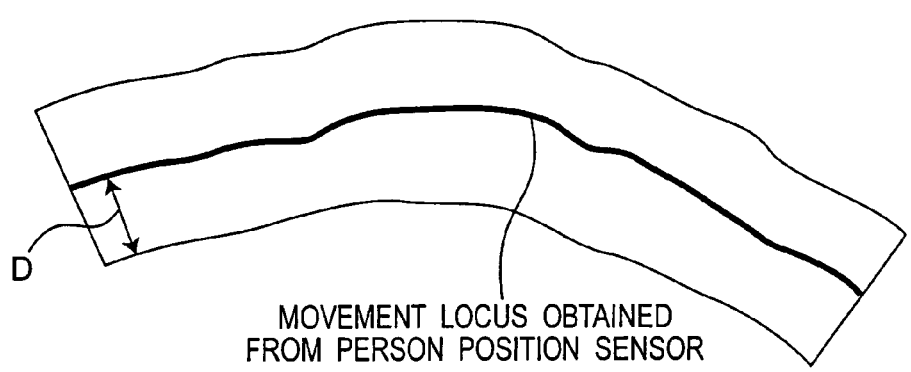
FIG. 28 is a view showing an example of a method of estimating an area where an object is present.

Further, the fact that the object A is placed in the room RM during the time 2 to 14 seconds is estimated by the object detection unit 505, and the position of the human HM at each time is obtained by the human position sensor 210. Therefore, by previously estimating the distance D that the human HM can operate the object and storing the estimated distance in the storing means 400, the area where the object A is present can be estimated from the movement locus (movement line ML) of the human HM by the object detection unit 505. For example, in the case where the camera 300 is provided on the ceiling CL at a position near the center of the room RM such that the optical axis thereof is directed vertically downward as in the second embodiment, it is possible to define the area where the object is present easily, as an area where a line of a length 2D orthogonal to the traveling direction of the movement locus (movement line ML) of the human HM passes through, as shown in FIG. 28. The distance D that the human HM can handle the object can be determined based on the length of an arm of the human HM for example. In the case of FIG. 28, D=70 cm, for example. Through the processing described above, the area of the difference calculation subject is obtained as FIG. 29 by the object detection unit 505.

In the example described above, an easy calculation method using two-dimensional information as positional information has been shown. Hereinafter, an example using three-dimensional information will be described.

As a prerequisite, it is assumed that the three-dimensional shape of the room RM is known, and the camera 300 is calibrated. Note that furniture or the like, which is present in the room RM and the position is fixed, is also included in the three-dimensional shape of the room RM. Further, "the camera 300 is calibrated" means that external parameters such as three-dimensional position and three-dimensional posture of the camera 300 and internal parameter such as focus distance are calculated and stored in the storing means 400 or the like.

Figure 37:
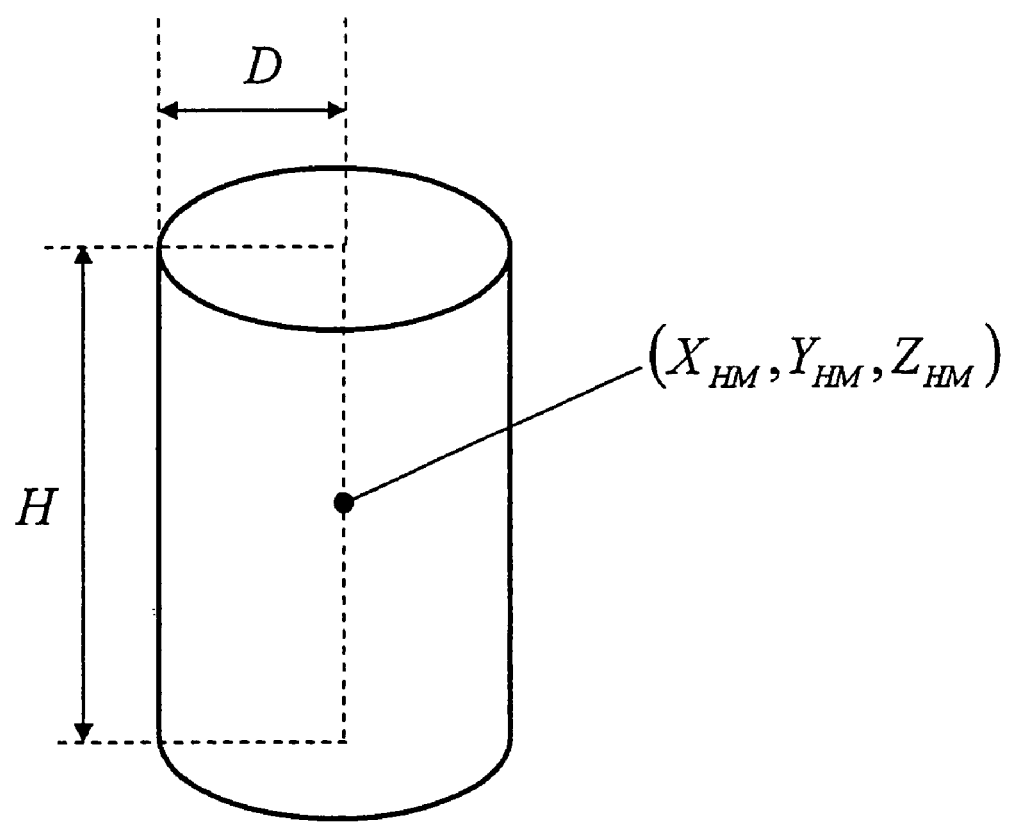
FIG. 37 is an explanation view of a columnar area as an example of an area where a human HM can operate an object.

First, a three-dimensional area in which a human can operate (place or take) an object, based on the three-dimensional position of the human HM at a time, is defined and stored in the storing means 400. As an example of the three-dimensional area, the case of setting a columnar area and storing it in the storing means 400 or the like will be described. In the description below, unit is "cm" in every case. As shown in FIG. 37, assuming that the position coordinate of the three-dimensional position of the human HM in the world coordinate system is $(X_{HM}, Y_{HM}, Z_{HM})$, a columnar area, having the center positional coordinate of $(X_{HM}, Y_{HM}, 0)$ and a circular bottom face with the radius D and the height H in the Z direction, is defined as an area where the human HM present at the position $(X_{HM}, Y_{HM}, Z_{HM})$ at a certain time can operate an object, and is stored in the storing means 400 or the like. In this case, it is assumed that the radius D is determined based on the length of an arm of the human HM, and the height H is determined based on the body height of the human HM. Since the human HM can reach the position higher than his/her body height by extending the arm upward, the height H is set to a value larger than the body height of the human HM and stored in the storing means 400.

Figure 38:
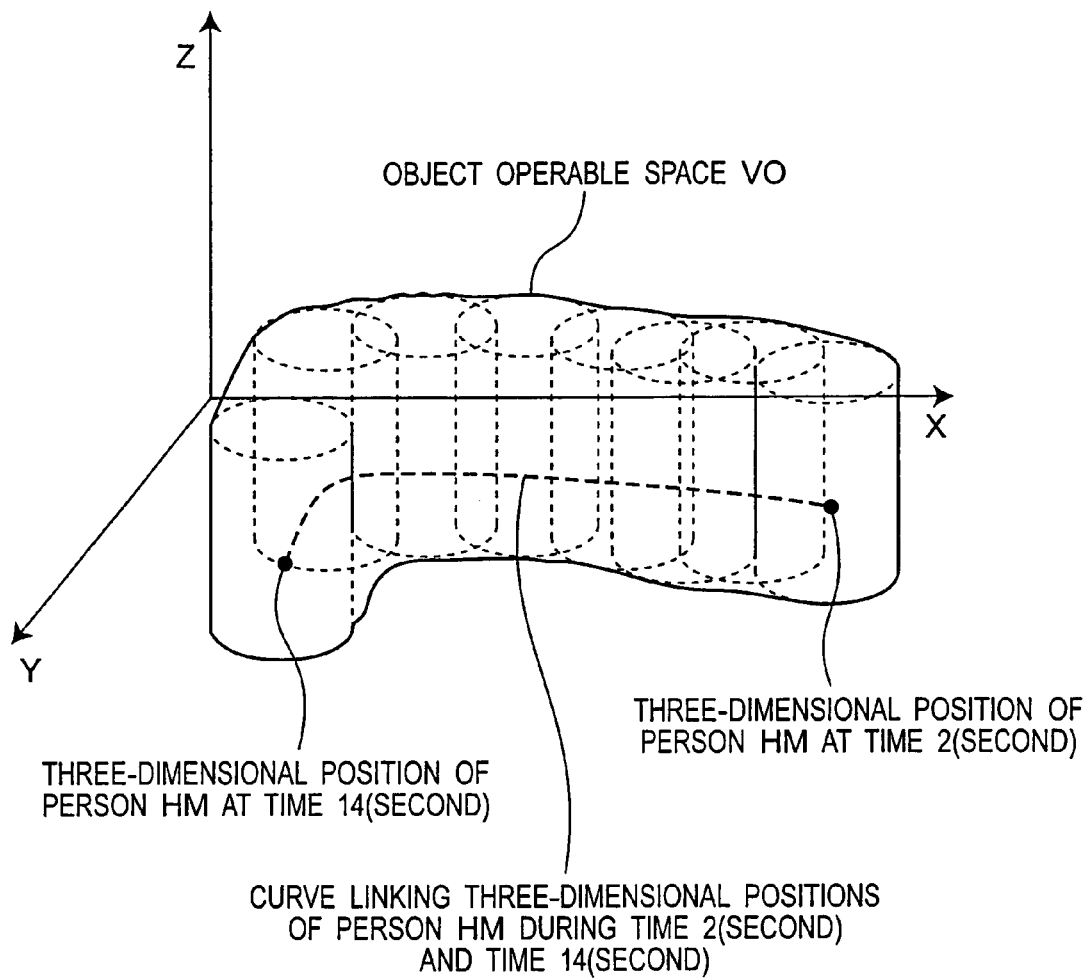
FIG. 38 is an explanation view of an object operable space VO when the human HM moves.

Next, a curve (or broken line) linking the three-dimensional position of the human HM moving during the period from the time 2 to 14 seconds is considered, and the columnar area described above is considered on the basis of a plurality of points on the curve (or broken line), and the area of the sum of the plurality of columnar areas (including internal area) is defined as an object operable space VO as shown in FIG. 38, and stored in the storing means 400 or the like. If the sampling intervals of the human position are sufficiently dense, the measurement points may be used as the plurality of points by the object detection unit 505 as they are. If the sampling intervals of the human position are thin, measurement points are interpolated by the object detection unit 505, and the points on the curve (or broken line) after the interpolation can be used by the object detection unit 505 together with the measurement points.

Figure 39:
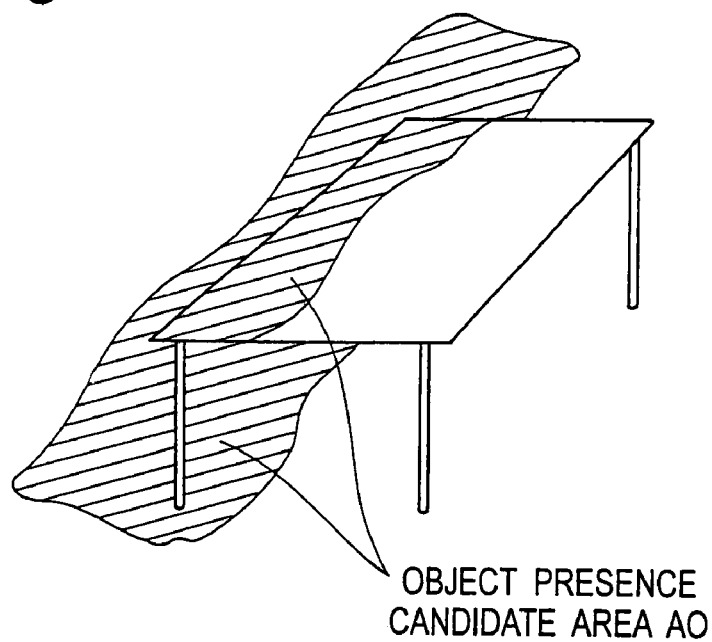
FIG. 39 is a view showing an example of an object presence candidate area AO in a case where a part of a table is in the object operable space VO of FIG. 38.
Figure 40:
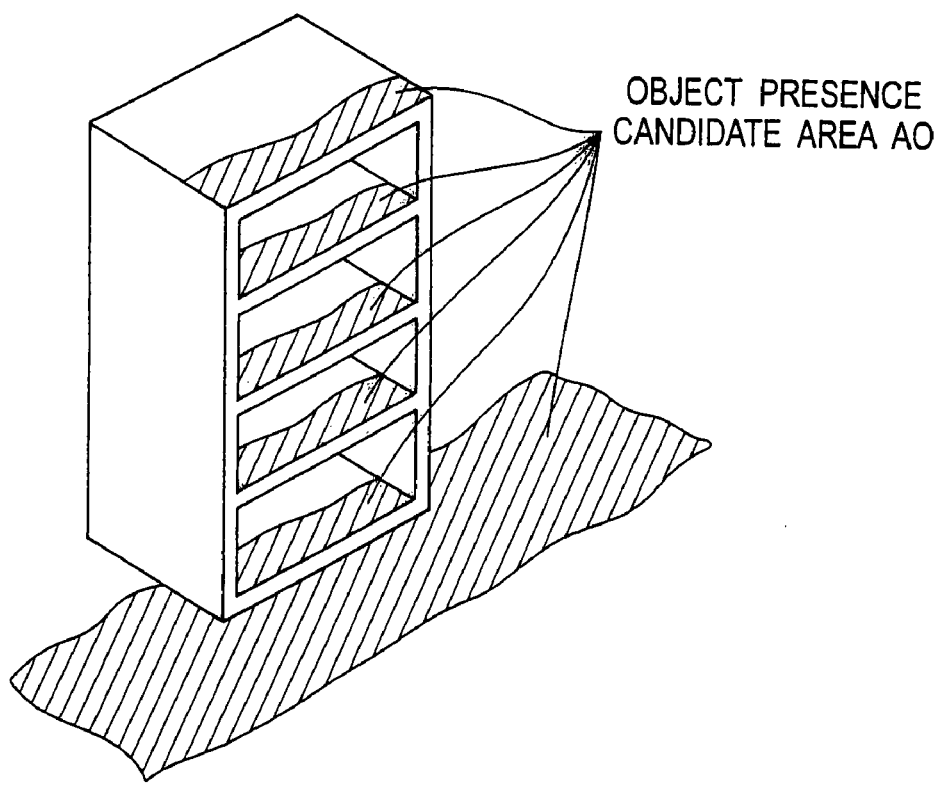
FIG. 40 is a view showing an example of an object presence candidate area AO in a case where a part of a shelf is in the object operable space VO of FIG. 38.

The object will never be present in a flying condition actually, so a horizontal plane included in the object operable space VO is determined as an object presence candidate area AO by the object detection unit 505. FIGS. 39 and 40 show examples of the object presence candidate area AO in which parts of a table and a shelf are included in the object operable space VO, respectively. If there is no solid object such as furniture in the object operable space VO, the object presence candidate area AO is only the floor surface.

As another example of a three-dimensional area in which a human can operate an object, a sphere having a prescribed radius around the three-dimensional position calculated based on the three-dimensional positional coordinate $(X_{HM}, Y_{HM}, Z_{HM})$ in the world coordinate system of the human HM may be defined and stored in the storing means 400 or the like. The three-dimensional positional coordinate $(X_{HM}, Y_{HM}, Z_{HM})$ is the position of the human detected by the human position sensor. If the ultrasonic transmitter 93a is used as the human position sensor, the detected position of the human is the position of the ultrasonic transmitter 93a. When a human carries the ultrasonic transmitter 93a on his/her waist, it is only necessary that a conversion function to an intermediate point linking the waist position to both the shoulders is previously prepared and stored in the storing means 400 or the like, and the conversion function is applied to the measured three-dimensional position $(X_{HM}, Y_{HM}, Z_{HM})$ by the object detection unit 505 so as to perform its calculation, and the sphere is defined with the calculated three-dimensional position as the center, and the defined sphere is stored in the storing means 400 or the like as a three-dimensional area in which the human can operate the object.

After calculating the object presence candidate area AO in the three-dimensional world coordinate system, the object presence candidate area AO is projected to the two-dimensional camera coordinate system by the object detection unit 505. The projection can be realized by the object detection unit 505 by using the three-dimensional shape (three-dimensional model) of the room RM and the external parameters and the internal parameters of the two-dimensional camera while utilizing rendering technique in the computer graphics. The object presence candidate area, after projected to the two-dimensional camera coordinate system, is indicated by AO'. As in the second embodiment, if the camera 300 is provided such that the optical axis thereof is directed vertically downward on the ceiling CL near the center of the room RM, the object presence candidate area AO' becomes the one shown in FIG. 41.

Figure 42:
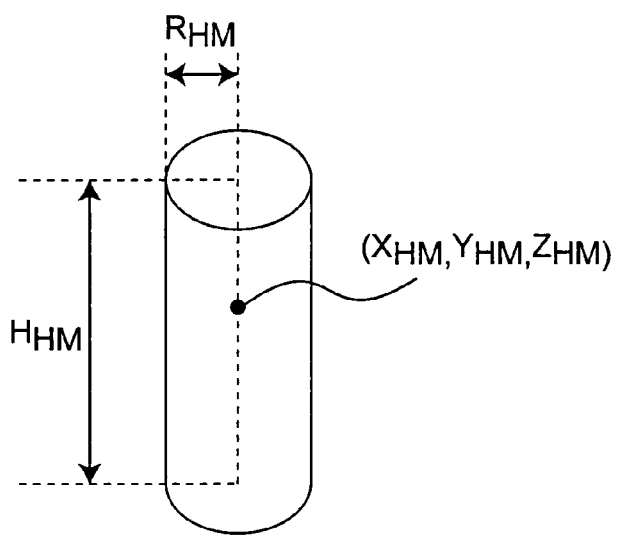
FIG. 42 is an explanation view of a columnar shape as an example of showing a three-dimensional model of a human when calculating an area hidden by the human HM.

An area hidden by the human HM can also be calculated by the object detection unit 505 in the same manner. The aim is to eliminate an area which may be hidden by the human HM from the difference calculation subject area when performing difference calculation for the object presence candidate area AO' between the image Ia (picked up time: 2 second) and the image Ib (picked up time: 14 second). To estimate the area of the human HM in the picked up image by the object detection unit 505, it is only necessary to set the three-dimensional model of the human in the three-dimensional world coordinate system and store it in the storing means 400 or the like, and to project (render) it to the two-dimensional camera coordinate system by the object detection unit 505, in the same manner as in the calculation of the object presence candidate area AO'. In this case, the three-dimensional model of the human is expressed as a columnar shape as shown in FIG. 42. In the case where the measured value by the human position sensor is $(X_{HM}, Y_{HM}, Z_{HM})$, it is a column in which the bottom face is a circle having the center $(X_{HM}, Y_{HM}, 0)$ and the radius $R_{HM}$, and its height in the Z direction is $H_{HM}$. In this case, the radius $R_{HM}$ and the height $H_{HM}$ which are parameters are only necessary to be calculated from the average size of the human (average arm length and average body height), and to be stored in the storing means 400 or the like. Further, it is also acceptable to set the values of parameters for each person and store them in the storing means 400 or the like, whereby different values are used as parameters corresponding to the IDs of humans by the object detection unit 505.

Figure 41:
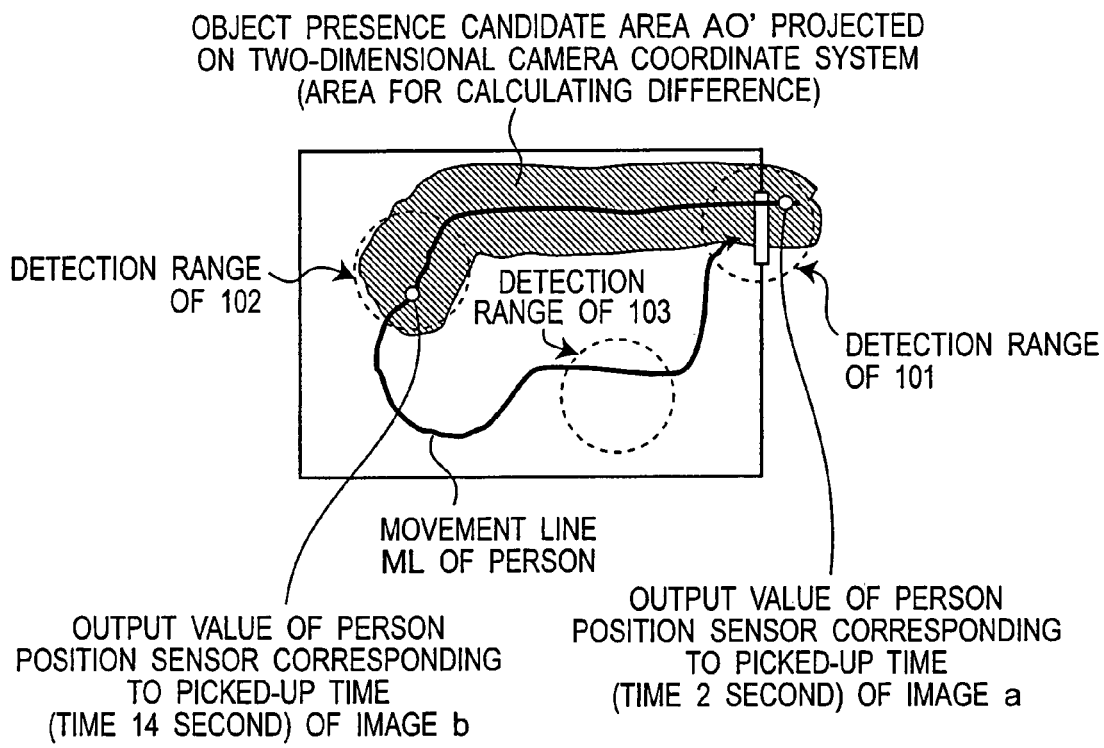
FIG. 41 is an explanation view showing an object presence candidate area AO' in a case where a camera is provided on the ceiling CL near the center of a room RM such that the optical axis thereof is directed vertically downward.
Figure 43:
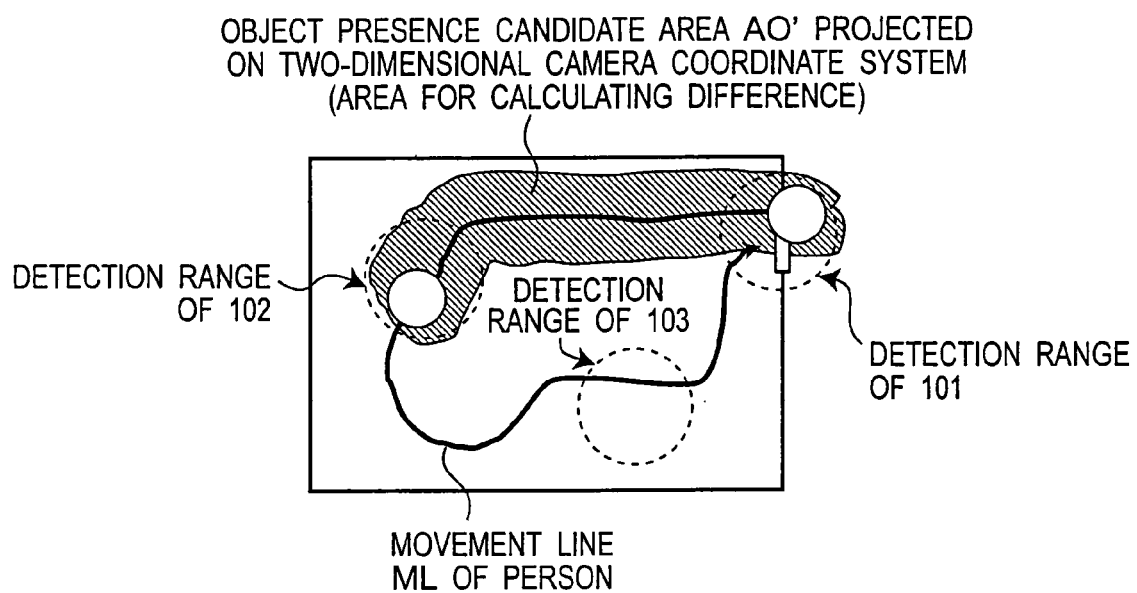
FIG. 43 is an explanation view showing an area excluding the area hidden by the human from the object presence candidate area AO' of FIG. 41.

FIG. 43 shows an area excluding an area hidden by a human from the object presence candidate area AO' in FIG. 41. Hereinafter, it is only necessary to calculate a difference to the area of FIG. 43 by the object detection unit 505 in the picked up images Ia and Ib.

In the second embodiment, the number of camera is one, and the camera is set such that the optical axis is directed vertically downward on the ceiling CL. Therefore, if the object presence candidate area AO' and the area hidden by the human are overlapped, there is no other choice but to remove the area hidden by the human from the object presence candidate area AO'. However, if there are a plurality of cameras, by calculating the object presence candidate area AO and the area of human HM in the three-dimensional coordinate system by the object detection unit 505 respectively, and then rendering them to the camera coordinate system of each camera by the object detection unit 505, it is possible to determine whether the object presence candidate area and the human area are overlapped in the picked up image by the object detection unit 505. Thus, by selecting a camera(s) in which they are not overlapped or less overlapped by the object detection unit 505, the object position can be detected with high accuracy. Further, if only one camera is provided on the ceiling, the object presence candidate area AO under the table in FIG. 39 cannot be picked up by the camera, but if there are a plurality of cameras and there is a camera image-picking up from a position other than immediately above the table, it is possible to detect an object placed under the table by selecting by the object detection unit 505 a camera with which rendering of the object presence candidate area AO under the table to the camera coordinate system is possible.

The case of using a plurality of cameras will be described in a third embodiment given below.

Note that if the human HM can be specified from the data relating to ID information of an ultrasonic transmitter that the human HM puts on, it is possible to determine the presence area of an object for each human by the object detection unit 505 by preparing a database (e.g., storing means besides the storing means 400 or the storing means 400) of the arm length of each human beforehand, and by using the arm length of the specified person by the object detection unit 505. Of course, in the case of using a floor pressure sensor as an example of the human position sensor 210, if the human can be specified by analyzing walk information of the person, the presence area of an object may be determined by the object detection unit 505 using the arm length of the specified person, by preparing a database (e.g., other storing means besides the storing means 400 or the storing means 400) of walk information for each person beforehand, and specifying a human by using the walk information stored in the database by the object detection unit 505.

Figure 29:
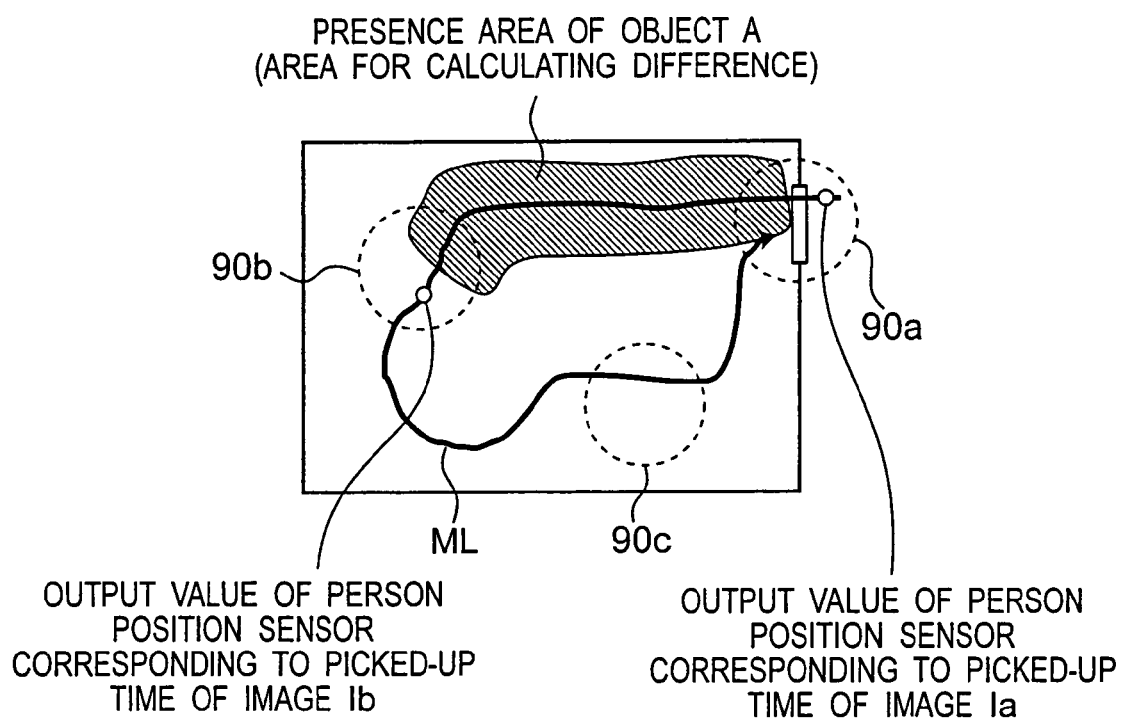
FIG. 29 is a view showing an area in which a difference is calculated in the picked up image.

Accordingly, as shown in FIG. 29, in calculating the difference by the object detection unit 505, the area of a human can be removed surely by the object detection unit 505, and the area for calculating the difference can be limited by the object detection unit 505. This can reduce the computation amount. Further, even in the case where another person is present in the field of view of the camera 300 and the other person moves another object, by limiting the area for calculating the difference by the object detection unit 505, it is possible to prevent or suppress an effect that the other person or the other object moved is extracted as a difference area.

At this time, if there are color information, size information, shape information corresponded to the ID information of the object A, the difference may be calculated by using it by the object detection unit 505. Since the use of such information has been described in the step SA8 in the first embodiment, the description is omitted.

Next, in the step SA9, whether the number of indexes j is not less than N is checked by the index management unit 506, and if it is determined that the number of indexes j is not less than N by the index management unit 506, the object detection processing ends.

If it is determined by the index management unit 506 that the number of indexes j is less than N, in the step SA10, the value of the index i is set to the current value of index j by the index management unit 506, and the step SA2 is performed again. In this way, the object detection processing is performed for all the time zones specified in the step SB0.

Note that the input/output unit 700 is same as that of the first embodiment, so the description is omitted.

As described above, the object detecting device and the object detecting method of the second embodiment include: the one or more wireless tag readers 101 to 103 for detecting the data relating to the object ID information of the object OA to which the wireless tag is given in the space for searching the object OA; the one or more human position sensors 210 for measuring the position of the human HM handling the object OA in the space; the camera 300, as an example of an image-pickup device, for imaging a part or the whole of the space; the storing means 400 for storing the data relating to the object ID information detected by the wireless tag readers 101 to 104, the human position data measured by the human position sensor 210, and the image data picked up by the camera 300, while associating them with the obtained time of each data; and the object detection means 500 for detecting the ID information and position of the object based on the data relating to the object ID information, the human position data, and the image data stored in the storing means 400. If the object detection means 500 determines that data relating to first object ID information and data relating to second object ID information, corresponding to first time and second time on which the human position data is obtained respectively, are different from each other, among pieces of data relating to the object ID information in which the human position measured by the human position sensor 210 is included in the detection ranges of the wireless tag readers 101 to 104, the object detection means 500 calculates the difference between the first image data and the second image data corresponding to the first time and the second time respectively. Further, in calculating the difference, the object detection means 500 is so configured as to calculate the difference for the area determined based on the human position data from the first time to the second time, and then detect the position of the difference area in the image data or a position into which the position is converted in the space for searching for the object OA, as the position of the object OA. Accordingly, even for an object placed outside the detection ranges of the wireless tag readers 101 to 103, the ID information and the position of the object can be determined. Further, since images for calculating a difference is selected by the image data selecting unit 504 based on the outputs of the human position sensor 210 and the wireless tag readers 101 to 103, there is no need to calculate differences by the object detection unit 505 for all pieces of image data (in other words, for each frame), whereby the computation amount can be reduced. Further, in calculating the difference by the object detection unit 505, it is possible to surely remove the area of the human HM based on the output of the human position sensor 210 and to limit the area for calculating the difference. This can reduce the computation amount.

Third Embodiment

Hereinafter, an object detecting device and an object detecting method according to a third embodiment of the present invention will be described in detail with reference to the drawings.

FIG. 30 is a block diagram showing the configuration of the object detecting device according to the third embodiment of the present invention. The room RM is expressed in a schematic shape (rectangular frame in this example), viewed through the room RM equipped with the object detecting device from above.

The object detecting device mainly includes the input/output unit 700, the object detection means 500, the timer means 600, storing means 400, a plurality of cameras 301, 302, 303, ..., the three wireless tag readers 101 to 103, and the human position sensor 210. The present embodiment is largely different from the second embodiment in that the plurality of cameras 301, 302, 303, are provided instead of the camera 300.

As in the first embodiment, in the room RM, the three wireless tag readers 101 to 103, the three antennas 111 to 112 of the three wireless tag readers 101 to 103, the human position sensor 210, and the plurality of cameras 301, 302, 303 ... are provided. By using the timer means 600, pieces of data outputted from the sensors such as the wireless tag readers 101 to 103, the human position sensor 210, and the cameras 301, 302, 303 ... are corresponded to the obtained time of each data obtained from the timer means 600, and stored in the storing means 400.

Further, the object detection means 500 detects the ID information and the position of the object OA present in the room RM by using data stored in the storing means 400 and outputted from the sensors. The wireless tag readers 101 to 103 and the human position sensor 210 are the same as those of the second embodiment, so the description is omitted. The difference from the second embodiment is that the plurality of cameras 301, 302, 303 are provided. The positional relationship between the positions of the respective cameras 301, 302, 303 ... in FIG. 30 and the room RM is not one reflecting the actual positional relationship. The positional relationship will be described below.

Figure 31A:
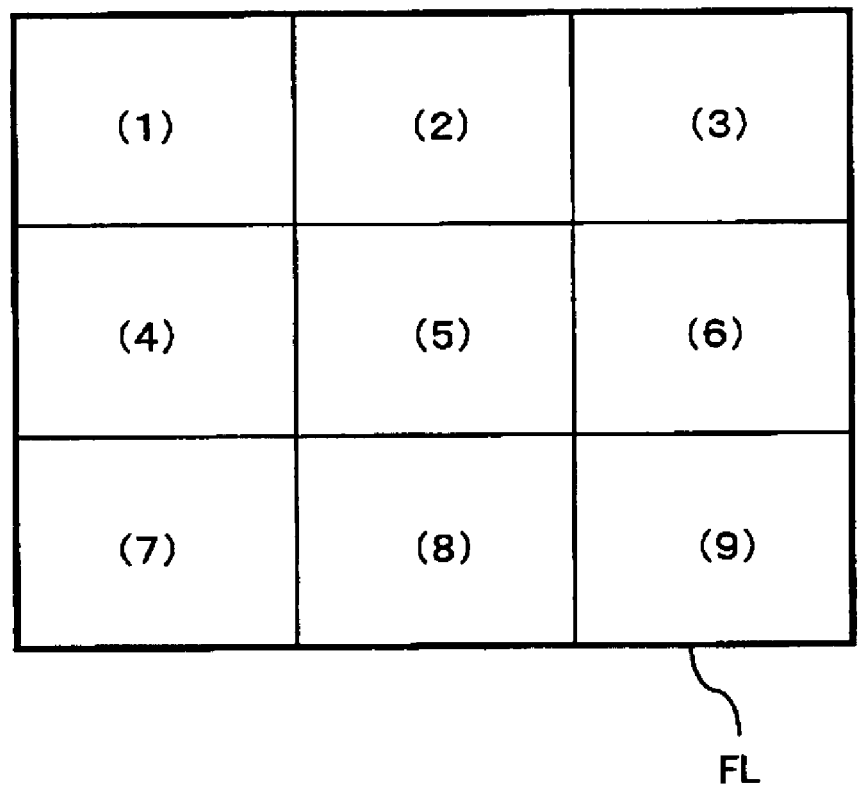
FIG. 31A is a view showing viewing field of nine cameras used in the third embodiment of the present invention.
Figure 31B:
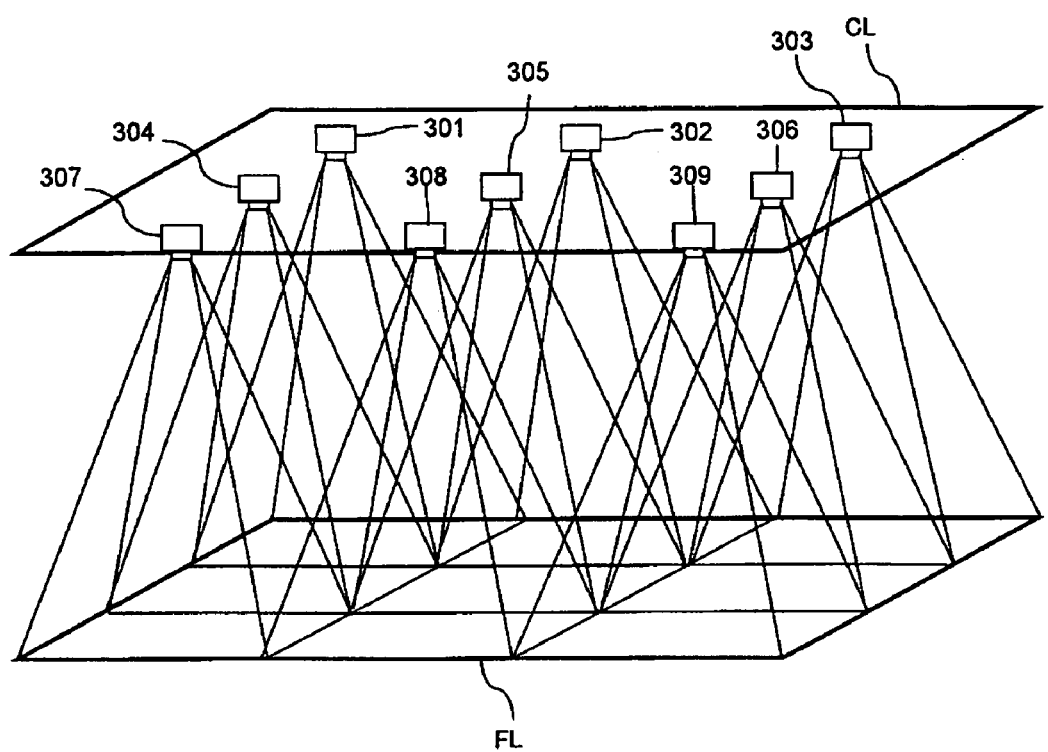
FIG. 31B is a view showing a state where nine cameras are arranged distributively on the ceiling in an object detecting device according to the third embodiment of the present invention.

The cameras 301, 302, 303 ... are provided such that the whole room RM can be seen by the plurality of cameras or a single camera. As an example of the former, a case where nine cameras 301, 302, 303, 304, 305, 306, 307, 308, and 309 are provided in a dispersed manner on the ceiling CL such that the optical axes thereof are directed vertically downward, as shown in FIG. 31B, is considered. In this case, the floor surface FL of the room RM is covered with the fields of view (1) to (9) of the nine cameras 301, 302, 303, 304, 305, 306, 307, 308, and 309, as shown in FIG. 31A.

Note that the number of cameras may be any number other than nine, and the fields of view may be overlapped. In particular, if the fields of view are not overlapped in the floor surface FL of the room RM as shown in FIG. 31B (31A), an area not included in any field of view of any camera is, generated when leaving upward from the floor surface FL. Therefore, in the case of placing an object at a place away from the floor surface FL such as on a table or furniture, it is desirable to set the cameras such that the fields of view of the cameras, disposed adjacently, are overlapped so as not to cause a dead angle for a place where an object may be placed.

Figure 32:
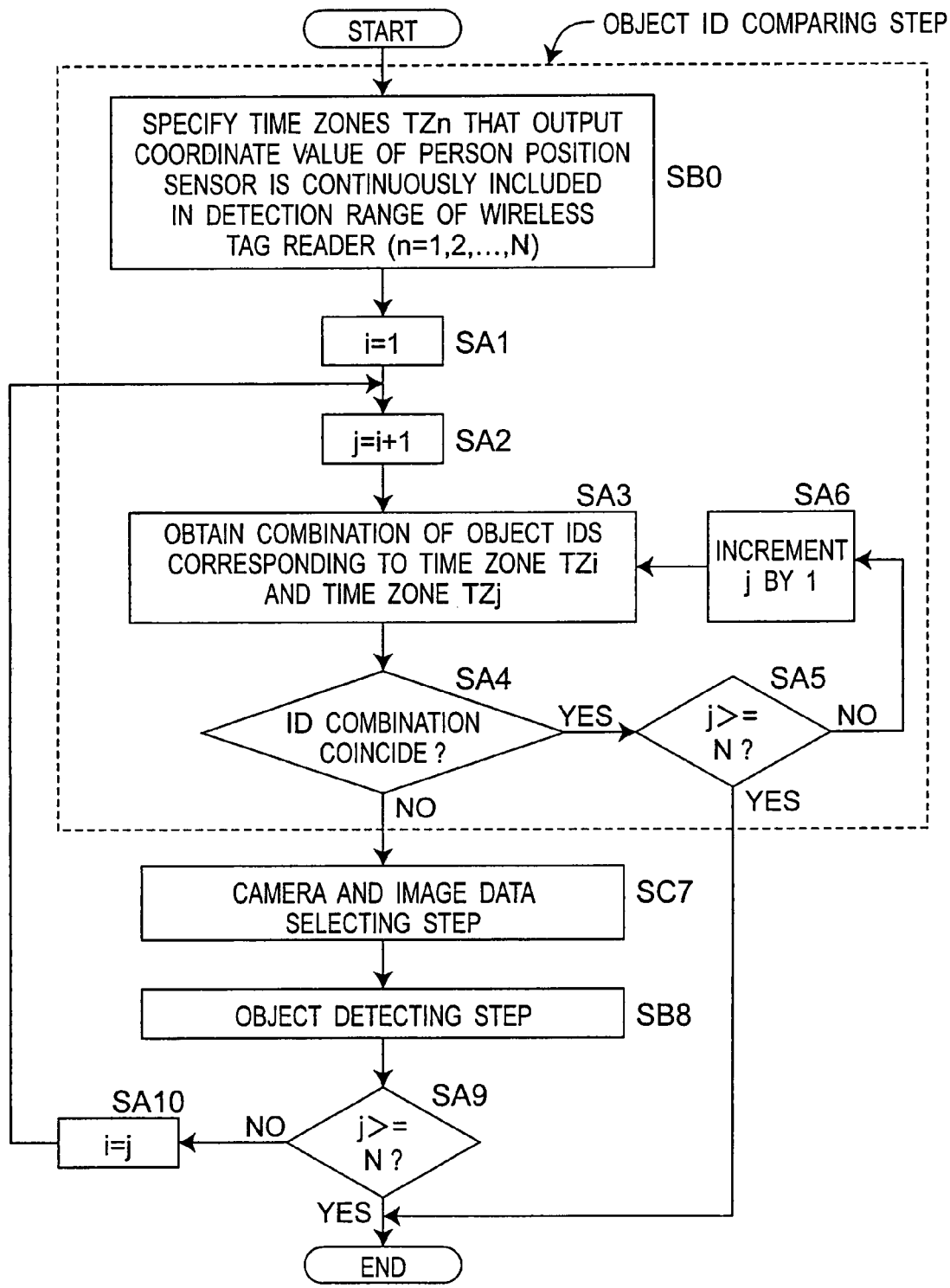
FIG. 32 is a flowchart showing an object detecting method performed by object detection means according to the third embodiment of the present invention.

FIG. 32 is a flowchart showing the object detecting method carried out by the object detection means 500 in the object detecting device according to the third embodiment.

Hereinafter, object detection processing according to the object detecting device and the object detecting method of the third embodiment will be described according to the flowchart of FIG. 32.

Since processing from the steps SB0, SA1 to SA6 is the same as those of the second embodiment, the description is omitted, and processing from the step SC7 or later will be described.

In the step SC7 carried out by the image data selecting unit 504, the cameras 301 to 309 picking up images suitable for detecting the object position, and images for detecting the object position are selected. If data from the sensors in FIG. 21, which is the same as those of the second embodiment, has been obtained, the processing which is the same as that of the second embodiment is performed to thereby limit the presence area of the object A as shown in FIG. 29. In the third embodiment, the room RM is picked up by the nine cameras 301 to 309 as shown in FIG. 31A. Therefore, in order to detect the object OA from the relationship between the area, where the object OA is present, shown in FIG. 29 and the fields of view of the respective cameras 301 to 309, it is understood that it is only necessary to select three cameras 301, 302, and 303 having the fields of view (1), (2), and (3) by the image data selecting unit 504. By selecting the cameras 301, 302, and 303 by the image data selecting unit 504, it is possible to select pieces of image data of the time 2 second and the time 14 second in the selected cameras 301, 302, and 303 from the storing means 400 by the image data selecting unit 504, using the same method as in the second embodiment.

In this example, a planer area where an object is present cannot be covered by a single camera, so three cameras are selected. As another example, if an area where an object is present (object presence candidate area AO) is not a plane as shown in FIGS. 39 and 40 described in the second embodiment, a hidden place may be caused with a signal camera. Even in this case, when a plurality of cameras image-pick up inside the room from various positions/angels, it is possible to perform object detection which is robust against hiding, by selecting a plurality of cameras to cover the whole area of the object presence candidate area AO by the object detection unit 505.

In the step SB8 to be carried out by the object detection unit 505, image data selected by the image data selecting unit 504 in the step SC7 is used, and a difference is calculated, whereby the position of the object is detected. If a plurality of cameras are selected, a difference is calculated between two pieces of image data for each camera by the object detection unit 505, to thereby adopt the result of the camera in which the different area is detected. Further, in calculating the difference by the object detection unit 505, it is possible to surely remove the area of the human and to limit the area for calculating the difference by the object detection unit 505 by using the shaded area in FIG. 29, as in the second embodiment.

Next, in the step SA9, whether the number of indexes j is not less than N is checked by the index management unit 506, and if it is determined that the number of indexes j is not less than N by the index management unit 506, the object detection processing ends.

If it is determined by the index management unit 506 that the number of index j is less than N, in the step SA10, the value of index i is set to the current value of the index j by the index management unit 506, and the step SA2 is performed again. In this way, the object detection processing is performed for all the time zones specified in the step SB0.

Note that the input/output unit 700 is the same as that of the first embodiment, so the description is omitted.

As described above, the object detecting method and the object detecting device of the third embodiment includes: the one or more wireless tag readers 101 to 103 for detecting the data relating to the object ID information of the object OA to which the wireless tag is given in the space for searching the object OA; the one or more human position sensors 210 for measuring the position of the human HM handling the object OA in the space; the two or more cameras 301 to 309 as an example of image-pickup device each of which image-picks up a part or the whole of the space; the storing means 400 for storing the data relating to the object ID information detected by the wireless tag readers 101 to 103, the human position data measured by the human position sensor 210, and the image data picked up by the cameras 301 to 309 while associating them with the obtained time of each data; and the object detection means 500 for detecting the ID information and the position of the object based on the data related to the object ID information, the human position data, and the image data stored in the storing means 400. Then, if the object detection means 500 determines that data relating to the first object ID information and the data relating to the second object ID information, respectively corresponding to first time and second time on which the human position data is obtained, in which the human position measured by the human position sensor 210 is included in the detection ranges of the wireless tag readers 101 to 103, are different from each other, an image-pickup device in which an area determined based on the human position data from the first time to the second time is held as an imaging field of view, or a camera (one of the cameras 301 to 309 or a plurality of cameras) having a viewpoint such that the area is not hidden by other objects including a human in each of the first image data and the second image data respectively corresponding to the first time and the second time, is specified. Further, a difference between the first image data and the second image data respectively corresponding to the first time and the second time, picked up by the specified camera(s), is calculated, and the position of the difference area in the image data or a position into which the position is converted, in the space for searching the object is detected as the position of the object. Accordingly, even for the object OA placed outside the detection ranges of the wireless tag readers 101 to 103, the ID information and the position of the object can be determined. Further, based on the outputs of the human position sensor 201 and the wireless tag readers 101 to 103, the camera is specified, and image data subject for calculating a difference among pieces of image data picked up at respective times by the specified camera is selected by the image data selecting unit 504. Therefore, there is no need to calculate differences for respective image data picked up at all times by the all cameras 301 to 309 by the object detection unit 505, whereby the computation amount can be reduced. Further, in calculating the difference by the object detection unit 505, it is possible to surely remove the human area, and to limit the area for calculating the difference, based on the output of the human position sensor 210.

Variation of Third Embodiment

In a variation of the third embodiment, the block diagram of FIG. 30 and the flowchart of FIG. 32 will be used as in the third embodiment. The block diagram of FIG. 30 is the same as the third embodiment, so the description is omitted.

Figure 33:
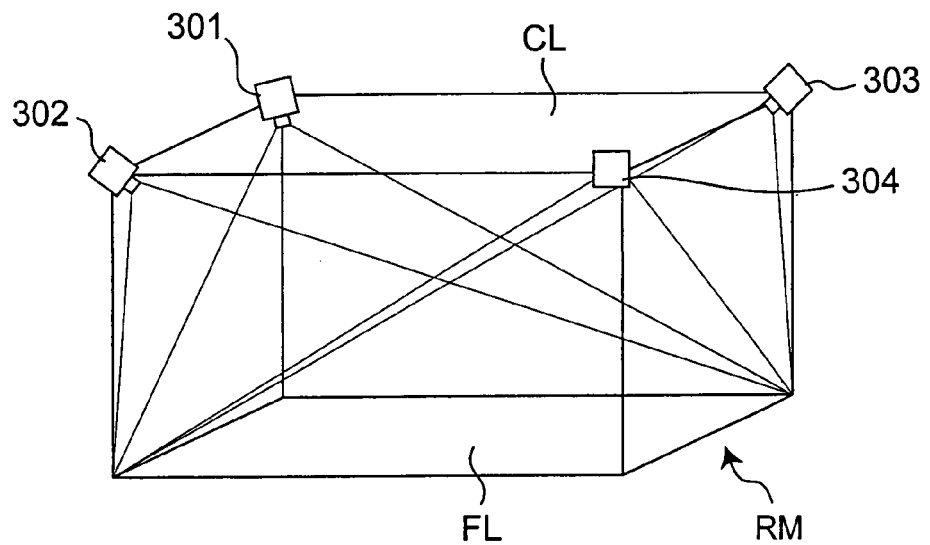
FIG. 33 is a view showing an arrangement of four cameras used in a variation of the third embodiment of the present invention.

In the variation of the third embodiment, the cameras 301 to 309 are provided such that the whole area of the floor surface FL of the room RM is covered by the combination of the fields of view (1) to (9) of the nine cameras 301 to 309, as shown in FIG. 31B (FIG. 31A). However, in the variation of the third embodiment, four cameras 301 to 304 are provided at the four corners of the ceiling CL as shown in FIG. 33. In other words, the four cameras 301 to 304 are provided on the upper parts of the four corners of the ceiling CL of the room RM such that the whole area of the floor surface FL of the room RM can be picked up by the respective cameras 301 to 304.

Hereinafter, object detection processing according to the object detecting device and the object detecting method of the variation of the third embodiment will be described in accordance with the flowchart of FIG. 32.

Processing from the steps SB0, SA1 to SA6 is the same as those of the second embodiment, so the description is omitted. Processing from the step SC7 or later will be described.

Figure 34A:
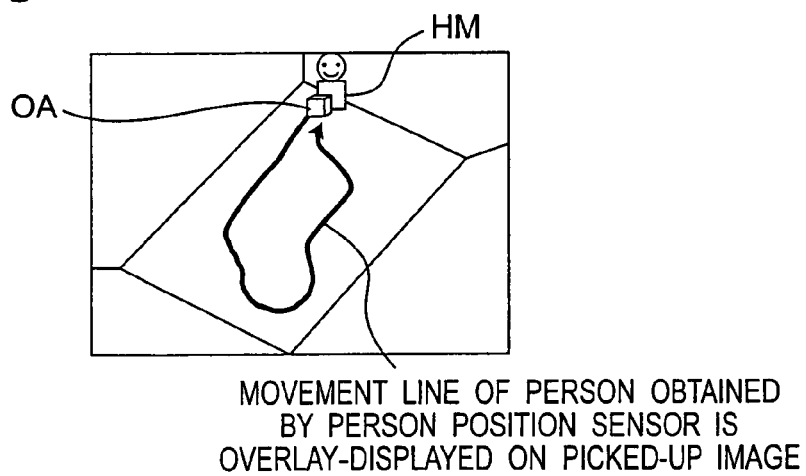
FIG. 34A is a view showing a picked up image at a time 2 second and at a time 14 second of a camera 302 in FIG. 33.
Figure 34B:
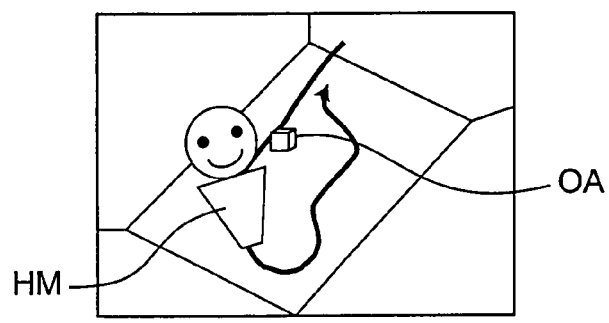
FIG. 34B is a view showing the picked up image at the time 2 second and the time 14 second of the camera 302 in FIG. 33.
Figure 35A:
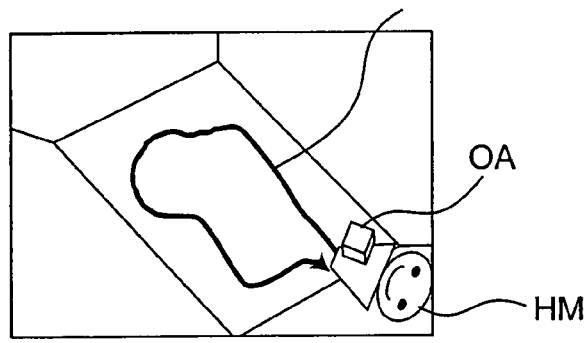
FIG. 35A is a view showing a picked up image at a time 2 second and a time 14 second of a camera 304 in FIG. 33.
Figure 35B:
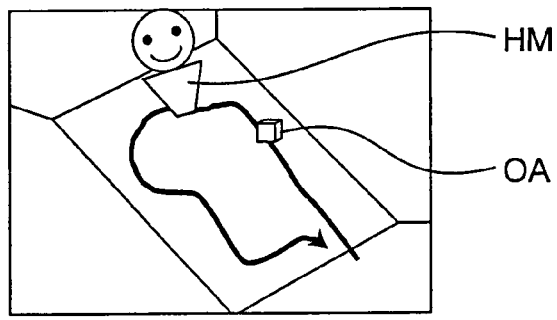
FIG. 35B is a view showing the picked up image at the time 2 second and the time 14 second of the camera 304 in FIG. 33.

In the step SC7 to be carried out by the image data selecting unit 504, camera(s) picking up images suitable for detecting the object position and image data for detecting the object position are selected by the image data selecting unit 504, from the four cameras 301 to 304. When data from the sensors of FIG. 21 which is the same as that in the second embodiment has been obtained, the same processing as in the second embodiment is carried out to thereby limit the presence area of the object A as shown in FIG. 29. FIGS. 34A and 34B show picked up images at the time 2 second and the time 14 second of the camera 302, respectively. In this camera position, in the image picked up at the time 14 second, the presence area of the object A in FIG. 29 and the figure of the human are overlapped. This is an obstacle in calculating a difference. On the other hand, FIGS. 35A and 35B show picked up images at the time 2 second and the time 14 second of the camera 304. In this camera position, the presence area of the object OA in FIG. 29 and the figure of the human HM are not overlapped, so difference calculation can be performed without any problem. When the position of the human is measured by the human position sensor 210, by assuming the three-dimensional shape of the human by the image data selecting unit 504, the human area in the picked up image data can be calculated by the image data selecting unit 504. By using this fact, it is possible to select, by the image data selecting unit 504, the position of a camera (viewpoint) from which the presence area of the object is not hidden by the human as shown in FIG. 29. As described in the second embodiment, whether the presence area of the object is hidden by the human can be determined by the object detection unit 505 by using the three-dimensional shape model of the room, the three-dimensional shape model of the human, and the calibrated cameras. By selecting the camera(s) by the image data selecting unit 504, images at the time 2 second and the time 14 second in the selected camera(s) are selected from the storing means 400 by the image data selecting unit 504, using the same method as in the second embodiment.

In the step SB8 to be carried out by the object detection unit 505, the position of the object OA is detected by calculating the difference, as described in the third embodiment, using the images selected by the image data selecting unit 504 in the step SC7.

Figure 36:
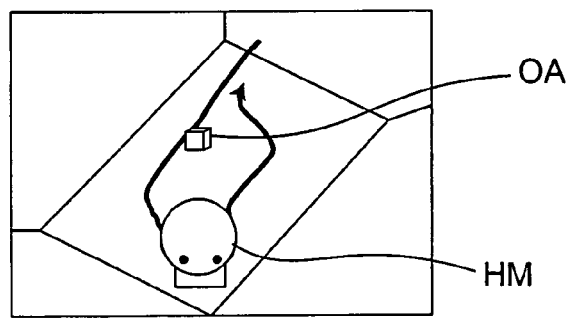
FIG. 36 is a view showing a picked up image at a time 23 second of the camera 302 in FIG. 33.

Further, by performing the selection so as not to change the position of the camera (viewpoint) but to change the picked up time by the image data selecting unit 504, a picked up image in which the presence area of the object is not hidden by the human may be used for calculating a difference by the object detection unit 505. The data in FIG. 25 shows that the object A is placed somewhere, during a period from the time 3 second to the time 13 second, near the position (object presence candidate area) where the human is present during the time. At a time after the time 14 second, the position of the object A is not moved before the time on which the human comes close to the object presence candidate area again, so it can be used for calculating a difference. FIG. 36 shows, a picked up image at the time 23 second of the camera 302. At this image-picking up time, the object presence position in FIG. 29 and the figure of the human are not overlapped, and at this image-picking up time, the human has not come close to the object presence candidate area again. Therefore, by selecting the image shown in FIG. 34A and the image data shown in FIG. 36 by the image data selecting unit 504, and by calculating the difference between the pieces of image data by the object detection unit 505, the position of the object A can be detected.

Next, in the step SA9, whether the number of indexes j is not less than N is checked by the index management unit 506, and if it is determined by the index management unit 506 that the number of indexes j is not less than N, the object detection processing ends.

If it is determined by the index management unit 506 that the number of indexes j is less than N, in the step SA10, the value of the index i is set to the current value of the index j by the index management unit 506, and the step SA2 is performed again. In this way, object detection processing is performed for all the time zones specified in the step SB0.

Note that the input/output unit 700 is same as that of the first embodiment, so the description is omitted.

As described above, according to the object detecting method and the object detecting device of the variation of the third embodiment, it is so configured that the four cameras 301 to 304 capable of image-picking up the whole area of the floor surface FL of the room RM are provided, instead of providing the cameras 301 to 309 so as to cover the whole area of the floor surface FL of the room RM by combining the fields of view (1) to (9) of the nine cameras 301 to 309, and image data is selected by the image data selecting unit 504 by changing the position of the camera (viewpoint) to thereby use a picked up image in which the presence area of an object is not hidden by a human, for calculating a difference by the object detection unit 505. Alternatively, it is so configured as to select image data by the image data selecting unit 504 such that the picked up time is changed instead of changing the position of the camera (viewpoint), and to use a picked up image in which the presence area of an object is not hidden by a human, for calculating a difference by the object detection unit 505. Accordingly, even for the object OA placed outside the detection ranges of the wireless tag readers 101 to 103, the ID information and the position of the object can be determined. Further, based on the outputs of the human position sensor 210 and the wireless tag readers 101 to 103, a camera is specified, and images for calculating a difference are selected from the picked up images of the camera, so there is no need to calculate differences for images picked up at all times by all the cameras. This can reduce the computation amount. Further, in calculating the difference, the human area can be surely eliminated and the areas for calculating the difference can be limited based on the output of the human position sensor 210.

Note that the present invention is not limited to the various embodiments described above. The present invention can also be implemented in other various modes.

For example, the respective steps of the object detection processing of the first, second, and third embodiments may be stored on a recording device such as a storing device (hard disk, etc.) in a readable manner as computer programs, and by loading the computer programs to a temporary storage (semiconductor memory, etc.) of a computer and executing them by using a CPU, the processing described above can be carried out.

By properly combining the arbitrary embodiments of the aforementioned various embodiments, the effects possessed by the embodiments can be produced.

INDUSTRIAL APPLICABILITY

The object detecting device, the object detecting method, and the computer program for detecting objects, according to the present invention, can provide a device, a method and a program for managing objects placed in an ordinary house or in an office. Particularly, it is possible to manage ID information and positions of household commodities present in an ordinary house and various objects used in an office by utilizing a wireless tag technique and the like. This makes it possible to provide the position of a searched article properly when a user asks for the searched article, and to provide life/service support such as having a robot deliver the searched article.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An object detecting device, comprising:

at least one wireless tag reader for detecting object ID data relating to object ID information of an object to which a wireless tag is given in a space where the object is searched;

at least one human position sensor for measuring a position of a human handling the object in the space;

at least one image-pickup device for picking up an image of a part or a whole of the space;

a storing means for storing the object ID data, human position data measured by the human position sensor, and image data picked up by the image-pickup device, while associating a time with the object ID data, the human position data and the image data, wherein the time indicates when the object ID data, the human position data and the image data were obtained; and an object detection means for detecting object ID information and a position of the object based on the object ID data, the human position data, and the image data, stored in the storing means, wherein when the object detection means determines that first object ID data corresponding to a first time that first human position data is obtained and relating to first object ID information and second object ID data corresponding to a second time that second human position data is obtained and relating to second object ID information, among a set of object ID data in which a human position measured by the human position sensor is included in a detection range of the wireless tag reader, are different from each other, the object detection means calculates a difference between first image data corresponding to the first time and second image data corresponding to the second time, and in the calculation, the object detection means calculates a difference between the first image data and the second image data for an area determined based on the first human position data and the second human position data, and then, detects a position of the difference area in image data or a position obtained by converting the position to a position in the space where the object is searched, as a position of the object.

2. An object detecting device, comprising:

at least one wireless tag reader for detecting object ID data relating to object ID information of an object to which a wireless tag is given in a space where the object is searched;

at least one human position sensor for measuring a position of a human handling the object in the space;

at least two image-pickup devices each for picking up an image of a part or a whole of the space;

a storing means for storing the object ID data human position data measured by the human position sensor, and image data picked up by the image-pickup device, while associating a time with the object ID data, the human position data and the image data, wherein the time indicates when the object ID data, the human position data and the image data were obtained; and an object detection means for detecting object ID information and a position of the object based on the object ID data, the human position data, and the image data, stored in the storing means, wherein when the object detection means determines that first object ID data corresponding to a first time that first human position data is obtained and relating to first object ID information and second object ID data corresponding to a second time that second human position data is obtained and relating to second object ID information, in which a human position measured by the human position sensor is included in a detection range of the wireless tag reader, are different from each other, the object detection means specifies the image-pickup device having an area determined based on the human position data from the first time to the second time as an image-picking up field of view, or the image-pickup device having a viewpoint from which the area is not hidden by any other object including a human in each of first image data corresponding to the first time and second image data corresponding to the second time, from the at least two image-pickup devices, and the object detection means calculates a difference between the first image data and the second image data corresponding to the first time and the second time respectively, picked up by the specified image-pickup device, and detects a position of an area of the difference in the image data or a position obtained by converting the position to a position in the space where the object is searched, as a position of the object.

3. An object detecting device, comprising:

at least one wireless tag reader for detecting object ID data relating to object ID information of an object to which a wireless tag is given in a space where an object is searched;

at least one human detection sensor for detecting whether a human is present in a detection range of the wireless tag reader in the space;

at least one image-pickup device for picking up an image of a part or a whole of the space;

a storing means for storing the object ID data, human detection data detected by the human detection sensor, and image data picked up by the image-pickup device, while associating a time with the object ID data, the human position data and the image data, wherein the time indicates when the object ID data, the human position data and the image data were obtained; and an object detection means for detecting object ID information and a position of the object based on the object ID data, the human detection data and the image data, stored in the storing means, wherein when the object detection means determines that first object ID data corresponding to a first time that first human position data is obtained and relating to first object ID data and second object ID data corresponding to a second time that second human position data is obtained and relating to second object ID information, are different from each other, the object detection means calculates a difference between first image data corresponding to the first time and second image data corresponding to the second time, and detects a position of a difference area in the image data or a position obtained by converting the position of the difference area to a position in the space where the object is searched, as a position of the object.

4. The object detecting device according to claim 3, wherein the image-pickup device is a camera, and when calculating the difference between the first image data and the second image data, the object detection means excludes an area obtained by converting the detection range of the human detection sensor to a camera coordinate system from a difference subject area for calculating the difference between the first image data and the second image data, and calculates the difference for an area from which the area has been excluded.

5. The object detecting device according to claim 3, wherein the object detection means includes:

an image data selecting unit for selecting first image data and third image data of which obtained times are different from each other, based on the first time, and selecting second image data and fourth image data of which obtained times are different from each other, based on the second time; and an object detection unit for determining a first mask area by calculating a difference between the first image data and the third image data selected by the image data selecting unit, and determining a second mask area by calculating a difference between the second image data and the fourth image data selected by the image data selecting unit, and in calculating a difference between the first image data and the second image data, calculating the difference between the first image data and the second image data after excluding the first mask area and the second mask area from a difference subject area.

6. The object detecting device according to claim 1, wherein when calculating the difference between the first image data and the second image data, the object detection means specifies object ID information having a difference in the data relating to the first object ID information and the data relating to the second object ID information, and calculates the difference by using at least one piece of information among color, size, and shape information of the object corresponding to the object ID information having the difference.

7. An object detecting method of detecting ID information and a position of an object by using object ID data relating to object ID information detected by at least one wireless tag reader for detecting the object ID data relating to the object ID information of an object to which a wireless tag is given, human detection data detected by at least one human detection sensor for detecting whether a human is present in a detection range of the wireless tag reader, and image data picked up by at least one image-pickup device for picking up an image of a part or a whole of a space where the object is searched, which are accumulated in association with obtained times of the respective pieces of object ID data, the method comprising:

comparing first object ID data corresponding to a first time at which the human detection data is obtained and relating to first object ID information with second object ID data corresponding to a second time at which the human detection data is obtained and relating to second object ID information;

selecting first image data and second image data respectively corresponding to the first time and the second time;

calculating a difference between the first image data and the second image data, and detecting a position of an area of the difference in image data or a position obtained by converting the position to a position in the space where the object is searched, as a position of the object; and as a result of the comparison in the object ID data comparison, when the pieces of data relating to the object ID information do not coincide with each other, carrying out the image data selection and the object detection.

8. An object detecting method of detecting ID information and a position of an object by using object ID data relating to object ID information detected by at least one wireless tag reader for detecting the object ID data relating to the object ID information of an object to which a wireless tag is given, human position data measured by at least one human position sensor for measuring a position of a human handling the object, and image data picked up by at least one image-pickup device for picking up an image of a part or a whole of a space, which are accumulated in association with obtained times of the respective pieces of object ID data, the method comprising:

comparing first object ID data corresponding to a first time at which the human detection data is obtained and relating to first object ID information with second object ID data corresponding to a second time at which the human detection data is obtained and relating to second object ID information, in which a human position measured by the human position sensor is included in a detection range of the wireless tag reader;

selecting first image data and second image data respectively corresponding to the first time and the second time;

calculating a difference between the first image data and the second image data selected in the image data selection, detecting a position of an area of the difference in image data or a position obtained by converting the position to a position in a space where the object is searched as a position of the object, and in calculating the difference, calculating a difference for an area determined based on the human position data from the first time to the second time; and as a result of the comparison in the object ID comparison, when the pieces of data relating to the object ID information do not coincide with each other, carrying out the image data selection and the object detection.

9. An object detecting method of detecting ID information and a position of an object by using object ID data relating to object ID information detected by at least one wireless tag reader for detecting the data relating to the object ID information of an object to which a wireless tag is given, human position data measured by at least one human position sensor for measuring a position of a human handling the object, and image data picked up by at least two image-pickup devices each for picking up an image of a part or a whole of a space, which are accumulated in association with obtained times of the respective pieces of object ID data, the method comprising:

comparing first object ID data corresponding to a first time when human position data was obtained and relating to first object ID information with second object ID data corresponding to a second time when human position data was obtained and relating to second object ID information, in which a human position measured by the human position sensor is included in a detection range of the wireless tag reader;

specifying an image-pickup device having an area determined based on the human position data from the first time to the second time as an image-picking up field of view, or an image-pickup device having a viewpoint from which the area is not hidden by other object including a human in each of first image data and second image data corresponding to the first time and the second time respectively, from the at least two image-pickup devices, and selecting the first image data and the second image data corresponding to the first time and the second time respectively, picked up by the specified image-pickup device;

calculating a difference between the first image data and the second image data selected in the image-pickup device and image data selection, and detecting a position of an area of the difference in image data or a position obtained by converting the position to a position in a space where the object is searched, as a position of the object; and as a result of the comparison in the object ID comparison, when the pieces of data relating to the object ID information do not coincide with each other, carrying out the image-pickup device and image data selection and the object detection.

10. A computer program stored in a non-transitory computer readable medium for detecting an object, for detecting ID information and a position of an object by using a computer, by using object ID data detected by at least one wireless tag reader for detecting data relating to the object ID information of an object to which a wireless tag is given, human detection data detected by at least one human detection sensor for detecting whether a human is present in a detection range of the wireless tag reader, and image data picked up by at least one image-pickup device for picking up an image of a part or a whole of a space where the object is searched, which are accumulated in association with obtained times of the respective pieces of object ID data, the program comprising:

an object ID comparing means for comparing first object ID data corresponding to a first time the human detection data is obtained and relating to first object ID information with second object ID data corresponding to a first time the human detection data is obtained and relating to second object ID data;

an image data selecting means for selecting first image data and second image data respectively corresponding to the first time and the second time when the first object ID information and second object ID information do not coincide with each other as a result of the comparison by the object ID comparing means; and an object detection means for calculating a difference between the first image data and the second image data selected by the image data selecting means, and detecting a position of an area of the difference in image data or a position obtained by converting the position to a position in a space where the object is searched, as a position of the object.

11. A computer program stored in a non-transitory computer readable medium for detecting an object, for detecting ID information and a position of an object by using a computer, by using data relating to object ID information detected by at least one wireless tag reader for detecting object ID data relating to object ID information of an object to which a wireless tag is given, human position data measured by at least one human position sensor for measuring a position of a human handling the object, and image data picked up by at least one image-pickup device for picking up an image of a part or a whole of a space, which are accumulated in association with obtained times of the respective pieces of object ID data, the program causing the computer to execute:

an object ID comparing means for comparing first object ID data corresponding to a first time the human position data is obtained and relating to first object ID information with second object ID data corresponding to a second time the human relation data is obtained and relating to second object ID information, in which a human position measured by the human position sensor is included in a detection range of the wireless tag reader;

an image data selecting means for selecting first image data corresponding to the first time and second image data corresponding to the second time when the pieces of data relating to the object ID information do not coincide with each other as a result of the comparison by the object ID comparing means; and an object detection means for calculating a difference between the first image data and the second image data selected by the image data selecting means, detecting a position of an area of the difference between the first image data and the second image data or a position obtained by converting the position to a position in a space where the object is searched, as a position of the object, and when calculating the difference, calculating a difference for an area determined based on the human position data from the first time to the second time.

12. A computer program stored in a non-transitory computer readable medium for detecting an object, for detecting ID information and a position of an object by using a computer, by using object ID data relating to object ID information detected by at least one wireless tag reader for detecting data relating to object ID information of an object to which a wireless tag is given, human position data measured by at least one human position sensor for measuring a position of a human handling the object, and image data picked up by at least two image-pickup devices each for picking up an image of a part or a whole of a space, which are accumulated in association with obtained times of the respective pieces of object ID data, wherein when the program causes the computer to execute:

an object ID comparing means for comparing first object ID data corresponding to a first time the human position data is obtained and relating to first object ID information with second object ID data corresponding to a second time the human position data is obtained and relating to second object ID information, in which a human position measured by the human position sensor is included in a detection range of the wireless tag reader;

an image-pickup device and image data selecting means for specifying an image-pickup device having an area determined based on the human position data from the first time to the second time as an image-pickup field of view, or an image-pickup device having a viewpoint from which the area is not hidden by other object including a human in each of first image data and second image data respectively corresponding to the first time and the second time, among the at least two image-pickup devices, and selecting the first image data and the second image data respectively corresponding to the first time and the second time picked up by the specified image-pickup device; and an object detection means for calculating a difference between the first image data and the second image data selected by the image-pickup device and image data selecting means, and detecting a position of an area of the difference in image data or a position obtained by converting the position to a position in a space where the object is searched, as a position of the object, the program causes the computer to execute the image-pickup device and image data selecting means and the object detection means when the first object ID data does not coincide with the second object ID data as a result of the comparison by the object ID comparing means.

* * * * *